(12) United States Patent
Petré et al.

(10) Patent No.: US 7,873,021 B2
(45) Date of Patent: Jan. 18, 2011

(54) CDMA TRANSCEIVER TECHNIQUES FOR WIRELESS COMMUNICATIONS

(75) Inventors: Frederik Petré, Landen (BE); Geert Leus, Hasselt (BE)

(73) Assignees: IMEC, Leuven (BE); Katholieke Universiteit Leuven, Leuven (BE)

( * ) Notice: Subject to any disclaimer, the term of this patent is extended or adjusted under 35 U.S.C. 154(b) by 1427 days.

(21) Appl. No.: 10/424,543

(22) Filed: Apr. 25, 2003

(65) Prior Publication Data

US 2004/0120274 A1    Jun. 24, 2004

Related U.S. Application Data

(60) Provisional application No. 60/376,113, filed on Apr. 25, 2002.

(51) Int. Cl.
H04B 7/00 (2006.01)

(52) U.S. Cl. .................. 370/342; 375/148; 375/329

(58) Field of Classification Search ........... 370/203, 370/208, 441, 335, 342, 320; 375/347, 150, 375/349, 295, 299, 296, 265, 267, 146, 147, 375/148; 455/73, 552.1, 561
See application file for complete search history.

(56) References Cited

U.S. PATENT DOCUMENTS

| | | | |
|---|---|---|---|
| 5,461,640 A | 10/1995 | Gatherer | |
| 5,862,186 A | 1/1999 | Kumar | |
| 6,301,298 B1 | 10/2001 | Kuntz et al. | |
| 6,426,972 B1 | 7/2002 | Endres et al. | |
| 6,522,683 B1 | 2/2003 | Smee et al. | |
| 6,580,750 B2 | 6/2003 | Aue | |
| 6,665,545 B1 | 12/2003 | Raleigh et al. | |
| 6,671,334 B1 | 12/2003 | Kuntz et al. | |
| 6,801,565 B1 | 10/2004 | Bottomley et al. | |
| 6,804,307 B1 | 10/2004 | Popovic | |
| 6,834,043 B1 * | 12/2004 | Vook et al. | 370/310 |
| 6,891,897 B1 * | 5/2005 | Bevan et al. | 375/265 |
| 6,917,821 B2 | 7/2005 | Kadous et al. | |

(Continued)

FOREIGN PATENT DOCUMENTS

EP    1 128 592 A1    8/2001

(Continued)

OTHER PUBLICATIONS

Leus; Signal Processing Algorithms for CDMA-Based Wireless Communications (p. 147); Thesis May 2000.*

(Continued)

Primary Examiner—Kevin C Harper
Assistant Examiner—Henry Baron
(74) Attorney, Agent, or Firm—Knobbe Martens Olson & Bear LLP

(57) ABSTRACT

The present invention is related to a method for multi-user wireless transmission of data signals in a communication system having at least one base station and at least one terminal where for a plurality of users have robustness to frequency-selective fading added to the data to be transmitted, then grouping data symbols into blocks formed by demultiplexing a serial-to-parallel operation, and spreading and scrambling a portion of the obtained blocks of data, followed by combining spread and scrambled portions of the blocks, adding transmit redundancy to the combined spread and scrambled portions which is then transmitted.

20 Claims, 16 Drawing Sheets

U.S. PATENT DOCUMENTS

| | | |
|---|---|---|
| 6,937,292 B1 | 8/2005 | Patel et al. |
| 6,990,137 B2 | 1/2006 | Smee et al. |
| 2001/0028637 A1 | 10/2001 | Abeta et al. |
| 2001/0046255 A1 | 11/2001 | Shattil |
| 2002/0191568 A1 | 12/2002 | Ghosh |
| 2003/0016640 A1 | 1/2003 | Onggosanusi et al. |
| 2003/0165187 A1 | 9/2003 | Tesfai et al. |
| 2004/0022179 A1* | 2/2004 | Giannakis et al. ........... 370/207 |
| 2004/0057530 A1 | 3/2004 | Tarokh et al. |
| 2004/0081263 A1 | 4/2004 | Lee et al. |
| 2004/0082356 A1 | 4/2004 | Walton et al. |
| 2004/0120274 A1 | 6/2004 | Petre et al. |
| 2004/0240527 A1 | 12/2004 | Giannakis et al. |
| 2004/0248527 A1 | 12/2004 | Park et al. |
| 2005/0135314 A1 | 6/2005 | Giannakis et al. |
| 2006/0039331 A1* | 2/2006 | Abeta et al. ................. 370/335 |
| 2007/0104282 A1 | 5/2007 | Vihriala |

FOREIGN PATENT DOCUMENTS

| | | |
|---|---|---|
| EP | 1 357 693 A1 | 10/2003 |

OTHER PUBLICATIONS

Giannakis, et al., "Space-time coding for broadband wireless communications", Wireless Communications and Mobile Computing, vol. 1, pp. 35-53, (2001).

Mudulodu, et al., "A blind multiuser receiver for the CDMA downlink", IEEE, pp. 2933-2936, (2000).

Petré, et al., "Space-time chip equalizer receivers for WCDMA downlink with code-multiplexed pilot and soft handover", IEEE, pp. 280-284, (2001).

Wang, et al., "Linearly precoded or coded OFDM against wireless channel fades?", Third IEEE Signal Processing Workshop on Signal Processing Advances in Wireless Communications, Taoyuan, Taiwan, pp. 267-270, Mar. 20-23, 2001).

International Search Report dated Aug. 4, 2003 for European Patent Application No. EP 03 44 7096.

Al-Dhahir, Naofal, "Single-carrier frequency-domain equalization for space-time block-coded transmission over frequency-selective fading channels", IEEE Communications Letters, vol. 5, No. 7, pp. 304-306, (Jul. 2001).

Giannakis, et al., "AMOUR-generalized multicarrier transceivers for blind CDMA regardless of multipath", IEEE Transactions on Communications, vol. 48, No. 12, pp. 2064-2076, (Dec. 2000).

Huang, et al., "Achieving high data rates in CDMA systems using BLAST techniques", Proceedings Global Telecommunications Conference, IEEE, vol. 5, pp. 2316-2320, (Nov. 1999).

Li, et al., "Transmitter diversity for OFDM systems and its impact on high-rate data wireless networks", IEEE Journal on Selected Areas in Communications, vol. 17, No. 7, pp. 1233-1243, (Jul. 1999).

Zhou, et al., "Chip-interleaved block-spread code division multiple access", IEEE Transactions on Communications, vol. 50, No. 2, pp. 235-248, (Feb. 2002).

Buzzi et al., "Channel Estimation and Multiuser Detection in Long-Code DS/CDMA Systems", (2001) IEEE Journal on Selected Areas in Communications, vol. 19, No. 8, pp. 1476-1487.

Correal et al., "Enhanced DS-CDMA Uplink Performance Through Base Station Polarization Diversity and Multistage Interference Cancellation", (1998) IEEE, pp. 1905-1910.

Fantacci, "An Efficient RAKE Receiver Architecture with Pilot Signal Cancellation for Downlink Communications in DS-CDMA Indoor Wireless Networks", (1999) IEEE Transactions on Communications, vol. 47, No. 6, pp. 823-827.

Frank et al., "Adaptive Interference Suppersion for Direct-Sequence CDMA Systems with Long Spreading Codes", (1998) Allerton Conference on Communication, Control and Computing, pp. 411-420.

G. Leus, "Signal Processing Algorithms for CDMA-Based Wireless Communications" (2000) Ph.D. Thesis KULeuven.

Gesbert et al., "Blind Multiuser MMSE Detector for CDMA Signals in ISI Channels", (1999) IEEECommunications Letters, vol. 3, No. 8, pp. 233-235.

Gesbert et al., "On-Line Blind Multichannel Equalization Based on Mutually Referenced Filters", (1997) IEEE Transactions on Signal Processing, vol. 45, No. 9, pp. 2307-2317.

Ghauri et al. "Linear Receivers for the DS-CDMA Doenlink Exploting Orthogonality of Spreading Sequences", (1998) IEEE vol. 1, pp. 650-654.

Ghauri et al., "Blind and Semi-blind Single User Receiver Techniques for Asynchronous CDMA in Multipath Channels", (1998) IEEE, pp. 3572-3577.

Holma et al., "WCDMA for UMTS", (2001) Wiley.

Honig et al., "Multiuser CDMA Receivers", (2000) IEEE Signal Processing Magazine, vol. 17, No. 3, pp. 49-63.

Hooli et al., "Multiple Access Interference Suppression with Linear Chip Equalizers in WCDMA Downlink Receiversl" (1999) Globecom, vol. General Conference (Part A), pp. 467-471.

J. Proakis, "Digital Communicationsl", (1995) McGraw-Hill, 3rd edition.

Klein, "Data Detection Algorithms Specially Designed for the Downlink of CDMA Mobile Radio Systems", (1997) IEEE, pp. 203-207.

Krauss et al. "Simple MMSE Equalizers for CDMA Downlink to Restore Chip Sequence: comparison to Zero-forcing and Rake", (2000) IEEE, pp. 2865-2868.

Krauss et al., "Blind Channel Identification on CDMA Forward Link Based on Dual Antenna Receiver at Hand-Set and Cross-Relation", (1999) IEEE, pp. 75-79.

Li et al., "A New Blind Receiver for Downlink DS-CDMA Communications", (1999) IEEE Communications Letters, vol. 3, No. 7, pp. 193-195.

Milstein, "Wideband Code Division Multiple Access", (2000) IEEE Journal on Selected Areas in Communication, vol. 18, No. 8, pp. 1344-1354.

Petre et al., "Extended MMSE Receiver for Multiuser Interference Rejection in Multipath DS-CDMA Channels", (1999) Vehicular Technology Conference, vol. 3, pp. 1840-1844.

Petre et al., "Pilot-aided Adaptive Chip Equalizer Receiver for Interference Suppression in DS-CDMA Forward Link", Vehicular Technology Conference, (2000) vol. 1, pp. 303-308.

Price et al., "A Communication Technique for Multipath Channels", (1958) IRE, vol. 46, pp. 555-570.

S. Haykin, "Adoptive Filter Theory", (1996) Prentice Hall, 3rd edition.

S. Verdu, "Multiuser Detection", (1998) Cambridge University Press.

Tsatsanis et al., "Performance Analysis of Minimum Variance CDMA Receivers", (1998) IEEE Transactions on Signal Processing, vol. 46, No. 11, pp. 3014-3022.

Tsatsanis, "Inverse Filtering Criteria for CDMA Systems", (1997) IEEE Transactions on Signal Processing, vol. 45, No. 1, pp. 102-112.

Vauhan, "Polarization Diversity in Mobile Communications", (1990) IEEE Transactions on Vehicular Technology, vol. 39, No. 3, pp. 177-186.

Wang et al., "Blind Equalization and Multiuser Detection in Dispersive CDMA Channels", (1998) IEEE Transactions on Communications, vol. 46, No. 1, pp. 91-103.

Office Action dated Dec. 31, 2008 for U.S. Appl. No. 11/599,680.

Office Action dated Jun. 12, 2008 for U.S. Appl. No. 11/599,680.

Office Action dated Sep. 20, 2007 for U.S. Appl. No. 11/599,680.

Office Action dated Apr. 17, 2009 for U.S. Appl. No. 11/433,629.

Petré et al., Space-time block coding for single-carrier block transmission DS-CDMA downlink, IEEE Journal, 21(3):350-361 (2003).

Alamouti, A simple transmit diversity technique for wireless communications, IEEE Journal, 16(8):1451-1458 (1998).

Czylwik, Comparison between adaptive OFDM and single carrier modulation with frequency domain equalization, IEEE Journal, pp. 865-869 (1997).

Vollmer et al., Comparative study of joint-detection techniques for TD-CDMA based mobile radio systems, IEEE Journal, 19(8):1461-1475 (2001).

Vook et al., Cyclic-prefix CDMA with antenna diversity, IEEE Journal, pp. 1002-1006 (2002).

Zhou, et al., Chip-Interleaved Block-Spread CDMA Versus DS-CDMA for Cellular Downlink: A Comparative Study, IEEE Transactions on Wireless Communications, vol. 3, No. 1 Jan. 2004.

Office Action dated Jun. 15, 2010 for U.S. Appl. No. 11/433,629.

Office Action dated Nov. 24, 2009 for U.S. Appl. No. 11/433,629.

Liu et al., Space-time coding for broadband wireless communications, Wireless Communications and Mobile Computing, vol. 1, No. 1, Jan. 2001, pp. 35-53.

European Search Report dated Jul. 29, 2003 for EP Application no. 03447096.

* cited by examiner

CDMA TRANSCEIVER TECHNIQUES FOR WIRELESS COMMUNICATIONS

I. RELATED APPLICATIONS

This application claims priority to, and hereby incorporates by reference in its entirety, provisional U.S. Application No. 60/376,113, filed on Apr. 25, 2002, and entitled "CDMA TRANSCEIVER TECNIQUES FOR MULTIPLE INPUT MULTIPLE OUTPUT (MIMO) WIRELESS COMMUNICATIONS". Further, this application incorporates by reference in their entirety U.S. application Ser. No. 10/134,307, filed on Apr. 26, 2002, entitled "WIDEBAND MULTIPLE ACCESS TELECOMMUNICATION METHOD AND APPARATUS", and provisional U.S. Application No. 60/286,486, filed on Apr. 26, 2001, and entitled "WIDEBAND CDMA TELECOMMUNICATIONS METHOD AND APPARATUS".

II. FIELD OF THE INVENTION

The present invention is related to a method for Wideband Code Division Multiple Access (WCDMA) wireless communication systems, suitable for communication over frequency-selective fading channels.

III. INTRODUCTION TO THE STATE OF THE ART

Wideband CDMA is emerging as the predominant wireless access mode for forthcoming 3G systems, because it offers higher data rates and supports larger number of users over mobile wireless channels compared to access techniques like TDMA and narrowband CDMA. Especially in the downlink (from base to mobile station) direction the main drivers toward future broadband cellular systems require higher data rates. There are several main challenges to successful transceiver design. First, for increasing data rates, the underlying multi-path channels become more time-dispersive, causing Inter-Symbol Interference (ISI) and Inter-Chip Interference (ICI), or equivalently frequency-selective fading. Second, due to the increasing success of future broadband services, more users will try to access the common network resources, causing Multi-User Interference (MUI). Both ISI/ICI and MUI are important performance limiting factors for future broadband cellular systems, because they determine their capabilities in dealing with high data rates and system loads, respectively. Third, cost, size and power consumption issues put severe constraints on the receiver complexity at the mobile.

Direct-Sequence (DS) Code Division Multiple Access (CDMA) has emerged as the predominant air interface technology for the 3G cellular standard, because it increases capacity and facilitates network planning in a cellular system. DS-CDMA relies on the orthogonality of the spreading codes to separate the different user signals. However, ICI destroys the orthogonality among users, giving rise to MUTI. Since the MUI is essentially caused by the multi-path channel, linear chip-level equalization, combined with correlation with the desired user's spreading code, allows to suppress the MUI. However, chip equalizer receivers suppress MUI only statistically, and require multiple receive antennas to cope with the effects caused by deep channel fades.

Multiple Input Multiple Output (MIMO) systems with several transmit and several receive antennas are able to realize a capacity increase in rich scattering environments. Space-Time coding is an important class of MIMO communication techniques that achieve a high quality-of-service over frequency-flat flat fading channels by introducing both temporal and spatial correlation between the transmitted signals. It has already been combined with single-carrier block transmission to achieve maximum diversity gains over frequency-selective fading. Up till now however focus was mainly on single-user point-to-point communication links.

IV. DETAILED STATE OF THE ART

The main drivers toward future broadband cellular systems, like high-speed wireless internet access and mobile multimedia, require much higher data rates in the downlink (from base to mobile station) than in the uplink (from mobile to base station) direction. Given the asymmetric nature of most of these broadband services, the capacity and performance bottlenecks clearly reside in the downlink of these future systems. Broadband cellular downlink communications poses three main challenges to successful transceiver design. First, for increasing data rates, the underlying multi-path channels become more time-dispersive, causing Inter-Symbol Interference (ISI) and Inter-Chip Interference (ICI), or equivalently frequency-selective fading. Second, due to the increasing success of future broadband services, more users will try to access the common network resources, causing Multi-User Interference (MUI). Both ISI/ICI and MUI are important performance limiting factors for future broadband cellular systems, because they determine their capabilities in dealing with high data rates and system loads, respectively. Third, cost, size and power consumption issues put severe constraints on the receiver complexity at the mobile.

Multi-Carrier (MC) CDMA has recently gained increased momentum as candidate air interface for future broadband cellular systems, because it combines the advantages of CDMA with those of Orthogonal Frequency Division Multiplexing (OFDM). Indeed, OFDM enables high data rate transmissions missions by combatting ISI in the frequency-domain. Three different flavours of MC-CDMA exist, depending on the exact position of the CDMA and the OFDM component in the transmission scheme. The first variant, called MC-CDMA, performs the spreading operation before the symbol blocking (or serial-to-parallel conversion), which results in a spreading of the information symbols across the different subcarriers. However, like classical DS-CDMA, MC-CDMA does not exploit full frequency diversity gains, and requires receive diversity to ameliorate deal with the effects caused by deep channel fades. The second variant, called MC-DS-CDMA, executes the spreading operation after the symbol blocking, resulting in a spreading of the information symbols along the time axis of the different sub-carriers carriers. However, like classical OFDM, MC-DS-CDMA necessitates bandwidth consuming Forward Error Correction (FEC) coding plus frequency-domain interleaving to mitigate frequency-selective fading. Finally, Multi-Tone (MT) DS-CDMA, performs the spreading after the OFDM modulation, such that the resulting spectrum of each subearrier no longer satisfies the orthogonality condition. Hence, MT-DS-CDMA suffers from ISI, Inter-Tone Interference (ITI), as well as MUI, and requires expensive multi-user detection techniques to achieve a reasonable performance. Alternatively, MUI-free MC transceivers, like AMOUR and Generalized Multi-Carrier (GMC) CDMA [G. B. Giannakis, Z. Wang, A. Scaglione, and S. Barbarossa, "AMOUR—Generalized Multicarrier Transceivers for Blind CDMA Regardless of Multipath", IEEE Transactions on Communications, vol. 48, no. 12, pp. 2064-2076, December 2000], rely on Orthogonal Frequency Division Multiple Access (OFDMA) to retain the orthogonality among users, regardless of the multi-path channel. However, they do not inherit the nice advantages of CDMA related to universal frequency reuse in a cellular network, like increased capacity and simplified network planning.

Space-time coding techniques, that introduce both temporal and spatial correlation between the transmitted signals, are capable of supporting reliable high-data-rate communications without sacrificing precious bandwidth resources. Originally developed for frequency-flat fading channels, these techniques have recently been extended for frequency-selective fading channels [Y. Li, J. C. Chuang, and N. R. Sollenberger, "Transmitter diversity for OFDM systems and its impact on high-rate data wireless networks", IEEE Journal on Selected Areas in Communications, vol. 17, no. 7, pp. 1233-1243, July 1999]. However, up till now focus was mainly on point-to-point communication links, thereby neglecting the multiple access technique in the design of the transmission scheme.

Direct-Sequence (DS) Code Division Multiple Access (CDMA) has emerged as the predominant air interface technology for the 3G cellular standard, because it increases capacity and facilitates network planning in a cellular system, compared to convential multiple access techniques like Frequency Divisin Multiple Access (FDMA) and Time Division Multiple Access (TDMA). Traditional Code Division Multiple Access (CDMA) systems, that employ a single antenna at both ends of the wireless link, rely on the orthogonality of the spreading codes to separate the different user signals in the downlink. For increasing chip rates the time-dispersive nature of the multi-path channel destroys however the orthogonality between the user signals, giving rise to Multi-User Interference (MUI). Single-Carrier Block Transmission (SCBT) DS-CDMA retains the orthogonality of the spreading codes regardless of the underlying multi-path channel. However, the spectral efficiency and hence the user data rate of SCBT-DS-CDMA systems is limited by the received signal-to-noise ratio. On the other hand, Multiple Input Multiple Output (MIMO) systems that employ $M_t$ transmit and $M_r$ receive antennas, realize an $M_{min}$-fold capacity increase in rich scattering environments, where $M_{min}=\min\{M_t, M_r\}$ is called the multiplexing gain. Space-Time Block Coding (STBC) is an important class of MIMO communication techniques that achieve high Quality of Service (QoS) over frequency-flat fading channels by introducing both temporal and spatial correlation between the transmitted signals. Time Reversal (TR) STBC has recently been combined with Single-Carrier Block Transmission (SCBT) to achieve maximum diversity gains over frequency-selective fading channels [N. Al-Dhahir, "Single-carrier frequency-domain equalization for space-time block-coded transmissions over frequency-selective fading channels", IEEE Communications Letters, vol. 5. no. 7, pp. 304-306, July 2001]. However, up till now focus was mainly on single-user point-to-point communication links, thereby neglecting the multiple access technique in the design of the transmission scheme.

Code Division Multiple Access (CDMA) systems rely on the orthogonality of the spreading codes to separate the different user signals in the downlink. For increasing chip rates the time-dispersive nature of the multi-path channel destroys however the orthogonality between the users, giving rise to multi-user interference (MUI). For conventional Direct-Sequence (DS) CDMA systems, chip-level equalization has been shown to completely or partially restore the orthogonality and suppress the MUI. However, DS-CDMA chip-level equalization requires multiple receive antennas (two for chip rate sampling in a single-cell context) to guarantee a Zero-Forcing (ZF) solution under some weak constraints on the channel. On the other hand, Single-Carrier Block Transmission (SCBT) DS-CDMA, leading to a Chip-Interleaved Block-Spread (CIBS) CDMA transmission [S. Zhou, G. B. Giannakis, and C. Le Martret, "Chip-Interleaved Block-Spread Code Division Multiple Access", IEEE Transactions on Communications, vol. 50, no. 2, pp. 235-248, February 2002], only requires a single receive antenna because it effectively deals with the frequency-selectivity of the channel through Zero Padding (ZP) the chip blocks. Moreover, SCBT-DS-CDMA preserves the orthogonality of the user signals regardless of the underlying multi-path channel which enables deterministic Maximum Likelihood (ML) multi-user separation through low-complexity code-matched filtering. Increased equalization flexibility and reduced complexity are other benign properties that favor SCBT-DS-CDMA for broadband downlink transmission compared to conventional DS-CDMA. However, the equalizer coefficients are calculated based on exact or approximate channel knowledge with the latter being obtained from either a subspace-based or a finite-alphabet-based channel estimator. This approach leads to a high computational burden in a mobile system setup where the time-varying multi-path channel requires frequent recalculation of the equalizer coefficients.

In the downlink of traditional Single Input Single Output (SISO) DS-CDMA systems that employ a single antenna at both ends of the wireless link, the different user signals are synchronously multiplexed with short orthogonal spreading codes that are user specific and a long overlay scrambling code that is base station specific. The Multi-User Interference (MUI) experienced by a particular mobile station is essentially caused by the multi-path channel, that destroys the orthogonality of the user signals. Chip-level equalization followed by descrambling and despreading effectively copes with the MUI by restoring the orthogonality between the user signals. Practical training-based and semi-blind methods for direct chip equalizer estimation exploit the presence of either code-multiplexed or time-multiplexed pilot symbols. However, the spectral efficiency and hence the user data rate of traditional SISO DS-CDMA systems is limited by the received signal-to-noise ratio. On the other hand, Multiple Input Multiple Output (MIMO) systems that employ $M_T$ transmit and $M_R$ receive antennas, realize an $M_{min}$-fold capacity increase in rich scattering environments, where $M_{min}=\min\{M_T, M_R\}$ is called the multiplexing gain. Spatial multiplexing, a.k.a. BLAST, is a MIMO communication technique that achieves high spectral efficiencies by transmitting independent data streams from the different transmit antennas. Zero Forcing (ZF) and Minimum Mean Squared Error (MMSE) detection algorithms for narrowband point-to-point D-BLAST and V-BLAST communication architectures have been considered. These results are extended for wideband point-to-multipoint MIMO channels in [H. Huang, H. Viswanathan, and G. J. Foschini, "Achieving high data rates in CDMA systems using BLAST techniques", Proceedings of GLOBECOM, November 1999, vol. 5, pp. 2316-2320, IEEE], combining DS-CDMA with BLAST techniques for the cellular downlink. The receiver structure proposed in there uses a generalization of the V-BLAST algorithm based on the space-time decorrelating multi-user detector to deal with the MUI. However, since this receiver algorithm does not effectively exploit the structure of the downlink problem, it comes at a very high cost which can hardly be justified for the mobile station.

V. AIMS OF THE INVENTION

The present invention aims to provide a method and device for Wideband Code Division Multiple ple Access (WCDMA) wireless communication that preserves the orthogonality among users and guarantees symbol detection regardless of the frequency-selective fading channels.

VI. SUMMARY OF THE INVENTION

The invention relates to a method for multi-user wireless transmission of data signals in a communication system having at least one base station and at least one terminal. It comprises, for a plurality of users, the following steps:
- adding robustness to frequency-selective fading to said data to be transmitted,
- performing spreading and scrambling of at least a portion of a block of data, obtainable by grouping data symbols by demultiplexing using a serial-to-parallel operation,
- combining (summing) spread and scrambled portions of said blocks of at least two users,
- adding transmit redundancy to said combined spread and scrambled portions, and
- transmitting said combined spread and scrambled portions with transmit redundancy.

Preferably the spreading and scrambling operation is performed by a code sequence, obtained by multiplying a user (terminal)-specific code and a base station specific scrambling code.

Preceding the steps mentioned above, the step can be performed of generating a plurality of independent block portions.

The method can also start with the step of generating block portions.

Advantageously all the steps are performed as many times as there are block portions, thereby generating streams comprising a plurality of combined spread and scrambled block portions.

In a specific embodiment, between the step of combining and the step of transmitting said spread and scrambled portions, the step is comprised of encoding each of said streams.

More specifically, the step is comprised of space-time encoding said streams, thereby combining info from at least two of said streams.

Even more specifically the step of space-time encoding the streams is performed by block space-time encoding or trellis space-time encoding. For further details about trellis coding, reference is made to U.S. patent application No. U.S. Pat. Nos. 09/507,545, 10/354,262, 10/151,700, filed respectively on Feb. 18, 2000, Feb. 28, 2003 and May 17, 2002 which are hereby incorporated in its/their entirety by reference.

In an alternative embodiment, the step of inverse subband processing is comprised between the step of combining and the step of transmitting the spread and scrambled portions.

In an advantageous embodiment the step of adding robustness to frequency-selective fading is performed by adding linear precoding.

Alternatively, the step of adding robustness to frequency-selective fading is performed by applying adaptive loading per user.

In a typical embodiment the step of combining spread and scrambled block portions includes the summing of a pilot signal.

In the method of the invention the step of adding transmit redundancy comprises the addition of a cyclic prefix, a zero postfix or a symbol postfix.

The invention also relates to a transmit system device for wireless multi-user communication, applying the method here described.

Another object of the invention relates to a transmit apparatus for wireless multi-user communication, comprising:
- Circuitry for grouping data symbols to be transmitted,
- Means for applying a spreading and scrambling operation to said grouped data symbols,
- Circuitry for add transmit redundancy to said spread and scrambled grouped data symbols,
- At least one transmit antenna for transmitting said spread and scrambled grouped data symbols with transmit redundancy.

In a specific embodiment the transmit apparatus also comprises means for adding robustness to frequency-selective fading to the grouped data symbols.

In a preferred embodiment the transmit apparatus also comprises a space-time encoder.

In another preferred embodiment the transmit apparatus also comprises circuits for inverse subband processing.

The invention also relates to a method for receiving at least one signal in a multi-user wireless communication system having at least one base station and at least one terminal, comprising the steps of
- Receiving a signal from at least one antenna,
- Subband processing of a version of said received signal,
- Separating the contributions of the various users in said received signal,
- Exploiting the additional robustness to frequency-selective fading property of said received signal.

In a particular embodiment the step of separating the contributions consists in first filtering at chip rate at least a portion of the subband processed version of said received signal and then despreading.

In another particular embodiment the step of separating the contributions consists in first despreading and then filtering at least a portion of the subband processed version of said received signal.

In a typical embodiment the step of receiving a signal is performed for a plurality of antennas, thereby generating data streams and wherein the step of subband processing is performed on each of said data streams, yielding a subband processed version of said received signal.

In a specific embodiment the additional step of space-time decoding is performed on each of the streams.

To be even more precise the step of space-time decoding can be performed by block decoding or trellis decoding.

In another embodiment the additional step of inverse subband processing is performed on at least one filtered, subband processed version of the received signal.

Preferably the step of filtering is carried out by a filter of which the coefficients are determined in a semi-blind fashion or in a training-based way.

In another embodiment the step of filtering is carried out by a filter of which the filter coefficients are determined without channel estimation.

Advantageously the step of filtering at chip rate is carried out by a filter of which the filter coefficients are determined such that one version of the filtered signal is as close as possible to a version of the pilot symbol.

More in particular, the version of the filtered signal is the filtered signal after despreading with a composite code of the base station specific scrambling code and the pilot code and wherein the version of the pilot symbol is the pilot symbol itself, put in per tone ordering.

In another particular embodiment the version of the filtered signal is the filtered signal after projecting jecting on the orthogonal complement on the subspace spanned by the composite codes of the base station specific scrambling code and the user specific codes. The version of the pilot symbol is the pilot symbol spread with a composite code of the base station specific scrambling code and the pilot code, and put in per tone ordering.

Typically, the additional step of removing transmit redundancy is performed.

In a particular embodiment the additional robustness to fading is exploited by linear de-precoding.

The invention also relates to a receive system device for wireless multi-user communication, applying the method as described above.

Another object of the invention relates to a receiver apparatus for wireless multi-user communication, comprising:
A plurality of antennas receiving signals,
A plurality of circuits adapted for subband processing of said received signals,
Circuitry being adapted for determining by despreading an estimate of subband processed symbols received by at least one user.

In an embodiment the circuitry adapted for determining an estimate of symbols comprises a plurality of circuits for inverse subband processing.

In a specific embodiment the circuitry adapted for determining an estimate of symbols further comprises a plurality of filters to filter at least a portion of a subband processed version of said received signals.

Even more specifically the filtering is performed at chip rate.

Finally, the apparatus further comprises a space-time decoder.

VIII. SHORT DESCRIPTION OF THE DRAWINGS

IX. DETAILED DESCRIPTION OF THE INVENTION

Figure 1:
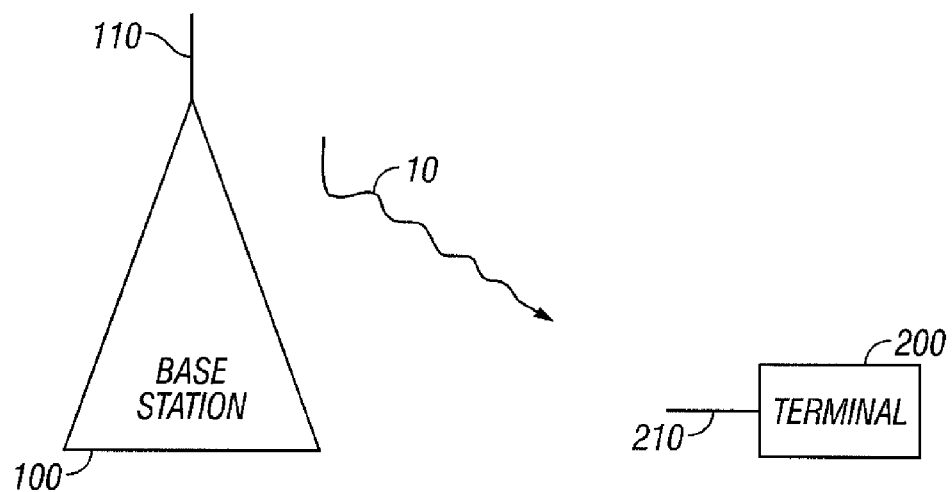
FIG. 1 represents a telecommunication system in a single-cell configuration.
Figure 2:
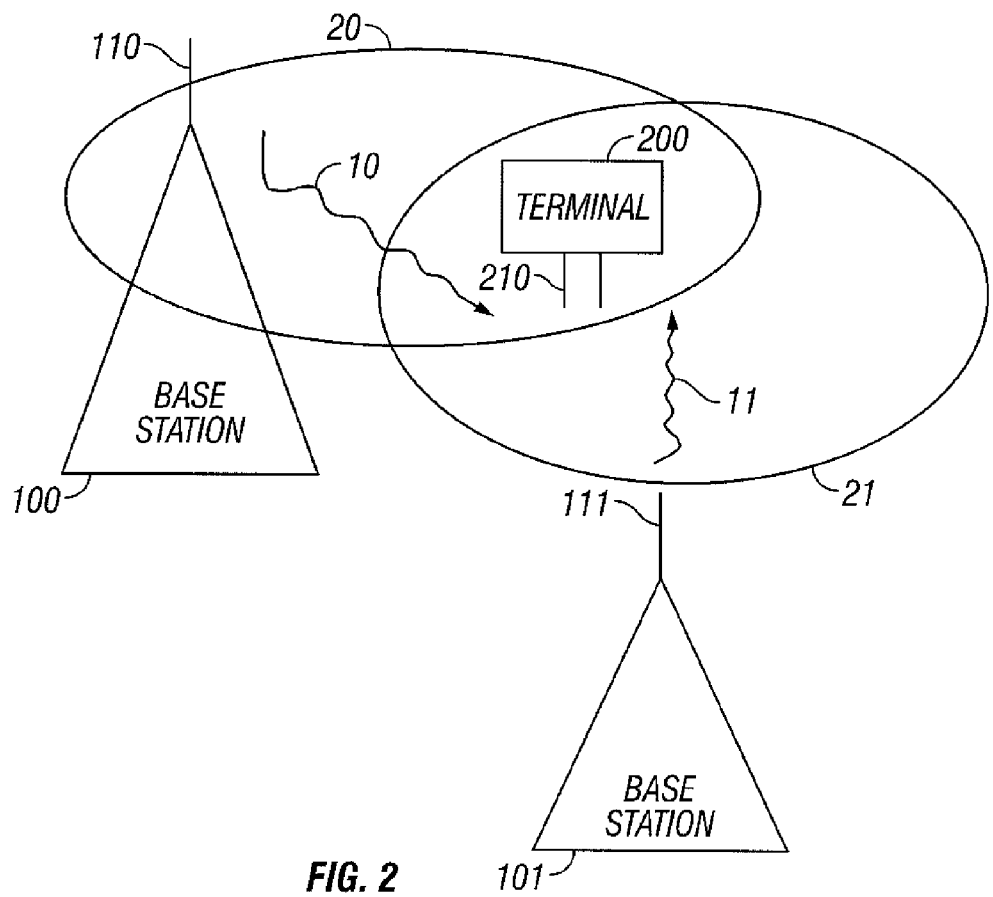
FIG. 2 represents a telecommunication system in a multiple-cell configuration.

In the invention methods for W-CDMA wireless communication between devices and the related devices are presented (FIG. 1). In the communication system at least data (10) is transmitted from at least one base station (100) to at least one terminal (200). The communication method is extendable to a case with a plurality of base stations (FIG. 2, 100, 101), each base station being designed for covering a single cell (FIG. 2, 20, 21) around such base station. In such multiple base station and hence multicell case a terminal receives typically signals from both the most nearby base station and other base stations. Within the method it is assumed that the base station has at least one antenna (110) and the terminal also has at least one physical antenna (210). The communication between the base station(s) and the terminal is designed such that said communication is operable in a context with multiple terminals. Hence it is assumed that substantially simultaneous communication between said base station(s) and a plurality of terminals is taking place, while still being able to distinguish at the terminal side which information was intended to be transmitted to a dedicated terminal.

The notion of a user is introduced. It is assumed that with each terminal in such a multi-terminal context at least one user is associated. The invented communication method and related devices exploit spreading with orthogonal codes as method for separating information streams being associated with different users. Hence at the base station side information, more in particular data symbols, of different users, hence denoted user specific data symbols are available. After spreading spread user specific data symbols are obtained. These spread user specific data symbols are added, leading to a sum signal of spread user specific data symbols. Further additional scrambling of said sum signal is performed by a scrambling code being base station specific. Symbols obtained after spreading or spreading and scrambling, and summing are denoted chip symbols. In the invented communication method blocks with a plurality of said chip symbols are transmitted. In a single base station case the transmitted signal thus comprises a plurality of time overlapped coded signals, each coded signal being associated to an individual user and distinguishable only by a user specific encoding, based on the user signature or spreading codes. In a multiple base station context, the distinguishing also exploits said base station specific code. Further such blocks have at least one pilot symbol (also called training sequence), being predetermined and known at both sides of the transmission link.

In many embodiments of the invented method the availability of a receiver being capable of generating at least two independent signals from a received signal is foreseen. Said receiver receives a spread-spectrum signal, corresponding to a superposition of the signals of all users active in the communication system or link, more in particular said superposition of signals is channel distorted. Said generation of at least two independent signals can be obtained by having at least two antennas at the terminal, each independent signal being the signal received at such antenna after the typical down-converting and filtering steps.

In case of a single antenna terminal, polarization diversity of said single antenna can be exploited or the temporal oversampling of the transmitted signal can be used. Because of the time-dispersive nature of the multi-path channel the independent signals are channel distorted versions of the signal transmitted by the base station(s). Alternatively it can be stated that the receiver or front-end circuitry provides for samples, typically complex baseband samples for a plurality of channels (either via different antennas or via polarization diversity or oversampling) in digital format.

Recall that the invention exploits spreading with orthogonal codes for separating different users. Unfortunately said channel distortion is destroying the orthogonality of the used codes, leading to a bad separation. This problem is known as multi-user interference (MUI). Hence it is a requirement for the method of the invention to allow retrieval of a desired user's symbol sequence from a received signal transmitted in a communication context with severe multi-user interference. An additional aid in achieving this goal can come from the use of transmit redundancy. Applying transmit redundancy helps to remove or at least to weaken the effect of the time dispersion of the multi-path channel. A well known example of this is the addition of a cyclic prefix in a multi-carrier system. The method of the invention comprises a step of inputting or receiving said received signal, being a channel distorted version of a transmitted signal comprising a plurality of user data symbol sequences, each being encoded with a known, user specific code.

The multi-channel propagation also gives rise to multipath fading, which generally exhibits both frequency-selectivity and time-selectivity. The phenomenon can give rise to serious performance degradation and constitutes a bottleneck for higher data rates. Frequency-selective fading can be tackled in several ways, as is discussed below.

In the method of the invention the multi-user interference is suppressed by performing operations on the chip symbols. This multi-user interference suppression is obtained by combining said independent signals resulting in a combined filtered signal. In an embodiment of the invention said combining, also denoted chip-level equalization, is a linear space-time combining. For said combining a combiner filter (chip-level equalizer) is used. The (chip-level equalization) filter coefficients of said combiner filter are determined directly from said independent signals, hence without estimating the channel characteristics. One can state that from said independent signals in a direct and deterministic way a chip-level equalization filter is determined. Said chip-level equalization filter is such that said transmitted signal is retrieved when applying said filter to said received signal.

In the approach of the invention, all system parameters are chosen such that the orthogonality between the various users is maintained, i.e., the MUI is combated in the most efficient way. To obtain that goal, orthogonal user specific spreading codes are used, a block spreading operation is applied to the symbols, and transmit redundancy is added such that the time dispersion is absorbed sufficiently. A block spreading operation is realized by converting a symbol sequence into blocks by a serial-to-parallel conversion. In this way, the various users can properly be decoupled. In order to enhance each user's robustness against deep fading effects, one additionally applies techniques like linear precoding (as illustrated by (1)) or adaptive loading. The linear precoder is selected to guarantee symbol detectability (for instance by setting a condition as given by (14)).

In case channel state information is available at the transmitter, e.g., for stationary or low-speed users, multicarrier transmission allows to apply adaptive loading to exploit the inherent frequency diversity of the channel without adding extra redundancy. Since the different users are perfectly decoupled, adaptive loading can be performed on a per user basis, such that for every user the optimal transmit spectrum can be obtained without having to bother about the presence of other users. In specific, adaptive loading assigns more information (through higher order constellations) and more power to the good subcarriers (with a high channel gain) while less information (through lower order constellations) and less power, or even none at all, is assigned to the bad subcarriers (with a low channel gain).

In case no channel state information is available at the transmitter, e.g., for medium- to high-speed users, linear precoding can be applied to robustify the transmission against frequency-selective fading. Specifically, at the transmitter, the information symbols are linearly precoded on a subset of subcarriers, while adding some well-defined redundancy, such that the information symbols can always be uniquely recovered from this subset, even if some of the subcarriers are in a deep channel fade. At the receiver, the available frequency diversity is then exploited by performing either joint or separate equalization and decoding.

Figure 3:
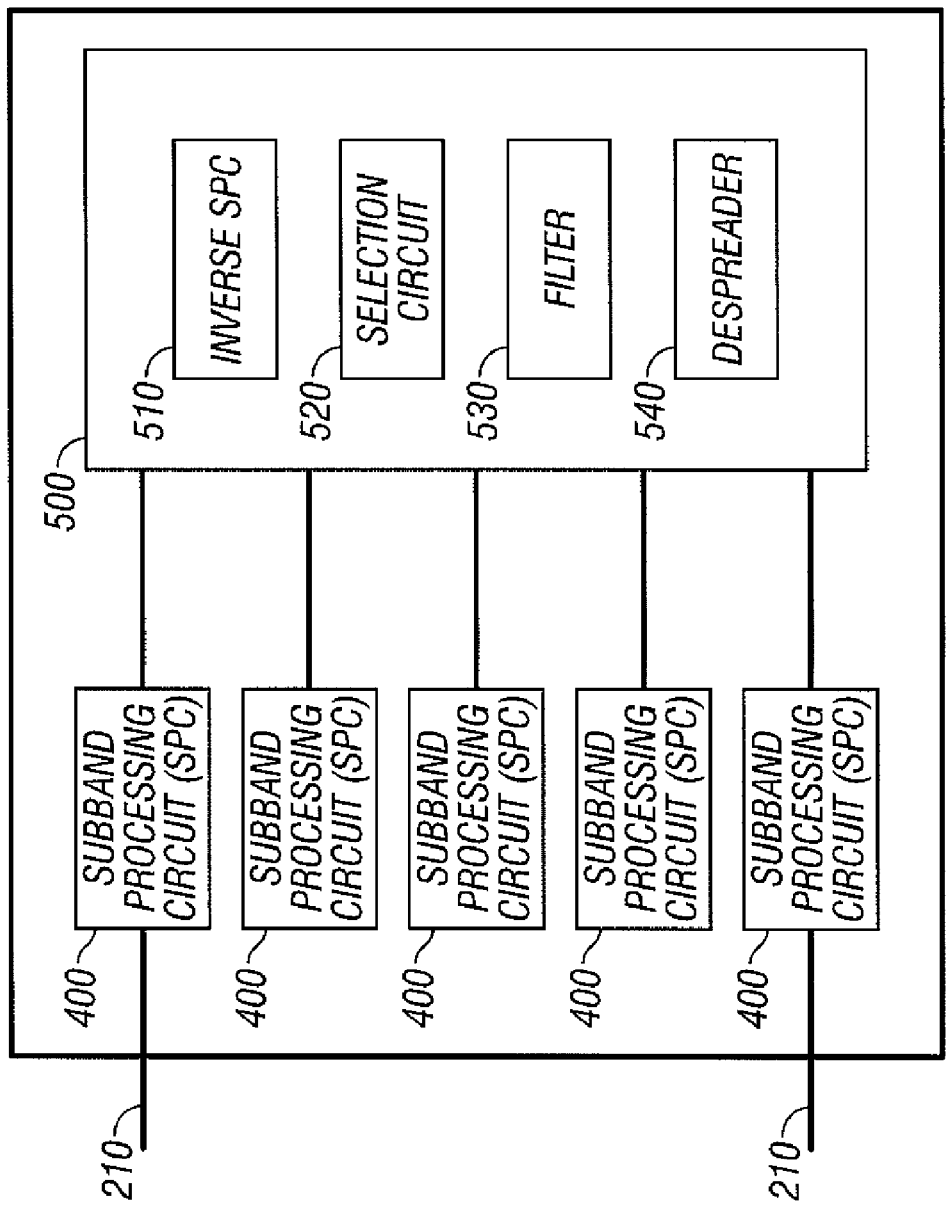
FIG. 3 represents a block diagram of a receiver structure.

FIG. 3 shows a general scheme of a receiver system. The elements presented there are used in various combinations in the embodiments described below. One or preferably several antennas (210) are foreseen for receiving signals. Next circuits (400) are provided to apply a subband processing to said received signals. The subband processed receive signals are then applied to a block (500) adapted for determining an estimate of the data symbols of at least one user. Hereby use can be made of several other functional blocks, performing the tasks of inverse subband processing (510), removing robustness added to the transmitted symbols in order to provide protection against frequency-selective fading (520), filtering (530) and/or despreading (540). Which operations are effectively applied and in which order highly depends on the specific embodiment. More details are given below.

Figure 4:
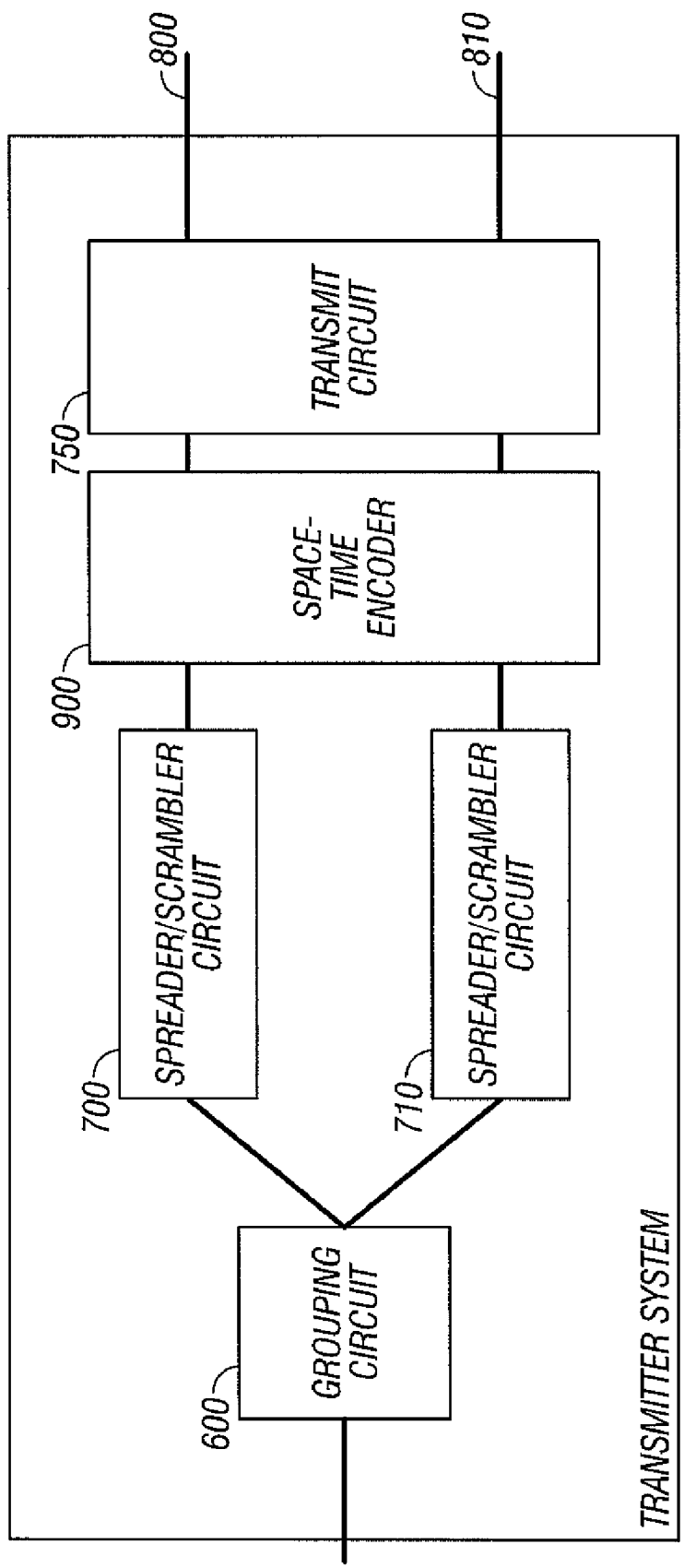
FIG. 4 represents a block diagram of a transmitter structure.

FIG. 4 shows a general scheme of a transmitter system, comprising circuitry for at least grouping data symbols into blocks (600), at least one means (700) (710) for applying a spreading and scrambling operation to said grouped data symbols and transmit circuitry (750) and at least one transmit antenna (800) (810). Optionally a space-time encoder (900), combining the outcome of a plurality of said spreading and scrambling means (700)(710) is available. Said transmit circuitry can further comprise of inverse subband processing means.

Subband processing of a data signal having a data rate, comprises in principle of splitting said data signal in a plurality of data signals, with a lower data rate and modulating each of said plurality of data signals with another carrier. Said carriers are preferably orthogonal. In an embodiment said subband processing of a data signal can be realized by using serial-to-parallel convertors and using a transformation on a group of data samples of said data signal. For further details about subband coding, reference is made to U.S. patent application No. U.S. Pat. No. 09/552,150 filed on Apr. 18, 2000, which is hereby incorporated in its/their entirety by reference. For further details about an OFDM system, using an IFFT as subband coding and FFT for inverse subband coding, reference is made to U.S. patent application No. U.S. Pat. No. 09/505,228 filed on Feb. 16, 2000, which is hereby incorporated in its/their entirety by reference.

In a first embodiment of the invention a multi-carrier block-spread CDMA transceiver is disclosed that preserves the orthogonality between users and guarantees symbol detection. In this approach the M user data symbol sequences are transformed into a multi-user chip sequence. Apart from the multiplexing and the inverse subband processing three major operations are performed: linear precoding, block spreading and adding transmit redundancy. Each users data symbol sequence is converted into blocks and spread with a user specific composite code sequence being the multiplication of an orthogonal spreading code specific to the user and a base station specific scrambling code. The chip block sequences of other users are added and the resulting sum is IFFT transformed to the time domain. Then transmit redundancy is added to the chip blocks to cope with the time-dispersive effect of multi-path propagation. The sequence that comes out is then transmitted. At the receiver side perfect synchronization is assumed. In the mobile station of interest the operations corresponding to those at the transmitter side are performed. The added transmit redundancy is removed and a FFT operation is performed. The FFT output is despreaded with the desired users composite code sequence. This operation decouples the various users in the system, i.e. all MUI is succesfully eliminated. For each individual user an equalization filter is then provided. The equalizer filters can be designed for jointly equalizing and decoding or for separately performing said operations.

In a second embodiment of the invention space-time coding techniques, originally proposed for point-to-point communication links, are extended to point-to-multipoint communication links. The multiple access technique in the design of the transmission scheme is thereby taken into account. Each users data symbol sequence is converted into blocks. The resulting block sequence is then linearly precoded as to add robustness against frequency-selective fading. The precoded data are put on the various tones of a multi-carrier system. Next the blocks are demultiplexed into a number of parallel sequences. Each of the sequences is spread with the same user code sequence, being the multiplication of the user specific orthogonal spreading code and the base-station specific scrambling code. In each of the parallel streams the different user chip block sequences are added up together with the pilot chip block sequence. Then a block space-time encoding operation takes place. The space-time coding is implemented on each tone separately at the base station. In stead of a block space-time encoding also a trellis space-time encoding scheme may be envisaged. The usual multicarrier operations of inverse fast Fourier transforming and adding a cyclic prefix (by means of a transmit matrix T, as discussed in Paragraph IX-B.1.a) then follow in each stream before transmitting the signal. The cyclic prefix represents in this case said transmit redundancy. The mobile station of interest at the receiver side is equipped with multiple receive antennas. The operations corresponding to those at the transmitter side are performed on each of the received signals, starting with the cyclic prefix removal and the FFT operation. The space-time block decoding operation is performed. The space-time decoded output is next re-ordered on a tone-per-tone base (for instance by means of permutation matrices, as illustrated in (44)). Next per-tone chip equalization is applied. The filter coefficients can be determined in a training based or in a semi-blind way. In the training-based approach one relies on the knowledge of a pilot symbol. The equalizer coefficients are determined such that the equalized output after despreading is as close as possible to a version of the pilot symbol, being the pilot symbol itself, put in per tone ordering. In the semi-blind approach one relies not only on the knowledge of said pilot symbol, but also on characteristics of the codes. The equalizer filter output is projected on the orthogonal complement on the subspace spanned by the composite codes of the various users (i.e. the codes resulting from the multiplication of the base station specific scrambling code and the user specific codes). This projected output must then be as close as possible to the pilot symbol spread with a composite code of the base station specific scrambling code and the pilot code, and put in per tone ordering. From the equalizer output the contribution of that specific user can easily be derived after removing the additional robustness against deep fading. Examples of filter coefficient determination are given by formulas (56), (58), (77), (78), wherein closeness is determined in terms of a mean squared error norm.

In a third embodiment the base station again has multiple transmit antennas, but data are transmitted on a single carrier. The data symbol sequence is demultiplexed into several streams, which subsequently are converted into symbol blocks that are spread with the same user composite code sequence being the multiplication of the user specific orthogonal spreading code and the base station specific scrambling code. The pilot chip block sequence is added to the different user chip block sequences. The chip blocks output by said encoder are padded with a zero postfix (by means of a transmit matrix $T_{zp}$ as discussed in Paragraph IX-C.1.a), parallel-to-serial converted and sent to the transmit antenna. Said postfix provides transmit redundancy. The receiver is again equipped with multiple receive antennas. Suppose the mobile station of interest has acquired perfect synchronization. After conversion into chip blocks the data on each receive antenna are block space-time decoded. Each decoded block is transformed into the frequency domain. The per receive antenna ordering is transformed into a per tone ordering. Then again a per tone chip level equalization can be performed. After re-transforming to the time domain and removal of the zero postfix, finally yield an estimation of the desired users transmitted data symbols.

In a fourth embodiment the base station has a single transmit antenna, whereas the mobile station of interest may have multiple receive antennas. Each users data symbol sequence is converted into symbol blocks and spread with the user composite code sequence, being the multiplication of a user specific and a base station specific scrambling code. The pilot symbol is treated in the same way. The different user chip block sequences and the pilot chip block sequence are added. At the end of each block a number of zeros are padded. Also a known symbol postfix, the length of which is the same as the number of zeros padded, is added to each block. After P/S conversion the chip sequence is transmitted. At the receiver side the mobile station of interest is equipped with multiple antennas and has acquired perfect synchronisation. Assuming the known symbol postfix is long enough, there is no inter-block interference present in the received signal. After transformation into the frequency domain a per tone chip equalizer filter is foreseen for each antenna. By transforming back into the time domain and removing the known symbol postfix the desired users symbols can be retrieved.

In a fifth embodiment only spatial multiplexing is applied and no space-time block coding. Since spatial multiplexing combined with DS-CDMA leads to an increase of the amount of multi-user interference (as many times as there are transmit antennas), linear chip level equalization does not suffice to efficiently deal with the induced MUI. The multi-user receiver consists of an initial linear space-time chip-level equalization stage and possibly multiple non-linear space-time parallel interference cancellation stages with space-time RAKE combining.

Below various embodiments of the invention are described. The invention is not limited to these embodiments but only by the scope of the claims.

A. EMBODIMENT

A.1 Transceiver Design

Given the asymmetric nature of broadband services requiring much higher data rates in downlink than in uplink direction, we focus on the downlink bottleneck of future broadband cellular systems. Our goal is to design a transceiver that can cope with the three main challenges of broadband cellular downlink communications. First, multi-path propagation gives rise to time dispersion and frequency-selective fading causing ISI and ICI, which limit the maximum data rate of a system without equalization. Second, multiple users trying to access common network resources may interfere with each other, resulting in MUI, which upperbounds the maximum user capacity in a cellular system. Specific to DS-CDMA downlink transmission, the MUI is essentially caused by multi-path propagation, since it destroys the orthogonality of the user signals. Third, cost, size and power consumption issues put severe constraints on the receiver complexity at the mobile.

We consider a single cell of a cellular system with a Base Station (BS) serving M active Mobile Stations (MSs) within its coverage area. For now, we limit ourselves to the single-antenna case and defer the multi-antenna case to Section IX-A.3.

Figure 5:
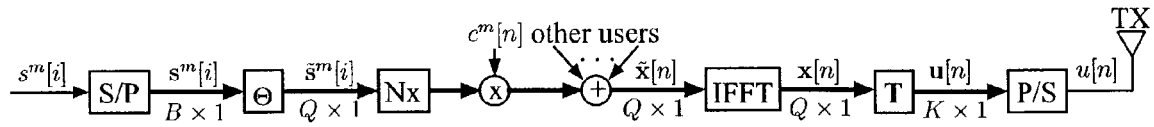
FIG. 5 represents the Multi-Carrier Block-Spread CDMA downlink transmission scheme.

A.1.a Multi-Carrier Block-Spread CDMA Transmission. The block diagram in FIG. 5 describes the Multi-Carrier Block-Spread (MCBS) CDMA downlink transmission scheme (where only the m-th user is explicitly shown), that transforms the M user data symbol sequences $$\{s^m[i]\}_{m=1}^M$$

into the multi-user chip sequence u[n] with a rate $$\frac{1}{T_c}.$$

Apart from the user multiplexing and the IFFT, the transmission scheme performs three major operations, namely linear precoding, block spreading, and adding transmit redundancy. Since our scheme belongs to the general class of block transmission schemes, the m-th user's data symbol sequence $s^m[i]$ is first serial-to-parallel converted into blocks of B symbols, leading to the symbol block sequence $s^m[i]:=[s^m[iB], \ldots, s^m[(i+1)B-1]]^T$. The blocks $s^m[i]$ are linearly precoded by a Q×B matrix Θ to yield the Q×1 precoded symbol blocks:

$$\tilde{s}^m[i]:=\Theta \cdot s^m[i], \qquad (1)$$

where the linear precoding can be either redundant (Q>B) or non-redundant (Q=B). For conciseness, we limit our discussion to redundant precoding, but the proposed concepts apply equally well to non-redundant precoding. As we will show later, linear precoding guarantees symbol detection and maximum frequency-diversity gains, and thus robustifies the transmission against frequency-selective fading. Unlike the traditional approach of symbol spreading that operates on a single symbol, we apply here block spreading that operates on a block of symbols. Specifically, the block sequence $\tilde{s}^m[i]$ is spread by a factor N with the user composite code sequence $c^m[n]$, which is the multiplication of a short orthogonal Walsh-Hadamard spreading code that is MS specific and a long overlay scrambling code that is BS specific. The chip block sequences of the different active users are added, resulting into the multi-user chip block sequence:

$$\tilde{x}[n] = \sum_{m=1}^{M} \tilde{s}^m[i]c^m[n], \qquad (2)$$

where the chip block index n is related to the symbol block index i by: n=iN+n', n'∈{0, . . . , N−1}. As will become apparent later, block spreading enables MUI-resilient reception, and thus effectively deals with the MUI. Subsequently, the Q×Q IFFT matrix $F_Q^H$ transforms the Frequency-Domain (FD) chip block sequence $\tilde{x}[n]$ into the Time-Domain (TD) chip block sequence: $x[n]=F_Q^H \cdot \tilde{x}[n]$. The K×Q transmit matrix T, with K≧Q adds some redundancy to the chip blocks x[n]: u[n]:=T·x[n]. As will be clarified later, this transmit redundancy copes with the time-dispersive effect of multi-path propagation and also enables low-complexity equalization at the receiver. Finally, the resulting transmitted chip block sequence u[n] is parallel-to-serial converted into the corresponding scalar sequence $[u[nK], \ldots, u[(n+1)K-1]]^T:=u[n]$ and transmitted over the air at a rate $$\frac{1}{T_c}.$$

A.1.b Channel model. Adopting a discrete-time baseband equivalent model, the chip-sampled received signal is a channel-distorted version of the transmitted signal, and can be written as:

$$v[n] = \sum_{l=0}^{L_c} h[l]u[n-l] + w[n], \qquad (3)$$

where h[l] is the chip-sampled FIR channel that models the frequency-selective multi-path propagation between the transmitter and the receiver including the effect of transmit and receive filters, $L_c$ is the order of h[l], and w[n] denotes the additive gaussian noise, which we assume to be white with variance $\sigma_w^2$. Furthermore, we define L as a known upper-bound on the channel order: $L \geq L_c$, which can be well approximated by $$L \approx \left\lfloor \frac{\tau_{max}}{T_c} \right\rfloor + 1,$$

where $\tau_{max}$ is the maximum delay spread within the given propagation environment.

A.1.c MUI-Resilient Reception. The block diagram in FIG. 6 describes the reception scheme for the MS of interest (which we assume to be the m-th one), which transforms the received sequence v[n] into an estimate of the desired user's data symbol sequence $\hat{s}^m[i]$. Assuming perfect synchronization, the received sequence v[n] is serial-to-parallel converted into its corresponding block sequence $v[n]:=[v[nK], \ldots, v[(n+1)K-1]]^T$. From the scalar input/output relationship in (3), we can derive the corresponding block input/output relationship:

$$v[n] = H[0] \cdot u[n] + H[1] \cdot u[n-1] + w[n], \quad (4)$$

where $w[n]:=[w[nK], \ldots, w[(n+1)K-1]]^T$ is the noise block sequence, H[0] is a K×K lower triangular Toeplitz matrix with entries $[H[0]]_{p,q} = h[p-q]$, and H[1] is a K×K upper triangular Toeplitz matrix with entries $[H[1]]_{p,q} = h[K+p-q]$. The time-dispersive nature of multi-path propagation gives rise to so-called Inter-Block Interference (IBI) between successive blocks, which is modeled by the second term in (4). The Q×K receive matrix R again removes the redundancy from the blocks v[n]: $y[n]:=R \cdot v[n]$. The purpose of the transmit/receive pair (T, R) is twofold. First, it allows for simple block by block processing by removing the IBI. Second, it enables low-complexity frequency-domain equalization by making the linear channel convolution to appear circulant to the received block. To guarantee perfect IBI removal, the pair (T, R) should satisfy the following condition:

$$R \cdot H[1] \cdot T = 0. \quad (5)$$

To enable circulant channel convolution, the resulting channel matrix $\dot{H} := R \cdot H[0] \cdot T$ should be circulant. In this way, we obtain a simplified block input/output relationship in the TD:

$$y[n] = \dot{H} \cdot x[n] + z[n], \quad (6)$$

where $z[n]:=R \cdot w[n]$ is the corresponding noise block sequence. In general, two options for the pair (T, R) exist that satify the above conditions. The first option corresponds to Cyclic Prefixing (CP) in classical OFDM systems, and boils down to choosing K=Q+L, and selecting:

$$T = T_{cp} := [I_{cp}^T, I_Q^T]^T, \quad R = R_{cp} := [0_{Q \times L}, I_Q], \quad (7)$$

where $I_{cp}$ consists of the last L rows of $I_Q$. The circulant property is enforced at the transmitter by adding a cyclic prefix of length L to each block. Indeed, premultiplying a vector with $T_{cp}$ copies its last L entries and pastes them to its top. The IBI is removed at the receiver by discarding the cyclic prefix of each received block. Indeed, premultiplying a vector with $R_{cp}$ deletes its first L entries and thus satisfies (5).

The second option corresponds to Zero Padding (ZP), and boils down to setting K=Q+L, and selecting:

$$T = T_{zp} := [I_Q^T, 0_{Q \times L}^T]^T, \quad R = R_{zp} := [I_Q, I_{zp}], \quad (8)$$

where $I_{zp}$ is formed by the first L columns of $I_Q$. Unlike classical OFDM systems, here the IBI is entirely dealt with at the transmitter. Indeed, premultiplying a vector with $T_{zp}$ pads L trailing zeros to its bottom, and thus satisfies (5). The circulant property is enforced at the receiver by time-aliasing each received block. Indeed, premultiplying a vector with $R_{zp}$ adds its last L entries to its first L entries.

Referring back to (6), circulant matrices possess a nice property that enables simple per-tone equalization in the frequency-domain.

Property 1 Circulant matrices can be diagonalized by FFT operations:

$$\dot{H} = F_Q^H \cdot \tilde{H} \cdot F_Q, \quad (9)$$

with $$\tilde{H} := \mathrm{diag}(\tilde{h}), \tilde{h} := \left[ H(e^{j0}), H(e^{j\frac{2\pi}{Q}}), \ldots, H(e^{j\frac{2\pi}{Q}(Q-1)}) \right]$$

the FD channel response evaluated on the FFT grid, $$H(z) := \sum_{l=0}^{L} h[l] z^{-l}$$

the z-transform of h[l], and $F_Q$ the Q×Q FFT matrix. Aiming at low-complexity FD processing, we transform y[n] into the FD by defining $\tilde{y}[n]:=F_Q \cdot y[n]$. Relying on Property 1, this leads to the following FD block input/output relationship:

$$\tilde{y}[n] = \tilde{H} \cdot \tilde{x}[n] + \tilde{z}[n] \quad (10)$$

where $\tilde{z}[n]:=F_Q \cdot z[n]$ is the corresponding FD noise block sequence. Stacking N consecutive chip blocks $\tilde{y}[n]$ into $\tilde{Y}[i]:=[\tilde{y}[iN], \ldots, \tilde{y}[(i+1)N-1]]$, we obtain the symbol block level equivalent of (10):

$$\tilde{Y}[i] = \tilde{H} \cdot \tilde{X}[i] + \tilde{Z}[i], \quad (11)$$

where $\tilde{X}[i]$ and $\tilde{Z}[i]$ are similarly defined as $\tilde{Y}[i]$. From (2), we also have that:

$$\tilde{X}[i] = \sum_{m=1}^{M} \tilde{s}^m[i] \cdot c^m[i]^T, \quad (12)$$

where $c^m[i] := [c^m[N], \ldots, c^m[(i+1)N-1]]^T$ is the m-th user's composite code vector used to block spread its data symbol block $\tilde{s}^m[i]$. By inspecting (11) and (12), we can conclude that our transceiver preserves the orthogonality among users, even after propagation through a (possibly unknown) frequency-selective multi-path channel. This property allows for deterministic MUI elimination through low-complexity code-matched filtering. Indeed, by block despreading (11) with the desired user's composite code vector $c^m[i]$ (we assume the m-th user to be the desired one), we obtain:

$$\tilde{y}^m[i] := \tilde{Y}[i] \cdot \tilde{c}^m[i]^* = \tilde{H} \cdot \Theta s^m[i] + \tilde{z}^m[i], \quad (13)$$

where $\tilde{z}^m[i]:=\tilde{Z}[i]\cdot c^m[i]^*$ is the corresponding noise block sequence. Our transceiver succesfully converts (through block despreading) a multi-user chip block equalization problem into an equivalent single-user symbol block equalization problem. Moreover, the operation of block despreading preserves Maximum-Likelihood (ML) optimality, since it does not incur any information loss regarding the desired user's symbol block $s^m[i]$.

A.1.d Single-User Equalization. After succesfull elimination of the MUI, we still need to detect the desired user's symbol block $s^m[i]$ from (13). Ignoring for the moment the presence of $\Theta$ (or equivalently setting Q=B and selecting $\Theta=I_Q$), this requires $\tilde{H}$ to have full column rank Q. Unfortunately, this condition only holds for channels that do not invoke any zero diagonal entries in $\tilde{H}$. In other words, if the MS experiences a deep channel fade on a particular tone (corresponding to a zero diagonal entry in $\tilde{H}$), the information symbol on that tone can not be recovered. To guarantee symbol detectability of the B symbols in $s^m[i]$, regardless of the symbol constellation, we thus need to design the precoder $\theta$ such that:

$$\text{rank}(\tilde{H}\cdot\Theta)=B, \tag{14}$$

irrespective of the underlying channel realization. Since an FIR channel of order L can invoke at most L zero diagonal entries in $\tilde{H}$, this requires any Q−L=B rows of $\Theta$ to be linearly independent. Two classes of precoders have been constructed that satisfy this condition and thus guarantee symbol detectability or equivalently enable full frequency-diversity gain, namely the Vandermonde precoders and the cosine precoders. For instance, a special case of the general cosine precoder is a truncated Discrete Cosine Transform (DCT) matrix.

A.2 Equalization options

In this section, we discuss different options to perform equalization and decoding of the linear precoding, either jointly or separately. These options allow to trade-off performance versus complexity, ranging from optimal Maximum-Likelihood (ML) detection with exponential complexity to linear and decision-directed detection with linear complexity. To evaluate the complexity, we distinguish between the initialization phase, where the equalizers are calculated, and the data processing phase, where the actual equalization takes place. The rate of the former is related to the channel's fading rate, whereas the latter is executed continuously at the symbol block rate.

A.2.a ML detection. The ML algorithm is optimal in a Maximum Likelihood sense, but has a very high complexity. The likelihood function of the received block $\tilde{y}^m[i]$, conditioned on the transmitted block $s^m[i]$, is given by:

$$p(\tilde{y}^m[i]\mid s^m[i]) = \frac{1}{(\pi\sigma_w^2)^Q}\exp\left(-\frac{\|\tilde{y}^m[i]-\tilde{H}\cdot\Theta\cdot s^m[i]\|^2}{\sigma_w^2}\right). \tag{15}$$

Amongst all possible transmitted blocks, the ML algorithm retains the one that maximizes the likelihood function or, equivalently, minimizes the Euclidean distance:

$$\hat{s}^m[i] = \arg\min_{s^m[i]\in S}\|\tilde{y}^m[i]-\tilde{H}\cdot\Theta\cdot s^m[i]\|^2. \tag{16}$$

In other words, the ML metric is given by the Euclidean distance between the actual received block and the block that would have been received if a particular symbol block had been transmitted in a noiseless environment. The number of possible transmit vectors in S is the cardinality of S, i.e. $|S|=M^B$, with M the constellation size. So, the number of points to inspect during the data processing phase grows exponentially with the initial block length B. Hence, this algorithm is only feasible for a small block length B and a small constellation size M. Note that the ML algorithm does not require an initialization phase.

A.2.b Joint Linear Equalization and Decoding. Linear equalizers that perform joint equalization and decoding combine a low complexity with medium performance. A first possibility is to apply a Zero-Forcing (ZF) linear equalizer:

$$G_{ZF}=(\Theta^H\cdot\tilde{H}^H\cdot\tilde{H}\cdot\Theta)^{-1}\cdot\Theta^H\cdot\tilde{H}^H, \tag{17}$$

which completely eliminates the ISI, irrespective of the noise level. By ignoring the noise, it causes excessive noise enhancement, especially at low SNR. A second possiblity is to apply a Minimum Mean-Square-Error (MMSE) linear equalizer:

$$G_{MMSE}=\left(\Theta^H\cdot\tilde{H}^H\cdot\tilde{H}\cdot\Theta+\frac{\sigma_w^2}{\sigma_s^2}I_B\right)^{-1}\cdot\Theta^H\cdot\tilde{H}^H, \tag{18}$$

which minimizes the MSE between the actual transmitted symbol block and its estimate. The MMSE linear equalizer explicitly takes into account the noise variance $\sigma_w^2$ and the information symbol variance $\sigma_s^2$, and balances ISI elimination with noise enhancement. From (17) and (18), it is also clear that $G_{MMSE}$ reduces to $G_{ZF}$ at high SNR.

During the initialization phase, $G_{ZF}$ and $G_{MMSE}$ can be computed from the multiple sets of linear equations, implicitly shown in (17) and (18), respectively. The solution can be found from Gaussian elimination with partial pivoting, based on the LU decomposition, leading to an overall complexity of $\mathcal{O}(QB^2)$. During the data processing phase, the equalizers $G_{ZF}$ and $G_{MMSE}$ are applied to the received block $\tilde{y}^m[i]$, leading to a complexity of $\mathcal{O}(QB)$.

A.2.c Joint Decision Feedback Equalization and Decoding. On the one hand, the ML algorithm of Subsection IX-A.2.a achieves the optimal performance but with a very high complexity. On the other hand, the linear equalizers of Subsection IX-A.2.b offer a low complexity but at a relatively poor performance. The class of non-linear equalizers that perform joint decision feedback equalization and decoding lie in between the former categories, both in terms of performance and complexity. Decision feedback equalizers exploit the finite alphabet property of the information symbols to improve performance relative to linear equalizers. They consist of a feedforward section, represented by the matrix W, and a feedback section, represented by the matrix B:

$$\underline{\hat{s}}^m[i]=\text{slice}[W\cdot\tilde{y}^m[i]-B\cdot\underline{\hat{s}}^m[i]]. \tag{19}$$

The feedforward and feedback section can be designed according to a ZF or MMSE criterium. In either case, B should be a strictly upper or lower triangular matrix with zero diagonal entries, in order to feedback decisions in a causal way. To design the decision feedback counterpart of the ZF linear equalizer, we compute the Cholesky decomposition of the matrix $\Theta^H\cdot\tilde{H}^H\cdot\tilde{H}\cdot\Theta$ in (17):

$$\Theta^H\cdot\tilde{H}^H\cdot\tilde{H}\cdot\Theta=(\Sigma_1\cdot U_1)^H\cdot\Sigma_1\cdot U_1, \tag{20}$$

where $U_1$ is an upper triangular matrix with ones along the diagonal, and $\Sigma_1$ is a diagonal matrix with real entries. The ZF feedforward and feedback matrices then follow from:

$$W_{ZF}=U_1 \cdot G_{ZF}=\Sigma_1^{-1} \cdot (U_1^H \cdot \Sigma_1)^{-1} \cdot \Theta^H \cdot \tilde{H}^H, \quad B_{ZF}=U_1-I_B. \tag{21}$$

The linear feedforward section $W_{ZF}$ suppresses the ISI originating from "future" symbols, the so-called pre-cursor ISI, whereas the non-linear feedback section $B_{ZF}$ eliminates the ISI originating from "past" symbols, the so-called post-cursor ISI.

Likewise, to design the decision feedback counterpart of the MMSE linear equalizer, we compute the Cholesky decomposition of the matrix $$\Theta^H \cdot \tilde{H}^H \cdot \tilde{H} \cdot \Theta + \frac{\sigma_w^2}{\sigma_s^2} I_B \text{ in (18):}$$

$$\Theta^H \cdot \tilde{H}^H \cdot \tilde{H} \cdot \Theta + \frac{\sigma_w^2}{\sigma_s^2} I_B = (\Sigma_2 \cdot U_2)^H \cdot \Sigma_2 \cdot U_2, \tag{22}$$

where $U_2$ is an upper triangular matrix with ones along the diagonal, and $\Sigma_2$ is a diagonal matrix with real entries. The MMSE feedforward and feedback matrices can then be calculated as:

$$W_{MMSE} = U_2 \cdot G_{MMSE} = \sum_2^{-1} \cdot \left(U_2^H \cdot \sum_2\right)^{-1} \cdot \Theta^H \cdot \tilde{H}^H, \tag{23}$$

$$B_{MMSE} = U_2 - I_B.$$

During the initialization phase, the feedforward and feedback filters are computed based on a Cholesky decomposition, leading to an overall complexity of $\mathcal{O}(QB^2)$. During the data processing phase, the feedforward and feedback filters are applied to the received data according to (19), leading to a complexity of $\mathcal{O}(QB)$. Note that the decision feedback equalizers involve the same order of complexity as their linear counterparts.

A.2.d Separate Linear Equalization and Decoding. Previously, we have only considered joint equalization and decoding of the linear precoding. However, in order to even further reduce the complexity with respect to the linear equalizers of Subsection IX-A.2.b, equalization and decoding can be performed separately as well:

$$\tilde{s}^m[i]=\Theta^H \cdot \tilde{G} \cdot \tilde{y}^m[i], \tag{24}$$

where $\tilde{G}$ performs linear equalization only and tries to restore $\tilde{s}^m[i]$, and $\Theta^H$ subsequently performs linear decoding only and tries to restore $s^m[i]$.

The ZF equalizer perfectly removes the amplitude and phase distortion:

$$\tilde{G}_{ZF}=(\tilde{H}^H \cdot \tilde{H})^{-1} \cdot \tilde{H}^H, \tag{25}$$

but also causes excessive noise enhancement, especially on those tones that experience a deep channel fade. Since $\tilde{H}$ is a diagonal matrix, the ZF equalizer decouples into Q parallel single-tap equalizers, acting on a per-tone basis in the FD.

The MMSE equalizer balances amplitude and phase distortion with noise enhancement and can be expressed as:

$$\tilde{G}_{MMSE}=(\tilde{H}^H \cdot \tilde{H}+\sigma_w^2 R_s^{-1})^{-1} \cdot \tilde{H}^H, \tag{26}$$

where $R_s:=E\{\tilde{s}^m[i] \cdot \tilde{s}^m[i]^H\}=\sigma_s^2 \Theta \cdot \Theta^H$ is the covariance matrix of $\tilde{s}^m[i]$. If we neglect the color in the precoded symbols $R_s \approx \sigma_s^2 I_Q$, the MMSE equalizer also decouples into Q parallel and independent single-tap equalizers.

During the initialization phase, $\tilde{G}_{ZF}$ and $\tilde{G}_{MMSE}$ are calculated from (25) and (26), respectively, where the matrix inversion reduces to Q parallel scalar divisions, leading to an overall complexity of $\mathcal{O}(Q)$. During the data processing phase, the received data is separately equalized and decoded, leading to an overall complexity of $\mathcal{O}(QB)$.

A.3 Extension to multiple antennas

As showed in Sections IX-A.1 and IX-A.2, MCBS-CDMA successfully addresses the challenges of broadband cellular downlink communications. However, the spectral efficiency of single-antenna MCBS-CDMA is still limited by the received signal-to-noise ratio and can not be further improved by traditional communication techniques. As opposed to single-antenna systems, Multiple-Input Multiple-Output (MIMO) systems that deploy $N_T$ transmit and $N_R$ receive antennas, enable an $N_{min}$-fold capacity increase in rich scattering environments, where $N_{min}=\min\{N_T, N_R\}$ is called the multiplexing gain. Besides the time, frequency and code dimensions, MIMO systems create an extra spatial dimension that allows to increase the spectral efficiency and/or to improve the performance. On the one hand, Space Division Multiplexing (SDM) techniques achieve high spectral efficiency by exploiting the spatial multiplexing gain. On the other hand, Space-Time Coding (STC) techniques achieve high Quality-of-Service (QoS) by exploiting diversity and coding gains. Besides the leverages they offer, MIMO systems also sharpen the challenges of broadband cellular downlink communications. First, time dispersion and ISI are now caused by $N_T N_R$ frequency-selective multi-path fading channels instead of just 1. Second, MUI originates from $N_T M$ sources instead of just M. Third, the presence of multiple antennas seriously impairs a low-complexity implementation of the MS. To tackle these challenges, we will demonstrate the synergy between our MCBS-CDMA waveform and MIMO signal processing. In particular, we focus on a space-time block coded MCBS-CDMA transmission, but the general principles apply equally well to a space-time trellis coded or a space division multiplexed MCBS-CDMA transmission.

Figure 7:
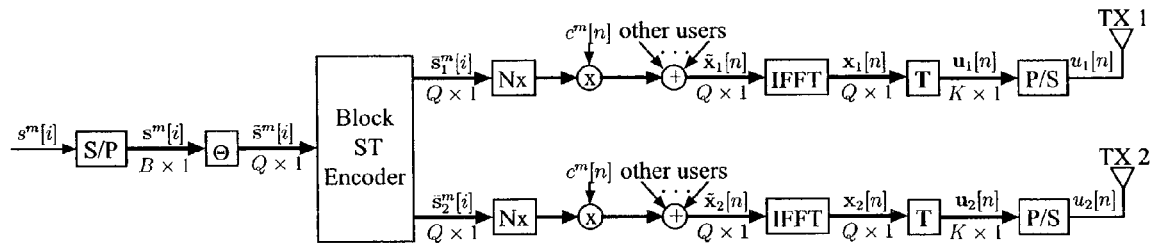
FIG. 7 represents the Space-Time Block Coded MCBS-CDMA downlink transmission scheme.

A.3.a Space-time block coded MCBS-CDMA transmission. The block diagram in FIG. 7 describes the Space-Time Block Coded (STBC) MCBS-CDMA downlink transmission scheme (where only the m-th user is explicitly shown), that transforms the M user data symbol sequences $$\{s^m[i]\}_{m=1}^M$$

into $N_T$ ST coded multi-user chip sequences $$\{u_{n_t}[n]\}_{n_t=1}^{N_T}$$

with a rate $$\frac{1}{T_c}.$$

For conciseness, we limit ourselves to the case of $N_T=2$ transmit antennas. As for the single-antenna case, the information symbols are first grouped into blocks of B symbols and linearly precoded. Unlike the traditional approach of performing ST encoding at the scalar symbol level, we perform ST encoding at the symbol block level. Out ST encoder operates in the FD and takes two consecutive symbol blocks $\{\tilde{s}^m[2i], \tilde{s}^m[2i+1]\}$ to output the following 2Q×2 matrix of ST coded symbol blocks:

$$\begin{bmatrix} \tilde{s}_1^m[2i] & \tilde{s}_1^m[2i+1] \\ \tilde{s}_2^m[2i] & \tilde{s}_2^m[2i+1] \end{bmatrix} = \begin{bmatrix} \tilde{s}^m[2i] & -\tilde{s}^m[2i+1]^* \\ \tilde{s}^m[2i+1] & \tilde{s}^m[2i]^* \end{bmatrix}. \quad (27)$$

At each time interval i, the ST coded symbol blocks $$\tilde{s}_1^m[i] \text{ and } \tilde{s}_2^m[i]$$

are forwarded to the first and the second transmit antenna, respectively. From (27), we can easily verify that the transmitted symbol block at time instant 2i+1 from one antenna is the conjugate of the transmitted symbol block at time instant 2i from the other antenna (with a possible sign change). This corresponds to a per-tone implementation of the classical Alamouti scheme for frequency-flat fading channels. As we will show later, this property allows for deterministic transmit stream separation at the receiver.

After ST encoding, the resulting symbol block sequences $$\{\tilde{s}_{n_t}^m[i]\}_{n_t=1}^{N_T}$$

are block spread and code division multiplexed with those of the other users:

$$\tilde{x}_{n_t}[n] = \sum_{m=1}^{M} \tilde{s}_{n_t}^m[i] c^m[n], \; n = iN + n'. \quad (28)$$

At this point, it is important to note that each of the $N_T$ parallel block sequences are block spread by the same composite code sequence $c^m[n]$, guaranteeing an efficient utilization of the available code space. As will become apparent later, this property allows for deterministic user separation at every receive antenna. After IFFT transformation and the addition of some form of transmit redundancy:

$$u_{n_t}[n] = T \cdot F_Q^H \cdot \tilde{x}_{n_t}[n], \quad (29)$$

the corresponding scalar sequences $$\{u_{n_t}[n]\}_{n_t=1}^{N_T}$$

are transmitted over the air at a rate $$\frac{1}{T_c}.$$

Figure 8:
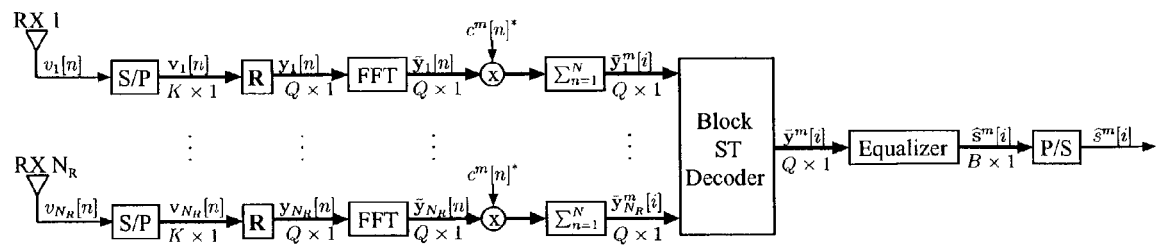
FIG. 8 represents the MUI-resilient STBC/MCBS-CDMA MIMO reception scheme.

A.3.b MUI-resilient MIMO reception. The block diagram in FIG. 8 describes the reception scheme for the MS of interest, which transforms the different received sequences $$\{v_{n_r}[n]\}_{n_r=1}^{N_R}$$

into an estimate of the desired user's data sequence $\hat{s}^m[i]$. After transmit redundancy removal and FFT transformation, we obtain the multi-antenna counterpart of (11):

$$\tilde{Y}_{n_r}[i] = \sum_{n_t=1}^{N_T} \tilde{H}_{n_r,n_t} \cdot \tilde{X}_{n_t}[i] + \tilde{Z}_{n_r}[i], \quad (30)$$

where $\tilde{Y}_{n_r}[i]:=[\tilde{y}_{n_r}[iN], \ldots, \tilde{y}_{n_r}[(i+1)N-1]]$ stacks N consecutive received chip blocks $\tilde{y}_{n_r}[n]$ at the $n_r$-th receive antenna, $\tilde{H}_{n_r,n_t}$ is the diagonal FD channel matrix from the $n_t$-th transmit to the $n_r$-th receive antenna, and $\tilde{X}_{n_t}[i]$ and $\tilde{Z}_{n_r}[i]$ are similarly defined as $\tilde{Y}_{n_r}[i]$. From (28) and (30), we can conclude that our transceiver retains the user orthogonality at each receive antenna, irrespective of the underlying frequency-selective multi-path channels. Like in the single-antenna case, a low-complexity block despreading operation with the desired user's composite code vector $c^m[i]$ deterministically removes the MUI at each receive antenna:

$$\bar{y}_{n_r}^m[i] := \tilde{Y}_{n_r}[i] \cdot c^m[i]^* = \sum_{n_t=1}^{N_T} \tilde{H}_{n_r,n_t} \cdot \tilde{s}_{n_t}^m[i] + \bar{z}_{n_r}^m[i], \quad (31)$$

Hence, our transceiver successfully converts (through block despreading) a multi-user MIMO detection problem into an equivalent single-user MIMO equalization problem.

A.3.c Single-user space-time decoding. After MUI elimination, the information blocks $s^m[I]$ still need to be decoded from the received block despread sequences $$\{\bar{y}_{n_r}^m[i]\}_{n_r=1}^{N_R}.$$

Our ST decoder decomposes into three steps: an initial ST decoding step and a transmit stream separation step for each receive antenna, and, finally, a receive antenna combining step.

The initial ST decoding step considers two consecutive symbol blocks $$\{\bar{y}_{n_r}^m[2i] \text{ and } \bar{y}_{n_r}^m[2i+1]\},$$

both satisfying the block input/output relationship of (31). By exploiting the ST code structure of (27), we arrive at:

$$\bar{y}_{n_r}^m[2i] = \tilde{H}_{n_r,1} \cdot \tilde{s}_1^m[2i] + \tilde{H}_{n_r,2} \cdot \tilde{s}_2^m[2i] + \bar{z}_{n_r}^m[2i], \quad (32)$$

$$\bar{y}_{n_r}^m[2i+1]^* = -\tilde{H}_{n_r,1}^* \cdot \tilde{s}_2^m[2i] + \tilde{H}_{n_r,2}^* \cdot \tilde{s}_1^m[2i] + \bar{z}_{n_r}^m[2i+1]^*. \quad (33)$$

Combining (32) and (33) into a single block matrix form, we obtain:

$$\underbrace{\begin{bmatrix} \bar{y}_{n_r}^m[2i] \\ \bar{y}_{n_r}^m[2i+1]^* \end{bmatrix}}_{\bar{r}_{n_r}^m[i]} = \underbrace{\begin{bmatrix} \tilde{H}_{n_r,1} & \tilde{H}_{n_r,2} \\ \tilde{H}_{n_r,2}^* & -\tilde{H}_{n_r,1}^* \end{bmatrix}}_{\overline{H}_{n_r}} \cdot \begin{bmatrix} \tilde{s}^m[2i] \\ \tilde{s}^m[2i+1] \end{bmatrix} + \underbrace{\begin{bmatrix} \bar{z}_{n_r}^m[2i] \\ \bar{z}_{n_r}^m[2i+1]^* \end{bmatrix}}_{\bar{\eta}_{n_r}^m[i]}, \quad (34)$$

where $$\tilde{s}_1^m[2i] = \tilde{s}^m[2i] \text{ and } \tilde{s}_2^m[2i] = \tilde{s}^m[2i+1]$$

follow from (27). From the structure of $\overline{H}_{n_r}$ in (34), we can deduce that our transceiver retains the orthogonality among transmit streams at each receive antenna for each tone separately, regardless of the underlying frequency-selective multipath channels. A similar property was also encountered in the classical Alamouti scheme, but only for single-user frequency-flat fading multi-path channels.

The transmit stream separation step relies on this property to deterministically remove the transmit stream interference through low-complexity linear processing. Let us define the Q×Q matrix $\tilde{D}_{n_r}$ with non-negative diagonal entries as:

$$\tilde{D}_{n_r} := \left[\tilde{H}_{n_r,1} \cdot \tilde{H}_{n_r,1}^* + \tilde{H}_{n_r,2} \cdot \tilde{H}_{n_r,2}^*\right]^{1/2}.$$

From (34), we can verify that the channel matrix $\overline{H}_{n_r}$ satisfies:

$$\overline{H}_{n_r}^H \cdot \overline{H}_{n_r} = I_2 \otimes \tilde{D}_{n_r}^2,$$

where ⊗ stands for Kronecker product. Based on $\overline{H}_{n_r}$ and $\tilde{D}_{n_r}$, we can construct a unitary matrix $$\overline{U}_{n_r} := \overline{H}_{n_r} \cdot (I_2 \otimes \tilde{D}_{n_r}^{-1}),$$

which satisfies $$\overline{U}_{n_r}^H \cdot \overline{U}_{n_r} = I_{2Q} \text{ and } \overline{U}_{n_r}^H \cdot \overline{H}_{n_r} = I_2 \otimes \tilde{D}_{n_r}.$$

Performing unitary combining on (34) (through $\overline{U}_{n_r}^H$), collects the transmit antenna diversity at the $n_r$-th receive antenna:

$$\underbrace{\begin{bmatrix} \acute{y}_{n_r}^m[2i] \\ \acute{y}_{n_r}^m[2i+1] \end{bmatrix}}_{\acute{r}_{n_r}^m[i]} := \overline{U}_{n_r}^H \cdot \bar{r}_{n_r}^m[i] = \begin{bmatrix} \tilde{D}_{n_r} \cdot \tilde{s}^m[2i] \\ \tilde{D}_{n_r} \cdot \tilde{s}^m[2i+1] \end{bmatrix} + \underbrace{\begin{bmatrix} \acute{z}_{n_r}^m[2i] \\ \acute{z}_{n_r}^m[2i+1] \end{bmatrix}}_{\acute{\eta}_{n_r}^m[i]}, \quad (35)$$

where the resulting noise $$\acute{\eta}_{n_r}^m[i] := \overline{U}_{n_r}^H \cdot \bar{\eta}_{n_r}^m[i]$$

is still white with variance $\sigma_w^2$. Since multiplying with a unitary matrix preserves ML optimality, we can deduce from (35) that the symbol blocks $\tilde{s}^m[2i]$ and $\tilde{s}^m[2i+1]$ can be decoded separately in an optimal way. As a result, the different symbol blocks $\tilde{s}^m[i]$ can be detected independently from:

$$\acute{y}_{n_r}^m[i] = \tilde{D}_{n_r} \cdot \tilde{s}^m[i] + \acute{z}_{n_r}^m[i]. \quad (36)$$

Stacking the blocks from the different receive antennas $$\{\acute{y}_{n_r}^m[i]\}_{n_r=1}^{N_R}$$

for the final receive antenna combining step, we obtain:

$$\underbrace{\begin{bmatrix} \acute{y}_1^m[i] \\ \vdots \\ \acute{y}_{N_R}^m[i] \end{bmatrix}}_{\acute{y}^m[i]} = \underbrace{\begin{bmatrix} \tilde{D}_1 \\ \vdots \\ \tilde{D}_{N_R} \end{bmatrix}}_{\acute{H}} \cdot \tilde{s}^m[i] + \underbrace{\begin{bmatrix} \acute{z}_1^m[i] \\ \vdots \\ \acute{z}_{N_R}^m[i] \end{bmatrix}}_{\acute{z}^m[i]} \quad (37)$$

At this point, we have only collected the transmit antenna diversity at each receive antenna, but still need to collect the receive antenna diversity. Let us define the Q×Q matrix $\tilde{D}$ with non-negative diagonal entries as:

$$\tilde{D} := \left[\sum_{n_t=1}^{N_T}\sum_{n_r=1}^{N_R} \tilde{H}_{n_r,n_t} \cdot \tilde{H}_{n_r,n_t}^*\right]^{1/2}.$$

From (37), we can verify that: $\acute{H}^H \cdot \acute{H} = \tilde{D}^2$. Based on $\acute{H}$ and $\tilde{D}$, we can construct a tall unitary matrix $\acute{U} := \acute{H} \cdot \tilde{D}^{-1}$, which satisfies $\acute{U}^H \cdot \acute{U} = I_Q$ and $\acute{U}^H \cdot \acute{H} = \tilde{D}$. Gathering the receive antenna diversity through multiplying (37) with $\acute{U}^H$, we finally obtain:

$$\tilde{y}^m[i] := \acute{U}^H \cdot \acute{y}^m[i] = \tilde{D} \cdot \Theta \cdot s^m[i] + \tilde{z}^m[i], \quad (38)$$

where the resulting noise $\tilde{z}^m[i] := \acute{U}^H \cdot \acute{z}^m[i]$ is still white with variance $\sigma_w^2$. Since the multiplication with a tall unitary matrix that does not remove information also preserves ML decoding optimality, the blocks $s^m[i]$ can be optimally decoded from (38). Moreover, (38) has the same structure as its single-antenna counterpart in (13). Hence, the design of the linear precoder $\Theta$ in Subsection IX-A.1.d, and the different equalization options that we have discussed in Section IX-A.2, can be applied here as well.

A.4 Simulation results

We consider the downlink of a single-antenna MCBS-CDMA system, operating at a carrier frequency of $F_c = 2$ GHz, and transmitting with a chip rate of $$R_c = \frac{1}{T_c} = 4.096 \text{ MHz}.$$

Each user's bit sequence is QPSK modulated with $n_b=2$ bits per symbol. We assume that the multi-path channel is FIR with, unless otherwise stated, order $L_c=3$, and Rayleigh distributed channel taps of equal variance $$\frac{1}{L_c+1}.$$

To satisfy the IBI removal condition $L \geq L_c$, we choose $L=8$. Note that this specific design can handle a delay spread of $T_g=LT_c \approx 2$ µs. However, a larger transmit redundancy can be used to handle more ISI. To limit the overhead, we choose the number of subcarriers $Q=8L=64$, leading to a transmitted block length $K=Q+L=72$. Hence, the information symbols are parsed into blocks of $B=Q-L=56$ symbols, and linearly precoded into blocks of size $Q=64$. The $Q \times B$ preceding matrix $\Theta$ constitutes the first B columns of the DCT matrix. The precoded symbol blocks are subsequently block spread by a real orthogonal Walsh-Hadamard spreading code of length $N=16$, along with a complex random scrambling code.

A.4.a Comparison of different equalization options. We test the different equalization options, discussed in Section IX-A.2, for a fully-loaded system with $M=16$ active users.

Figure 9:
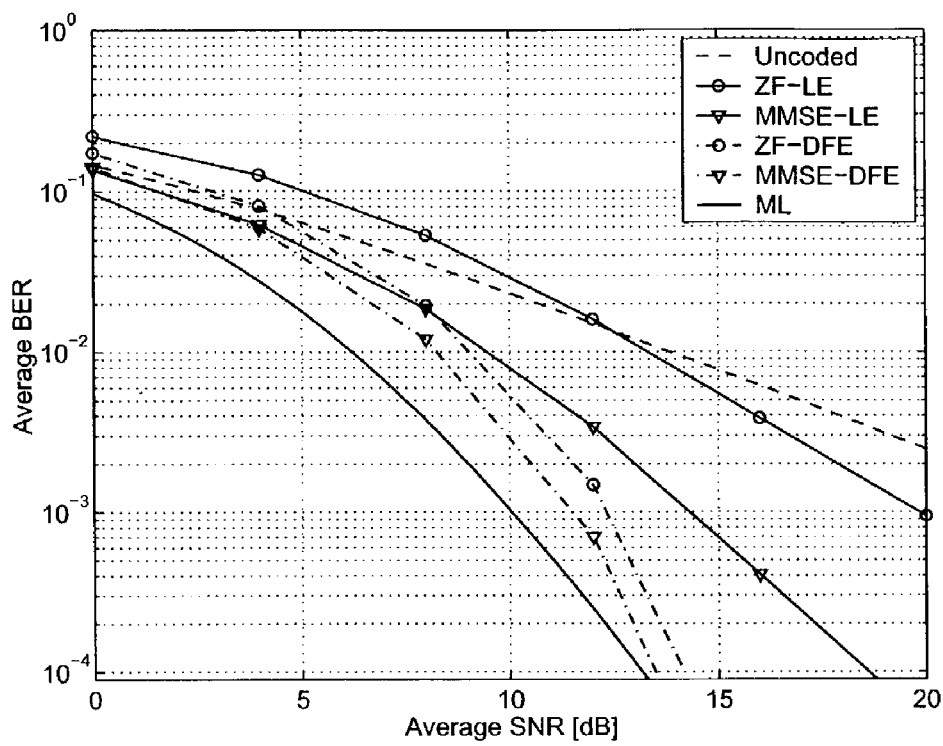
FIG. 9 represents a comparison of Linear versus Decision Feedback Joint Equalization and Decoding.

FIG. 9 compares the performance of the different Linear Equalizers (LEs) and Decision Feedback Equalizers (DFEs) that perform joint equalization and decoding. As a reference, also the performance of a system without linear preceding (uncoded) as well as the optimal ML performance are shown. Clearly, the system without linear preceding only achieves diversity 1, whereas ML detection achieves the full frequency-diversity gain $L_c+1=4$. The ZF-LE performs worse than the uncoded system at low SNR, but better at high SNR (SNR$\geq$12 dB). The MMSE-LE always outperforms the uncoded system and achieves a diversity gain between 1 and $L_c+1=4$. At a BER of $10^{-3}$, it realizes a 5.5 dB gain compared to its ZF counterpart. The non-linear ZF- and MMSE-DFEs outperform their respective linear counterparts, although this effect is more pronounced for the ZF than for the MMSE criterion. At a BER of $10^{-3}$, the MMSE-DFE exhibits a 2.8 dB gain relative to the MMSE-LE, and comes within 1.4 dB of the optimal ML detector.

Figure 10:
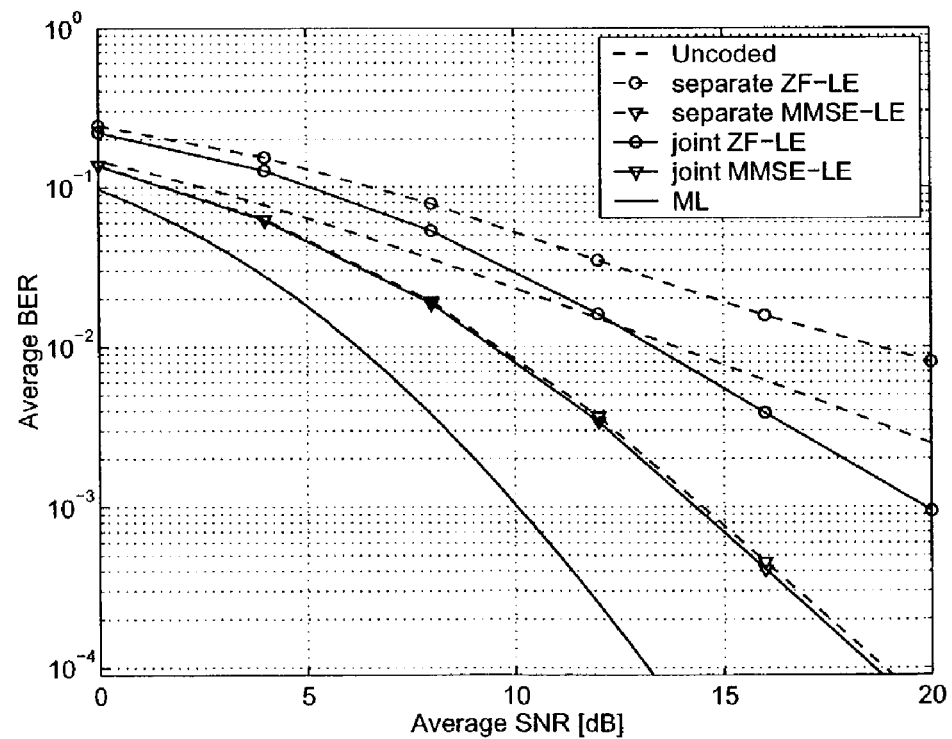
FIG. 10 represents a comparison of Separate versus Joint Linear Equalization and Decoding.

FIG. 10 compares the performance of separate versus joint linear equalization and decoding. On the one hand, the separate ZF-LE always performs worse than the uncoded system, due to the excessive noise enhancement caused by the presence of channel nulls. On the other hand, the separate MMSE-LE almost perfectly coincides with its corresponding joint MMSE-LE, and thus achieves a diversity gain between 1 and $L_c+1=4$.

A.4.b Comparison with DS-CDMA. In the following, we compare two different CDMA transceivers:

T1. The first transceiver applies the classical downlink DS-CDMA transmission scheme of the UMTS and the IS-2000 WCDMA standards. At the receiver, a time-domain MMSE chip equalizer based on perfect Channel State Information (CSI) is applied. The bandwidth efficiency of the first transceiver supporting $M_1$ users can be calculated as $$\epsilon_1 = \frac{M_1}{N},$$

where N is the length of the Walsh-Hadamard spreading codes.

T2. The second transceiver is our MCBS-CDMA transceiver, discussed in Section IX-A.1. At the receiver, a frequency-domain MMSE equalizer (either jointly or separately) based on perfect CSI is used. The bandwidth efficiency of our transceiver supporting $M_2$ users can be calculated as $$\epsilon_2 = \frac{M_2 B}{N(B+2L)},$$

where the overhead 2L stems from the redundant linear preceding and the IBI removal. In order to make a fair comparison between the two transceivers, we should force their respective bandwidth efficiencies to be the same $\epsilon_1=\epsilon_2$, which leads to the following relationship between the number of users to be supported by the different transceivers:

$$M_2 = \frac{B+2L}{B} M_1.$$

With $B=56$ and $L=8$, we can derive that $M_2=9/7 M_1$.

Figure 11:
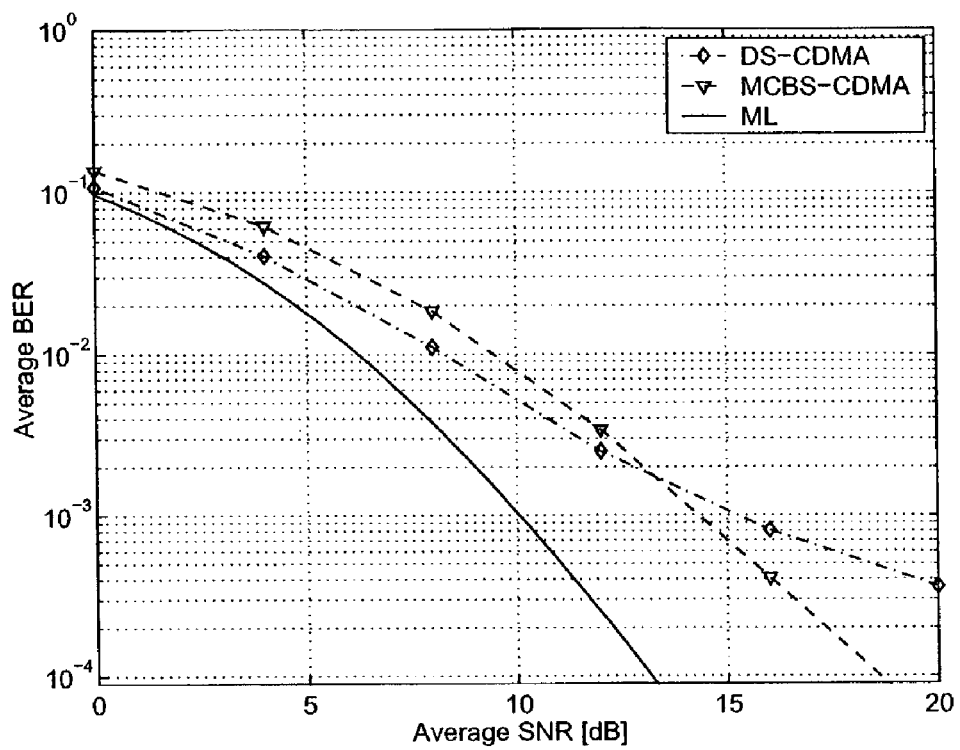
FIG. 11 represents a comparison of DS-CDMA and MCBS-CDMA for small system load.

FIG. 11 compares the performance of the two transceivers for a small system load with $M_1=3$ and $M_2=4$ ($\epsilon_1 \approx \epsilon_2$). Also shown in the figure is the optimal ML performance bound. At low SNR (SNR$\leq$12), T1 has a 1 dB advantage compared to T2. However, at high SNR (SNR$\geq$12), the performance of T1 starts already flooring off, due to ISI/ICI and associated MUI. Hence, T2 outperforms T1 at high SNR.

Figure 12:
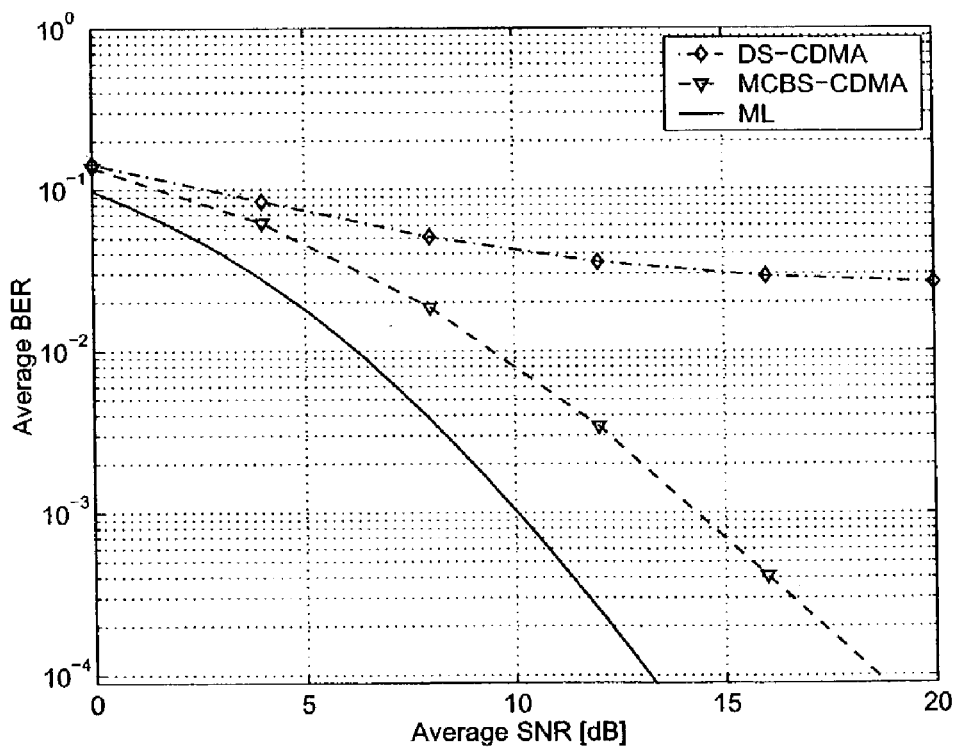
FIG. 12 represents a comparison of DS-CDMA and MCBS-CDMA for large system load.

FIG. 12 depicts the same curves but now for a large system load with $M_1=12$ and $M_2=16$ ($\epsilon_1 \approx \epsilon_2$). Since T2 is an MUI-free CDMA transceiver, its performance remains unaffected by the MUI. So, even at large system load, T2 achieves a diversity order between 1 and $L_c+1=4$. We also observe that T1 now performs poorly compared to T2: e.g. at a BER of $3 \cdot 10^{-2}$, T2 achieves a 9 dB gain compared to T1. In contrast with T2 that deterministically removes the MUI, T1 does not completely suppress these interferences at high SNR. Hence, T1 suffers from a BER saturation level that increases with the system load $M_1$.

A.4.c Performance of Space-Time Block Coded MCBS-CDMA. We test our MIMO CDMA transceiver of Section IX-A.3, employing a cascade of STBC and MCBS-CDMA, for three different MIMO system setups ($N_T$, $N_R$): the (1,1) setup, the (2,1) setup with TX diversity only and the (2,2) setup with both TX and RX diversity. The system is fully-loaded supporting $M=16$ active users. For each setup, both the MMSE-LE as well as the optimal ML detector are shown.

Figure 13:
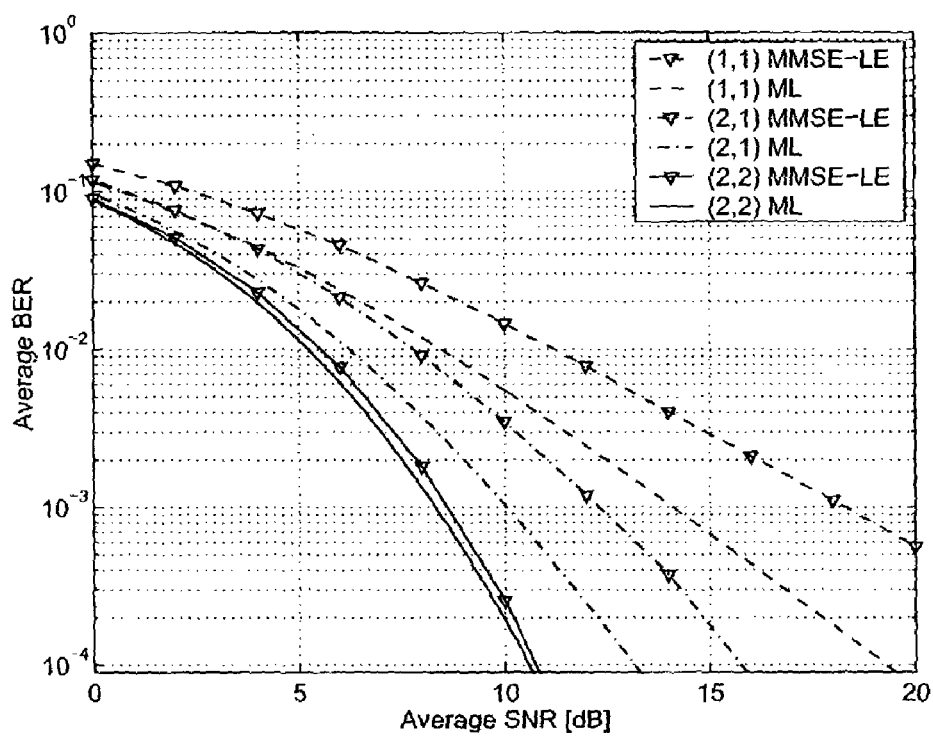
FIG. 13 represents the STBC/MCBS-CDMA performance for channel order $L_c=1$.

FIG. 13 depicts the results for frequency-selective channels with channel order $L_c=1$. Fixing the BER at $10^{-3}$ and focusing on the MMSE-LE, the (2,1) setup outperforms the (1,1) setup by 6 dB. The (2,2) setup achieves on its turn a 3.5 dB gain compared to the (2,1) setup. Comparing the MMSE-LE with its corresponding ML detector, it incurs a 4 dB loss for the (1,1) setup, but only a 0.4 dB loss for the (2, 2) setup. So, the larger the number of TX and/or RX antennas, the better the proposed transceiver with linear receiver processing succeeds in extracting the full diversity of order $N_T N_R (L_c+1)$.

Figure 14:
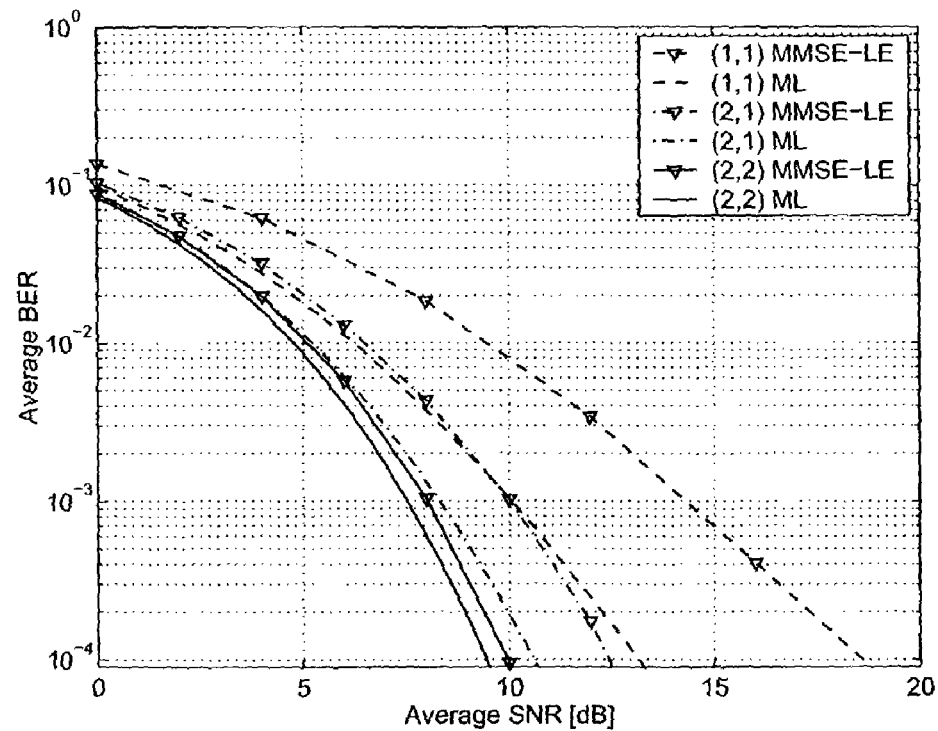
FIG. 14 represents the STBC/MCBS-CDMA performance for channel order $L_c=3$.

FIG. 14 shows the same results but now for frequency-selective channels with channel order $L_c=3$. Again fixing the BER at $10^{3\,1\,3}$ and focusing on the MMSE-LE, the (2,1) setup outperforms the (1,1) setup by 4 dB, whereas the (2,2) setup achieves on its turn a 2 dB gain compared to the (2,1) setup.

So, compared to FIG. 13, the corresponding gains are now smaller because of the inherently larger underlying multi-path diversity.

A.5 Conclusion

To cope with the challenges of broadband cellular downlink communications, we have designed a novel Multi-Carrier (MC) CDMA transceiver that enables significant performance improvements compared to 3G cellular systems, yielding gains of up to 9 dB in full load situations. To this end, our so-called Multi-Carrier Block-Spread (MCBS) CDMA transceiver capitalizes on redundant block-spreading and linear precoding to preserve the orthogonality among users and to enable full multi-path diversity gains, regardless of the underlying multi-path channels. Different equalization options, ranging from linear to ML detection, strike the trade-off between performance and complexity. Specifically, the MMSE decision feedback equalizer realizes a 2.8 dB gain relative to its linear counterpart and performs within 1.4 dB of the optimal ML detector. Finally, our transceiver demonstrates a rewarding synergy with multi-antenna techniques to increase the spectral efficiency and/or improve the link reliability over MIMO channels. Specifically, our STBC/MCBS-CDMA transceiver retains the orthogonality among users as well as transmit streams to realize both multi-antenna and multi-path diversity gains of $N_T N_R (L_c+1)$ for every user in the system, irrespective of the system load. Moreover, a low-complexity linear MMSE detector, that performs either joint or separate equalization and decoding, approaches the optimal ML performance (within 0.4 dB for a (2, 2) system) and comes close to extracting the full diversity in reduced as well as full load settings.

B. EMBODIMENT

B.1 MC-DS-CDMA downlink system model

Figure 15:
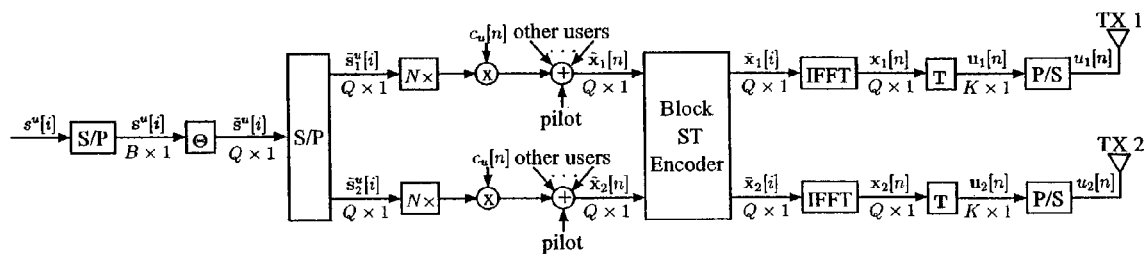
FIG. 15 represents the transmitter model for Space-Time Coded MC-DS-CDMA with Linear Precoding.

B.1.a Transmitter Model. Let us consider the downlink of a single-cell space-time coded MC-DS-CDMA system with U active mobile stations. As depicted in FIG. 15, at the base-station, which we suppose to have $M_t$ transmit antennas, a space-time coded MC-DS-CDMA transmission scheme transforms the different user symbol sequences $$\{s^u[i]\}_{u=1}^U$$

and the pilot symbol sequence $s^p[i]$ into $M_t$ time-domain space-time coded multi-user chip sequences $$\{u_{m_t}[n]\}_{m_t=1}^{M_t},$$

where $u_{m_t}[n]$ is transmitted from the $m_t$-th transmit antenna. For simplicity reasons, we will assume in the following that the base-station has only $M_t=2$ transmit antennas. Note however that the proposed techniques can be extended to the more general case of $M_t>2$ transmit antennas when resorting to the generalized orthogonal designs. As shown in FIG. 15, each user's data symbol sequence $s^u[i]$ (similar for the pilot symbol sequence $s^p[i]$) is serial-to-parallel converted into blocks of B symbols, leading to the symbol block sequence $$s^u[i] := [s^u[iB] \ldots s^u[(i+1)B-1]]^T.$$

The symbol block sequence $s^u[i]$ is linearly precoded by a $Q \times B$ matrix $\Theta$, with Q the number of tones, to yield the precoded symbol block sequence $\tilde{s}^u[i] := \Theta \cdot s^u[i]$. The precoded symbol block sequence $\tilde{s}^u[i]$ is demultiplexed into $M_t$ parallel sequences $$\{\tilde{s}_{m_t}^u[i] := \tilde{s}^u[iM_t + m_t - 1]\}_{m_t=1}^{M_t},$$

where $M_t$ is the number of transmit antennas. Each of the u-th user's precoded symbol block sequences $$\{\tilde{s}_{m_t}^u[i]\}_{m_t=1}^{M_t}$$

is spread by a factor N with the same user code sequence $c_u[n]$ which is the multiplication of the user specific orthogonal Walsh-Hadamard spreading code and the base-station specific scrambling code. For each of the $M_t$ parallel streams, the different user chip block sequences are added up together with the pilot chip block sequence, resulting into the $m_t$-th multi-user chip block sequence:

$$\tilde{x}_{m_t}[n] = \sum_{u=1}^U \tilde{s}_{m_t}^u[i] c_u[n] + \tilde{s}_{m_t}^p[i] c_p[n] \tag{39}$$

with $$i = \left\lfloor \frac{n}{N} \right\rfloor.$$

The Space-Time (ST) encoder operates in the frequency-domain and takes the two multi-user chip blocks $$\{\tilde{x}_{m_t}[n]\}_{m_t=1}^2$$

to output the following $2Q \times 2$ matrix of ST coded multi-user chip blocks:

$$\begin{bmatrix} \bar{x}_1[2n] & \bar{x}_1[2n+1] \\ \bar{x}_2[2n] & \bar{x}_2[2n+1] \end{bmatrix} = \begin{bmatrix} \tilde{x}_1[n] & -\tilde{x}_2^*[n] \\ \tilde{x}_2[n] & \tilde{x}_1^*[n] \end{bmatrix} \tag{40}$$

At each time interval n, the ST coded multi-user chip blocks $\bar{x}_1[n]$ and $\bar{x}_2[n]$ are forwarded to the first respectively the second transmit antenna. From Equation 40, we can easily verify that the transmitted multi-user chip block at time instant 2n+1 from one antenna is the conjugate of the transmitted multi-user chip block at time instant 2n from the other antenna. The $Q \times Q$ IFFT matrix $F_Q^H$ transforms the frequency-domain ST coded multi-user chip block sequence $\bar{x}_{m_t}[n]$ into the time-domain ST coded multi-user chip block sequence $\bar{x}_{m_t}[n]=F_Q^H \cdot \tilde{x}_{m_t}[n]$. The K×Q transmit matrix T, with K=Q+μ, adds a cyclic prefix of length μ to each block of the time-domain ST coded multi-user chip block sequence $x_{m_t}[n]$ leading to the time-domain transmitted multi-user chip block sequence $U_{m_t}[n]=T \cdot X_{m_t}[n]$. Finally, the time-domain transmitted multi-user chip block sequence $u_{m_t}[n]$ is parallel-to-serial converted into K chips, obtaining the time-domain transmitted multi-user chip sequence $$[u_{m_t}[nK] \ldots u_{m_t}[(n+1)K-1]]^T := u_{m_t}[n].$$

Figure 16:
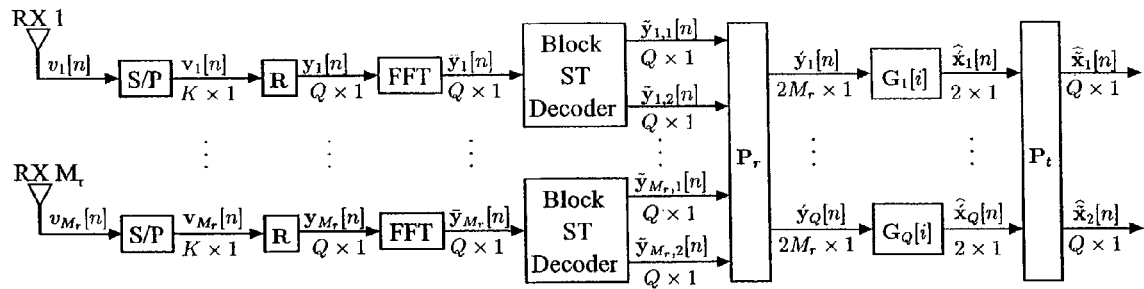
FIG. 16 represents the receiver model for Space-Time Coded MC-DS-CDMA with Linear Precoding.

B.1.b Receiver model. We assume that the mobile station of interest is equipped with $M_r$ receive antennas and has acquired perfect synchronisation. As shown in FIG. 16, at each receive antenna, the time-domain received chip sequence $v_{m_r}[n]$ is serial-to-parallel converted into blocks of K chips, resulting into the time-domain received chip block sequence $$v_{m_r}[n] := [v_{m_r}[nK] \ldots v_{m_r}[(n+1)K-1]]^T.$$

The Q×K receive matrix R discards the cyclic prefix of each block of the time-domain received chip block sequence $v_{m_r}[n]$ leading to the time-domain received ST coded chip block sequence $y_{m_r}[n]=R \cdot v_{m_r}[n]$. By transforming the time-domain received ST coded chip block sequence $y_{m_r}[n]$ into the frequency-domain $\bar{y}_{m_r}[n]:=F_Q \cdot y_{m_r}[n]$ with the Q×Q FFT matrix $F_Q$, assuming a sufficiently long cyclic prefix μ>L, we obtain a simple input/output relationship in the frequency-domain:

$$\bar{y}_{m_r}[n] = \sum_{m_t=1}^{M_t} \tilde{H}_{m_r,m_t} \cdot \bar{x}_{m_t}[n] + \bar{e}_{m_r}[n] \quad (41)$$

where $\bar{e}_{m_r}[n]$ is the frequency-domain received noise block sequence and $\tilde{H}_{m_r,m_t}$ the Q×Q diagonal frequency-domain channel matrix having the frequency-domain channel response $\bar{h}_{m_r,m_t}$ as its main diagonal. Exploiting the structure of the ST code design in Equation 40, we can write for two consecutive chip blocks $\bar{y}_{m_r}[2n]$ and $\bar{y}_{m_r}^*[2n+1]$ the frequency-domain input/ouput relationship of Equation 41, resulting in Equation 42. Stacking the contributions of the $M_r$ receive antennas $$\underbrace{\begin{bmatrix} \bar{y}_{m_r}[2n] \\ \bar{y}_{m_r}^*[2n+1] \end{bmatrix}}_{\tilde{y}_{m_r}[n]} = \underbrace{\begin{bmatrix} \tilde{H}_{m_r,1} & \tilde{H}_{m_r,2} \\ \tilde{H}_{m_r,2}^* & -\tilde{H}_{m_r,1}^* \end{bmatrix}}_{\tilde{H}_{m_r}} \cdot \underbrace{\begin{bmatrix} \tilde{x}_1[n] \\ \tilde{x}_2[n] \end{bmatrix}}_{\tilde{x}[n]} + \underbrace{\begin{bmatrix} \bar{e}_{m_r}[2n] \\ \bar{e}_{m_r}^*[2n+1] \end{bmatrix}}_{\tilde{e}_{m_r}[n]} \quad (42)$$

$$\tilde{y}[n] = [\tilde{y}_1^T[n] \ldots \tilde{y}_{M_r}^T[n]]^T,$$

we obtain the following per receive antenna frequency-domain data model:

$$\tilde{y}[n]=\tilde{H}\cdot\tilde{x}[n]+\tilde{e}[n] \quad (43)$$

where the per receive antenna channel matrix $\tilde{H}$ and the per receive antenna noise block $\tilde{e}[n]$ are similarly defined as the per receive antenna output block $\tilde{y}[n]$. Defining the receive permutation matrix $P_r$ respectively the transmit permutation matrix $P_t$ as follows:

$$\acute{y}[n]:=P_r\cdot\tilde{y}[n] \quad \acute{x}[n]:=P_t\cdot\tilde{x}[n] \quad (44)$$

where $P_r$ permutes a per receive antenna ordering into a per-tone ordering and where $P_t$ conversely permutes a per-tone ordering into a per transmit antenna ordering, we obtain the following per-tone data model:

$$\acute{y}[n]=\acute{H}\cdot\acute{x}[n]+\acute{e}[n] \quad (45)$$

In this Equation, $$\acute{y}[n] = [\acute{y}_1^T[n] \ldots \acute{y}_Q^T[n]]^T$$

is the per-tone output block, $\acute{x}[n]$ the per-tone input block and $\acute{e}[n]$ the per-tone noise block similarly defined as $\acute{y}[n]$. The per-tone channel matrix $\acute{H}$ is a block diagonal matrix, given by:

$$\acute{H} := P_r \cdot \tilde{H} \cdot P_t = \begin{bmatrix} \acute{H}_1 & & \\ & \ddots & \\ & & \acute{H}_Q \end{bmatrix} \quad (46)$$

B.1.c Data model for burst processing. Assuming a burst length of $M_t \cdot B \cdot I$ symbols for each user, we can stack $I \cdot N$ consecutive chip blocks $\tilde{y}[n]$, defined in Equation 43, into $$\tilde{Y} := [\tilde{y}[0] \ldots \tilde{y}[IN-1]],$$

leading to the following per receive antenna data model for burst processing:

$$\tilde{Y}=\tilde{H}\cdot\tilde{X}+\tilde{E} \quad (47)$$

where the input matrix $\tilde{X}$ and the noise matrix $\tilde{E}$ are similarly defined as the output matrix $\tilde{Y}$. By having a look at the definition of $\tilde{x}[n]$ in Equation 42 and by inspecting Equation 39, we can write $\tilde{X}$ as follows:

$$\tilde{X}=\tilde{S}_d\cdot C_d+\tilde{S}_p\cdot C_p \quad (48)$$

where the multi-user total data symbol matrix $$\tilde{S}_d := [\tilde{S}_1 \ldots \tilde{S}_U]$$

stacks the total data symbol matrices of the different active users and the u-th user's total data symbol matrix $$\tilde{S}_u := \begin{bmatrix} \tilde{S}_1^{uT} & \tilde{S}_2^{uT} \end{bmatrix}^T$$

stacks the u-th user's data symbol matrices for the different transmit antennas. The u-th user's data symbol matrix for the $m_t$-th transmit antenna $$\tilde{S}_{m_t}^u := [\tilde{s}_{m_t}^u[0] \ldots \tilde{s}_{m_t}^u[I-1]]$$

stacks I consecutive precoded symbol blocks for the u-th user and the $m_t$-th transmit antenna. The total pilot symbol matrix $\tilde{S}_p$ and the pilot symbol matrix for the $m_t$-th transmit antenna $\tilde{S}_{m_t}^p$ are similarly defined as $\tilde{S}_u$ respectively $$\tilde{S}_{m_t}^u.$$

The multi-user code matrix $$C_d := [\, C_1^T \ \ldots \ C_U^T \,]^T$$

stacks the code matrices of the different active users. The u-th user's code matrix stacks the u-th user's code vectors at I consecutive symbol instants:

$$C_u := \begin{bmatrix} c_u[0] & & \\ & \ddots & \\ & & c_u[I-1] \end{bmatrix} \quad (49)$$

where $$c_u[i] = [c_u[iN] \ \ldots \ c_u[(i+1)N-1]]$$

is the u-th user's code vector used to spread the precoded symbol blocks $$\{\tilde{s}_{m_t}^u[i]\}_{m_t=1}^{M_t}.$$

Similarly to the per receive antenna data model for burst processing in Equation 47, we can stack I·N consecutive chip blocks $\acute{y}[n]$ leading to the following per-tone data model for burst processing:

$$\acute{Y} = \acute{H} \cdot \acute{X} + \acute{E} \quad (50)$$

Using Equation 44 and 48 we can express $\acute{X}$ as follows:

$$\acute{X} = \acute{S}_d \cdot C_d + \acute{S}_p \cdot C_p \quad (51)$$

where $\acute{S}_d := P_t^T \cdot \tilde{S}_d$ and $\acute{S}_p := P_t^T \cdot \tilde{S}_p$ are the per-tone permuted versions of $\tilde{S}_d$ respectively $\tilde{S}_p$.

B.2 Per-tone purst chip equalizers

Inspired by our related work for the DS-CDMA downlink, we can now deal with the design of the chip equalizers. Starting from Equation 50 and assuming that the channel matrix $\acute{H}$ has full column rank and the input matrix $\acute{X}$ has full row rank, it is possible to find a Zero-Forcing (ZF) chip equalizer matrix G, for which:

$$G \cdot \acute{Y} - \acute{X} = 0 \quad (52)$$

provided there is no noise present in the output matrix $\acute{Y}$. Since the channel matrix $\acute{H}$ has a block diagonal structure, as shown in Equation 46, the equalizer matrix G suffices to have a block diagonal structure as well:

$$G := \begin{bmatrix} G_1 & & \\ & \ddots & \\ & & G_Q \end{bmatrix} \quad (53)$$

acting on a per-tone basis. For this reason, the ZF problem of Equation 52 decouples into Q parallel and independent ZF problems, one for each tone. Using Equation 51, we can rewrite the original ZF problem of Equation 52 as follows:

$$G \cdot \acute{Y} - \acute{S}_d \cdot C_d - \acute{S}_p \cdot C_p = 0 \quad (54)$$

which is a ZF problem in both the equalizer matrix G and the multi-user total data symbol matrix $\acute{S}_d$.

B.2.a Training-based burst chip equalizer. The training-based chip equalizer determines its equalizer coefficients from the per-tone output matrix $\acute{Y}$ based on the knowledge of the pilot code matrix $C_p$ and the total pilot symbol matrix $\acute{S}_p$. By despreading Equation 54 with the pilot code matrix $C_p$, we obtain:

$$G \cdot \acute{Y} \cdot C_p^H - \acute{S}_p = 0 \quad (55)$$

because of the orthogonality between the multi-user code matrix $C_d$ and the pilot code matrix $C_p$. In case noise is present in the output matrix $\acute{Y}$, we have to solve the corresponding Least Squares (LS) minimisation problem:

$$\hat{G} = \arg\min_G \left\| G \cdot \acute{Y} \cdot C_p^H - \acute{S}_p \right\|_F^2 \quad (56)$$

which can be interpreted as follows. The equalized output matrix $G \cdot \acute{Y}$ is despread with the pilot code matrix $C_p$. The equalized output matrix after despreading $G \cdot \acute{Y} C_p^H$ should then be as close as possible to the known total pilot symbol matrix $\acute{S}_p$ in a Least Squares sense.

B.2.b Semi-blind burst chip equalizer. The semi-blind chip equalizer determines its equalizer coefficients from the per-tone output matrix $\acute{Y}$ based on the knowledge of the multi-user code matrix $C_d$, the pilot code matrix $C_p$ and the total pilot symbol matrix $\acute{S}_p$. By solving Equation 54 first for $\acute{S}_d$, assuming G to be known and fixed, gives $\hat{\acute{S}}_d = G \cdot \acute{Y} \cdot C_d^H$. Substituting $\hat{\acute{S}}_d$ into Equation 54 leads to a semi-blind ZF problem in G only:

$$G \cdot \acute{Y} \cdot (I_{IN} - C_d^H \cdot C_d) - \acute{S}_p \cdot C_p = 0 \quad (57)$$

In case noise is present in the output matrix $\acute{Y}$, we have to solve the corresponding LS minimisation problem:

$$\hat{G} = \arg\min_G \left\| G \cdot \acute{Y} \cdot (I_{IN} - C_d^H \cdot C_d) - \acute{S}_p \cdot C_p \right\|_F^2 \quad (58)$$

which can be interpreted as follows. The equalized output matrix $G \cdot \acute{Y}$ is projected on the orthogonal complement of the subspace spanned by the multi-user code matrix $C_d$. The equalized output matrix after projecting $G \cdot \acute{Y}(I_{IN} - C_d^H \cdot C_d)$ should then be as close as possible to the known total pilot chip matrix $\acute{S}_p \cdot C_p$ in a Least Squares sense.

B.2.c User-specific detection. The obtained per-tone pilot-trained chip equalizer matrix $\hat{G}$, wether training-based or semi-blind, may subsequently be used to extract the desired user's total data symbol matrix:

$$\hat{S}_u = \tilde{\Theta}^H \cdot P_t \cdot \hat{G} \cdot \hat{Y} \cdot C_u^H \tag{59}$$

where the equalized output matrix $\hat{G} \cdot \hat{Y}$ is first despread with the desired user's code matrix $C_u$. Next the transmit permutation matrix $P_t$ permutes the per-tone ordering of the despread equalized output matrix into a per transmit antenna ordering. Finally, the total precoding matrix $\tilde{\Theta}$ linearly decodes the permuted version of the despread equalized output matrix, where $\tilde{\Theta}$ is a $M_t \cdot Q \times M_t \cdot B$ block diagonal matrix with the preceding matrix $\Theta$ on its main diagonal.

B.3 Simulation results

We consider the downlink of a ST coded MC-DS-CDMA system with $M_t = 2$ transmit antennas at the base-station, $M_r = 2$ receive antennas at the mobile station of interest, QPSK data modulation, an initial block length of B=13, real orthogonal Walsh-Hadamard spreading codes of length N=8 along with a random overlay code for scrambling and U=3 (half system load) active user terminals. We assume that each channel $K_{m_r,m_t}[l]$ is FIR with order L=3. Each channel tap is Rayleigh distributed with equal average power. The precoded block length Q (or equivalently the number of tones) either equals Q=B=13 (without linear precoding) or Q=B+L=16 (with linear precoding). The length of the cyclic prefix is $\mu = L = 3$ and we assume a burst length of $M_t \cdot B \cdot I = 520$ (I=20).

Figure 17:
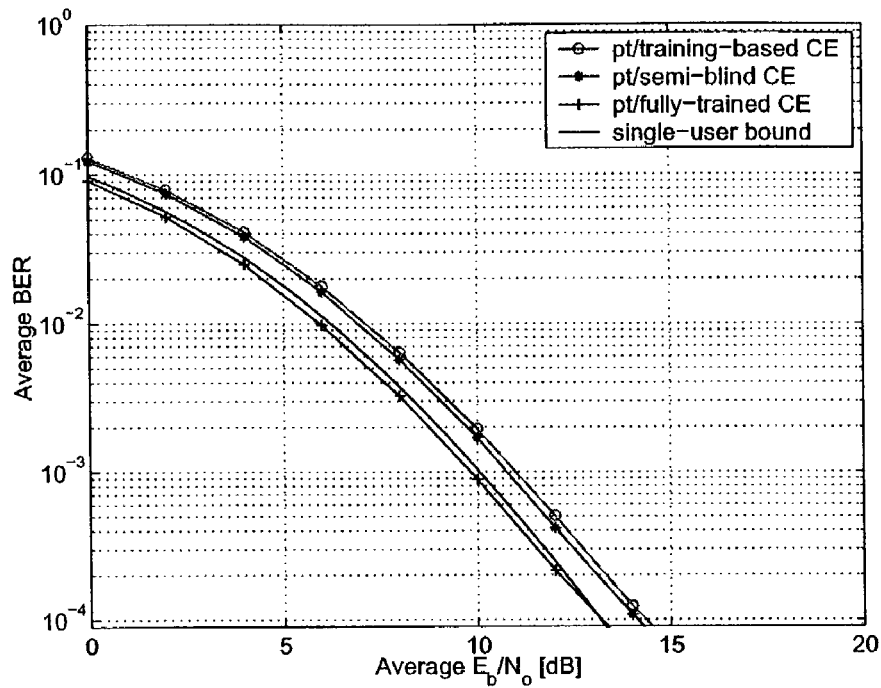
FIG. 17 represents the performance comparison of the different equalizers without linear preceding.

FIG. 17 compares the average BER versus the average SNR per bit of the pilot-trained chip equalizers and the ideal fully-trained chip equalizer (CE) for a system without linear precoding. Also shown in the figure is the theoretical BER-curve for QPSK with $M_t \cdot M_r = 4$-fold diversity in Rayleigh fading channels (single-user bound). The performance of the ideal fully-trained CE perfectly coincides with the single-user bound whereas both training-based and semi-blind pilot-trained CE are within 1 dB of the ideal one.

Figure 18:
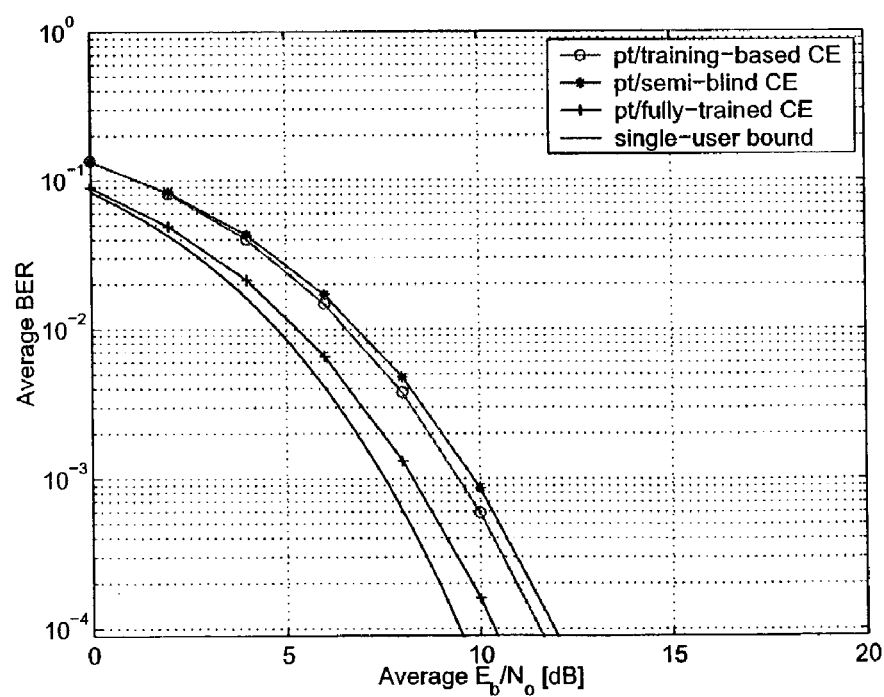
FIG. 18 represents the performance comparison of the different equalizers with linear precoding.

FIG. 18 shows the same curves but now for a system with linear preceding, where the preceding matrix $\Theta$ constitutes the first B columns of the FFT matrix $F_Q$. The single-user bound now becomes the theoretical BER-curve for QPSK with $M_t \cdot M_r \cdot (L+1) = 16$-fold instead of merely $M_t \cdot M_r$ 4-fold diversity in Rayleigh fading channels. The performance of the ideal fully-trained CE is within 1 dB whereas that of the training-based pilot-trained CE is within 2 dB of the single-user bound. The semi-blind pilot-trained CE incurs a 0.5 dB loss compared to the training-based CE because the linear decoding is less robust against the orthogonal projection operation in the semi-blind CE.

We can conclude that the per-tone pilot-trained chip equalizer with the training-based cost function is a promising technique for downlink reception in future broadband wireless communication systems based on a space-time coded MC-DS-CDMA transmission scheme.

C. EMBODIMENT

C.1 SCBT-DS-CDMA downlink system model

Let us consider the downlink of a single-cell space-time block coded SCBT-DS-CDMA system with U active mobile stations. The base-station is equipped with $M_t$ transmit (TX) antennas whereas the mobile station of interest is equipped with $M_r$ receive (RX) antennas.

Figure 19:
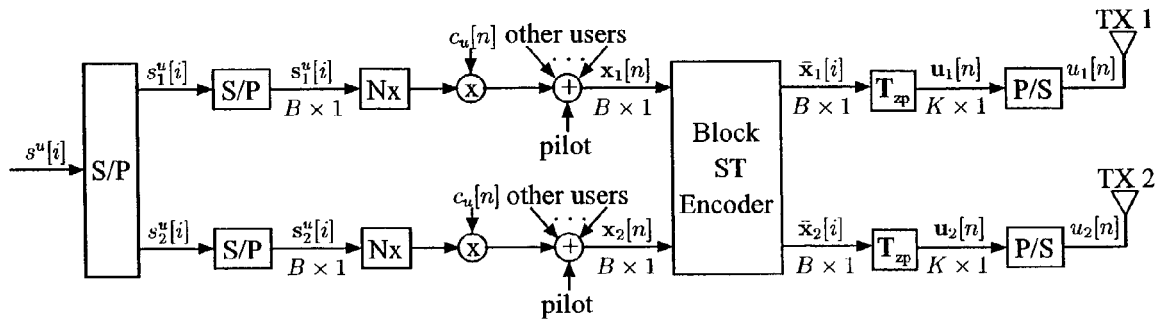
FIG. 19 represents the transmitter model for Space-Time Coded SCBT-DS-CDMA.

C.1.a Transmitter Model for the base station. For simplicity reasons, we will assume in the following that the base station has only $M_t=2$ transmit antennas. Note however that the proposed techniques can be extended to the more general case of $M_t > 2$ transmit antennas when resorting to the generalized orthogonal designs. As shown in FIG. 19, each user's data symbol sequence $s^u[i]$ (similar for the pilot symbol sequence $s^p[i]$) is demultiplexed into Mt parallel lower rate sequences $$\{s_{m_t}^u[i] := s^u[iM_t + m_t - 1]\}_{m_t=1}^{M_t},$$

where $M_t$ is the number of transmit antennas. Each of the u-th user's symbol sequences $$\{s_{m_t}^u[i]\}_{m_t=1}^{M_t}$$

is serial-to-parallel converted into blocks of B symbols, leading to the symbol block sequences $$\{\mathbf{s}_{m_t}^u[i] := [s_{m_t}^u[iB], \ldots, s_{m_t}^u[(i+1)B-1]]^T\}_{m_t=1}^{M_t}$$

that are subsequently spread by a factor N with the same user composite code sequence $c_u[n]$ which is the multiplication of the user specific orthogonal Walsh-Hadamard spreading code and the base station specific scrambling code. For each of the $M_t$ parallel streams, the different user chip block sequences and the pilot chip block sequence are added, resulting into the $m_t$-th multi-user chip block sequence:

$$x_{m_t}[n] = \sum_{u=1}^{U} s_{m_t}^u[i]c_u[n] + s_{m_t}^p[i]c_p[n], \quad i = \left\lfloor \frac{n}{N} \right\rfloor \tag{60}$$

Let us also define the u-th user's total symbol block sequence $$s^u[i] := [s_1^u[i]^T, s_2^u[i]^T]^T$$

and the total multi-user chip block sequence $$x[n] := [x_1^T[n], x_2^T[n]]^T.$$

The block Space-Time (ST) encoder operates in the time-domain (TD) at the chip block level rather than at the symbol block level and takes the two multi-user chip blocks $$\{x_{m_t}[n]\}_{m_t=1}^{2}$$

to output the following 2B×2 matrix of ST coded multi-user chip blocks:

$$\begin{bmatrix} \bar{x}_1[2n] & \bar{x}_1[2n+1] \\ \bar{x}_2[2n] & \bar{x}_2[2n+1] \end{bmatrix} = \begin{bmatrix} x_1[n] & -P_B^{(0)} \cdot x_2^*[n] \\ x_2[n] & P_B^{(0)} \cdot x_1^*[n] \end{bmatrix} \tag{61}$$

where $P_J^{(j)}$ is a J×J permutation matrix implementing a reversed cyclic shift over j positions. At each time interval n, the ST coded multi-user chip blocks $\bar{x}_1[n]$ and $\bar{x}_2[n]$ are forwarded to the first respectively the second transmit antenna. From Equation 61, we can easily verify that the transmitted multi-user chip block at time instant 2n+1 from one antenna is the time-reversed conjugate of the transmitted multi-user chip block at time instant 2n from the other antenna (with a possible sign change). The K×B transmit matrix $T_{zp}$, with K=B+μ, pads a zero postfix of length μ to each block of the ST coded multi-user chip block sequence $\bar{x}_{m_t}[n]$ leading to the transmitted multi-user chip block sequence $u_{m_t}[n]=T_{zp}\cdot\bar{x}_{m_t}[n]$. Finally, the transmitted multi-user chip block sequence $u_{m_t}[n]$ is parallel-to-serial converted into the transmitted multi-user chip sequence $[u_{m_t}[nK], \ldots, u_{m_t}[(n+1)K-1]]^T:=u_{m_t}[n]$.

Figure 20:
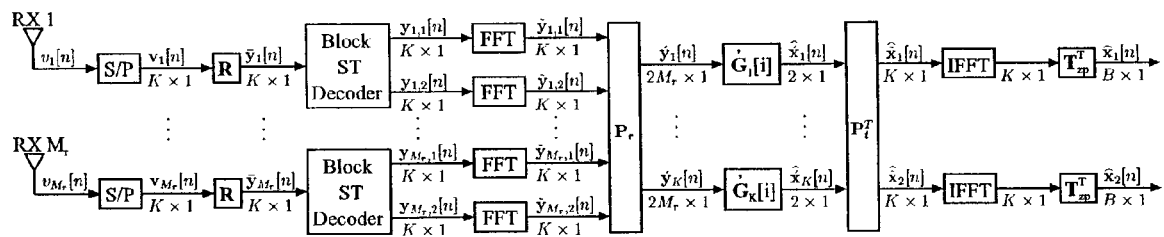
FIG. 20 represents the receiver model for Space-Time Coded SCBT-DS-CDMA.

C.1.b Receiver model for the mobile station. We assume that the mobile station of interest is equipped with $M_r$ receive antennas and has acquired perfect synchronisation. At each receive antenna in FIG. 20, the TD received chip sequence $v_{m_r}[n]$ is serial-to-parallel converted into blocks of K chips, resulting into the TD received chip block sequence $v_{m_r}[n]:=[v_{m_r}[nK], \ldots, v_{m_r}[(n+1)K-1]]^T$. The K×K receive matrix $R:=I_K$ completely preserves each block of the TD received chip block sequence $v_{m_r}[n]$ leading to the TD received ST coded chip block sequence $\bar{y}_{m_r}[n]=R\cdot v_{m_r}[n]$. Assuming a sufficiently long zero postfix μ≥L (L is the maximum channel order), we obtain a simple input/ouput relationship in the time-domain:

$$\bar{y}_{m_r}[n] = \sum_{m_t=1}^{M_t} \dot{H}_{m_r,m_t} \cdot T_{zp} \cdot \bar{x}_{m_t}[n] + \bar{e}_{m_r}[n] \qquad (62)$$

where $\bar{e}_{m_r}[n]$ is the TD received noise block sequence and $\dot{H}_{m_r,m_t}$ is a K×K circulant channel matrix. We consider two consecutive chip blocks and define $y_{m_r,1}[n]:=\bar{y}_{m_r}[2n]$ and $y_{m_r,2}[n]:=$ $$P_K^{(B)} \cdot \bar{y}_{m_r}^*[2n+1].$$

Transforming $y_{m_r,1}[n]$ and $y_{m_r,2}[n]$ to the frequency-domain (FD) employing the K×K FFT matrix $F_K$ leads to the input/output relationship of Equation 63 on the top of the next page, where $\tilde{H}_{m_r,m_t}=F_K\cdot\dot{H}_{m_r,m_t}\cdot F_K^H$ is the K×K diagonal FD channel matrix having the FD channel response $\tilde{h}_{m_r,m_t}$ as its main diagonal. Note from Equation 63 that $\tilde{x}[n]:=F_K\cdot T_{zp}\cdot x[n]$ $$\begin{bmatrix} F_K \cdot \bar{y}_{m_r}[2n] \\ F_K \cdot P_K^{(B)} \cdot \bar{y}_{m_r}^*[2n+1] \end{bmatrix} = \qquad (63)$$
$$\underbrace{\begin{bmatrix} \tilde{H}_{m_r,1} & \tilde{H}_{m_r,2} \\ \tilde{H}_{m_r,2}^* & -\tilde{H}_{m_r,1}^* \end{bmatrix}}_{\tilde{H}_{m_r}} \cdot \underbrace{\begin{bmatrix} F_K \cdot T_{zp} \cdot x_1[n] \\ F_K \cdot T_{zp} \cdot x_2[n] \end{bmatrix}}_{\tilde{x}[n]} + \underbrace{\begin{bmatrix} F_K \cdot \bar{e}_{m_r}[2n] \\ F_K \cdot P_K^{(B)} \cdot \bar{e}_{m_r}^*[2n+1] \end{bmatrix}}_{\tilde{e}_{m_r}[n]}$$

where both the compound FFT matrix $f_K:=\mathrm{diag}\{F_K, F_K\}$ and the compound transmit matrix $T_{zp}:=\mathrm{diag}\{T_{zp}, T_{zp}\}$ are block diagonal. Stacking the contributions of the $M_r$ receive antennas $$\tilde{y}[n] = [\tilde{y}_1^T[n], \ldots, \tilde{y}_{M_r}^T[n]]^T,$$

we obtain the following per-RX-antenna FD data model:

$$\tilde{y}[n]=\tilde{H}\cdot\tilde{x}[n]+\tilde{e}[n] \qquad (64)$$

where the per-RX-antenna channel matrix $\tilde{H}$ and the per-RX-antenna noise block $\tilde{e}[n]$ are similarly defined as the per-RX-antenna output block $\tilde{y}[n]$. Defining the per-tone input block $\acute{x}[n]$ and the per-tone output block $\acute{y}[n]$ as:

$$\acute{x}[n]:=P_t\cdot\tilde{x}[n]=[\acute{x}_1[n],\ldots,\acute{x}_K[n]]^T$$
$$\acute{y}[n]:=P_r\cdot\tilde{y}[n]=[\acute{y}_1[n],\ldots,\acute{y}_K[n]]^T \qquad (65)$$

where $P_t$ permutes a per-TX-antenna ordering into a per-tone ordering and where $P_r$ permutes a per-RX-antenna ordering into a per-tone ordering, we obtain the following per-tone data model:

$$\acute{y}[n]=\acute{H}\cdot\acute{x}[n]+\acute{e}[n] \qquad (66)$$

where $\acute{e}[n]$ is the per-tone noise block similarly defined as $\acute{y}[n]$. The per-tone channel matrix $\acute{H}$ is a block diagonal matrix, given by:

$$\acute{H}:=P_r\cdot\tilde{H}\cdot P_t^T=\mathrm{diag}\{\acute{H}_1,\ldots,\acute{H}_K\} \qquad (67)$$

C.1.c Data model for burst processing. Assuming a burst length of $M_rB\cdot I$ symbols for each user, we can stack I·N consecutive chip blocks $\tilde{y}[n]$, defined in Equation 64, into $\tilde{Y}:=[\tilde{y}[0],\ldots,\tilde{y}[IN-1]]$, leading to the following per-RX-antenna data model for burst processing:

$$\tilde{Y}=\tilde{H}\cdot\tilde{X}+\tilde{E} \qquad (68)$$

where the input matrix $\tilde{X}$ and the noise matrix $\tilde{E}$ are similarly defined as the output matrix $\tilde{Y}$. Note that $$\tilde{X}=F_K\cdot T_{zp}\cdot X \qquad (69)$$

where X stacks I·N consecutive total multi-user chip blocks x[n]. Moreover, by inspecting Equation 60, we can write X as:

$$X=S_d\cdot C_d+S_p\cdot C_p \qquad (70)$$

where the multi-user total data symbol matrix $S_d:=[S_1,\ldots,S_U]$ stacks the total data symbol matrices of the different active users and the u-th user's total data symbol matrix $S_u:=[s^u[0],\ldots,s^u[I-1]]$ stacks I consecutive total symbol blocks for the u-th user. The total pilot symbol matrix $S_p$ is similarly defined as $S_u$. The multi-user code matrix $$C_d:=[C_1^T,\ldots,C_U^T]^T$$

stacks the code matrices of the different active users. The u-th user's code matrix stacks the u-th user's composite code vectors at I consecutive symbol block instants:

$$C_u:=\mathrm{diag}\{c_u^T[0],\ldots,c_u^T[I-1]\} \qquad (71)$$

where $c_u[i]:=[c_u[iN], \ldots, c_u[(i+1)N-1]]^T$ is the u-th user's composite code vector used to spread the total symbol block $s^u[i]$. The pilot code matrix $C_p$ is similarly defined as $C^u$.

Similarly to the per-RX-antenna data model for burst processing in Equation 68, we can stack I·N consecutive chip blocks $\acute{y}[n]$ leading to the following per-tone data model for burst processing:

$$\acute{Y} = \acute{H} \cdot \acute{X} + \acute{E} \tag{72}$$

Using Equation 65, 69 and 70, we can express $\acute{X}b$ as:

$$\acute{X} = \acute{S}_d \cdot C_d + \acute{S}_p \cdot C_p \tag{73}$$

where $\acute{S}_d := P_t \cdot \tilde{S}_d$ and $\acute{S}_p := P_t \cdot \tilde{S}_p$ are the per-tone permuted versions of $\tilde{S}_d := F_K \cdot T_{zp} \cdot S_d$ respectively $\tilde{S}_p := F_K \cdot T_{zp} \cdot S_p$.

C.2 Burst frequency-domain chip equalization

Armed with a suitable data model for burst processing, we can now proceed with the design of different Least Squares (LS) type of burst FD chip equalizers that processes a burst of $M_t \cdot I$ data symbol blocks at once. Note that Recursive Least Squares (RLS) type of adaptive FD chip equalizers that process the data on a symbol block by symbol block basis can be easily derived from their corresponding LS burst version. Starting from Equation 72 and assuming the channel matrix $\acute{H}$ to have full column rank and the input matrix $\acute{X}$ to have full row rank, it is always possible to find a Zero-Forcing (ZF) chip equalizer matrix $\acute{G}$, for which $\acute{G} \cdot \acute{Y} - \acute{X} = 0$, provided there is no noise present in the output matrix $\acute{Y}$. In the presence of noise, we have to solve the corresponding Least Squares (LS) minimization problem, which we denote for convenience as:

$$\acute{G} \cdot \acute{Y} - \acute{X} \overset{LS}{=} 0 \tag{74}$$

Figure 6:
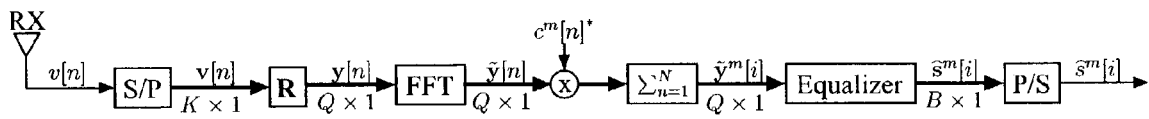
FIG. 6 represents the MUI-resilient MCBS-CDMA downlink reception scheme.

Since the channel matrix $\acute{H}$ has a block diagonal structure, as shown in Equation 67, the equalizer matrix $\acute{G}$ suffices to have a block diagonal structure as well:

$$\acute{G} := \text{diag}\{\acute{G}_1 \ldots \acute{G}_K\} \tag{75}$$

acting on a per-tone basis at the chip block level (see also FIG. 6). For this reason, the LS problem of Equation 74 decouples into K parallel and independent LS problems, one for each tone. Using Equation 73, we can rewrite the original LS problem of Equation 74 as:

$$\acute{G} \cdot \acute{Y} - \acute{S}_d \cdot C_d - \acute{S}_p \cdot C_p \overset{LS}{=} 0 \tag{76}$$

which is a LS problem in both the equalizer matrix $\acute{G}$ and the multi-user total data symbol matrix $\acute{S}_d$. Starting from Equation 76, we will design in the following two different FD methods for direct chip equalizer estimation that differ in the amount of a-priori information they exploit to determine the equalizer coefficients. The first method, coined CDMP-trained, only exploits the presence of a Code Division Multiplexed Pilot (CDMP). The second method, coined semi-blind CDMP-trained, additionally exploits knowledge of the multi-user code correlation matrix.

C.2.a CDMP-trained chip equalizer. The CDMP-trained chip equalizer estimator directly determines the equalizer coefficients from the per-tone output matrix $\acute{Y}$ based on the knowledge of the pilot code matrix $C_p$ and the total pilot symbol matrix $S_p$. By despreading Equation 76 with the pilot code matrix $C_p$, we obtain:

$$\acute{G} \cdot \acute{Y} \cdot C_p^H - \acute{S}_p \overset{LS}{=} 0 \tag{77}$$

because $C_d \cdot C_p^H = 0$ due to the orthogonality of the user and pilot composite code sequences at each symbol instant. Equation 77 can be interpreted as follows. The equalized per-tone output matrix after despreading $\acute{G} \cdot \acute{Y} \cdot C_p^H$ should be as close as possible in a Least Squares sense to the per-tone pilot symbol matrix $\acute{S}_p$.

C.2.b Semi-blind CDMP-trained chip equalizer. The semi-blind CDMP-trained chip equalizer estimator directly determines the equalizer coefficients from the per-tone output matrix $\acute{Y}$ based on the knowledge of the multi-user code matrix $C_d$, the pilot code matrix $C_p$ and the per-tone pilot symbol matrix $\acute{S}_p$. By despreading Equation 76 with the multi-user code matrix $C_d$ and by assuming the per-tone equalizer matrix $\acute{G}$ to be known and fixed, we obtain an LS estimate of the per-tone multi-user data symbol matrix $\hat{S}_d = \acute{G} \cdot \acute{Y} \cdot CS$. Substituting $\hat{S}_d$ into the original LS problem of Equation 76 leads to a modified LS problem in the per-tone equalizer matrix $\acute{G}$ only:

$$\acute{G} \cdot \acute{Y} \cdot (I_{IN} - C_d^H \cdot C_d) - \acute{S}_p \cdot C_p \overset{LS}{=} 0 \tag{78}$$

which can be interpreted as follows. The equalized per-tone output matrix $\acute{G} \cdot \acute{Y}$ is first projected on the orthogonal complement of the subspace spanned by the multi-user code matrix $C_d$, employing the projection matrix $I_{IN} - CS \cdot C_d$. The resulting equalized per-tone output matrix after projecting should then be as close as possible in Least Squares sense to the per-tone pilot chip matrix $\acute{S}_p \cdot C_p$.

C.2.c User-specific detection. As shown in FIG. 6, the obtained per-tone chip equalizer matrix $\hat{G}$, whether CDMP-trained or semi-blind CDMP-trained, may subsequently be used to extract the desired user's total data symbol matrix:

$$\hat{S}_u = T_{zp}^T \cdot F_K^H \cdot P_t^T \cdot \hat{G} \cdot \acute{Y} \cdot C_u^H \tag{79}$$

where the estimated FD input matrix $\hat{X} = P_t^T \cdot \hat{G} \cdot \acute{Y}$ is transformed to the TD by the compound IFFT matrix $F_K^H$ and has its zero postfix removed by the transpose of the ZP transmit matrix $T_{zp}$. The resulting estimate of the TD input matrix $\hat{X}$ is finally despread with the desired user's code matrix $C_u$ to obtain an estimate of the desired user's total data symbol matrix $\hat{S}_u$.

C.3 Simulation results

We consider the downlink of a ST coded CDMA system with $M_t = 2$ transmit antennas at the base station, $M_r = 2$ receive antennas at the mobile station of interest and real orthogonal Walsh-Hadamard spreading codes of length N=8 along with a random overlay code for scrambling. The QPSK modulated data symbols are transmitted in bursts of 208 symbols. We assume that each channel $K_{m_r,m_t}[l]$ is FIR with order L=3 and has Rayleigh distributed channel taps of equal average power. We compare two different scenarios:

S1. A pilot-trained space-time RAKE receiver is applied to the space-time coded downlink DS-CDMA transmission scheme that was proposed for the UMTS and the IS-2000 WCDMA standards, also known as Space-Time Spreading (STS). The pilot-trained space-time RAKE receiver is similar to the time-only RAKE receiver, but instead of using a time-only maximum ratio combiner based on exact channel knowledge, we use a space-time combiner that is trained with the pilot.

S2. The proposed CDMP-trained and semi-blind CDMP-trained per-tone space-time chip equalizer methods are applied to the proposed space-time block coded downlink SCBT-DS-CDMA transmission scheme. We also consider the ideal fully-trained (FT) method that assumes perfect knowledge of the per-tone input matrix X and corresponds to Equation 74. The FT method has zero spectral efficiency and is therefore useless in practice. The burst length of 208 symbols is split into $M_t \cdot I=16$ symbol blocks of B=13 symbols each. Taking $\mu=L=3$ and correspondingly $K=B+\mu=16$, zero-padding results in an acceptable decrease in information rate, more specifically, a decrease with a factor $B/K \approx 0.81$.

Figure 21:
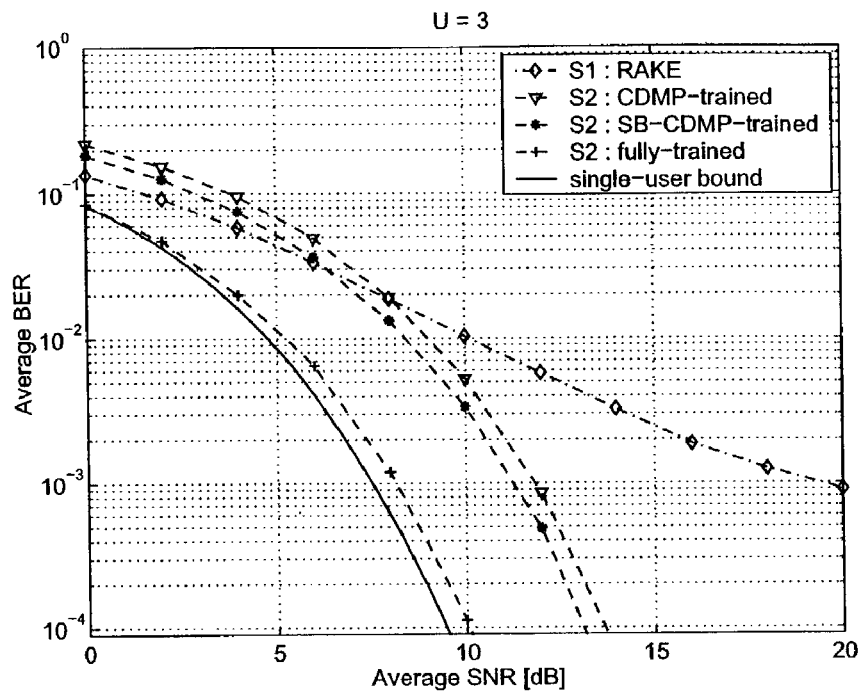
FIG. 21 represents the performance of ST Coded SCBT-DS-CDMA for half system load.
Figure 22:
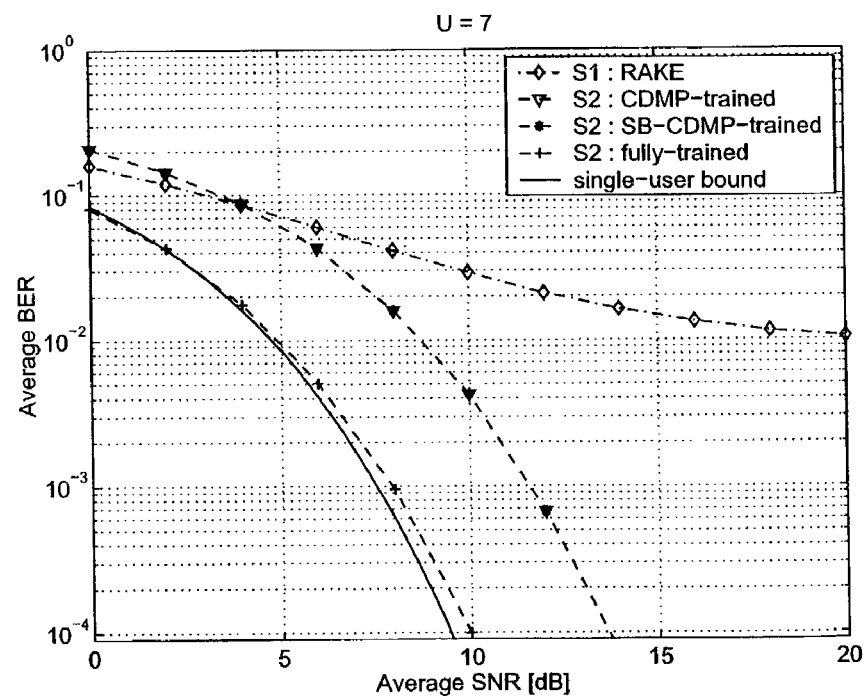
FIG. 22 represents the performance of ST Coded SCBT-DS-CDMA for full system load.

FIGS. 21 and 22 compare the average BER versus the average received SNR of both scenarios for different system loads. Also shown in the figures is the theoretical BER of QPSK with $M_t \cdot M_r \cdot (L+1)=16$-fold diversity in Rayleigh fading channels (single-user bound). FIG. 21 compares the performance for half system load, corresponding to U=3 active mobile stations. Firstly, we observe that S2 outperforms S1: e.g. at a BER of $10^{-3}$ the CDMP-trained method achieves a 8 dB gain compared to S1. The semi-blind CDMP-trained method achieves a 0.5 dB gain compared to the regular CDMP-trained method and incurs a 3.5 dB loss compared to the ideal FT method. The ideal FT method on its turn closely approaches the single-user bound. Thirdly, we observe that S2 comes close to extracting the fuill diversity of order $M_t \cdot M_r \cdot (L+1)$. FIG. 22 compares the performance for full system load, corresponding to $_u=7$ active mobile stations. Firstly, we observe that S1 now performs poorly compared to S2: e.g. at a BER of $10^{-2}$ the CDMP-trained method achieves an 11 dB gain compared to S1. Secondly, the semi-blind and the regular CDMP-trained method now have exactly the same performance (this can easily be proven mathematically), and incur a 4 dB loss compared to the ideal FT method.

C.4 Conclusion

In this paper, we have combined Single-Carrier Block Transmission (SCBT) DS-CDMA with Time Reversal (TR) Space-Time Block Coding (STBC) for downlink multi-user MIMO communications. Moreover, we have developed two new direct equalizer estimation methods that act on a per-tone basis in the Frequency-Domain (FD) exploiting a Code Division Multiplexed Pilot (CDMP). The regular CDMP-trained method only exploits the presence of a CDMP whereas the semi-blind CDMP-trained method additionally capitalizes on the unused spreading codes in a practical CDMA system. Both the regular and the semi-blind CDMP-trained method come close to extracting the full diversity of order $M_t \cdot M_r \cdot (L+1)$ independently of the system load. The semi-blind CDMP-trained method outperforms the regular CDMP-trained method for low to medium system load and proves its usefulness especially for small burst lengths.

D. EMBODIMENT

D.1 SCBT-DS-CDMA downlink system model

Let us consider the downlink of a single-cell SCBT-DS-CDMA system with U active mobile stations. The base station has a single transmit antenna whereas the mobile station of interest has possibly multiple receive antennas.

Figure 23:
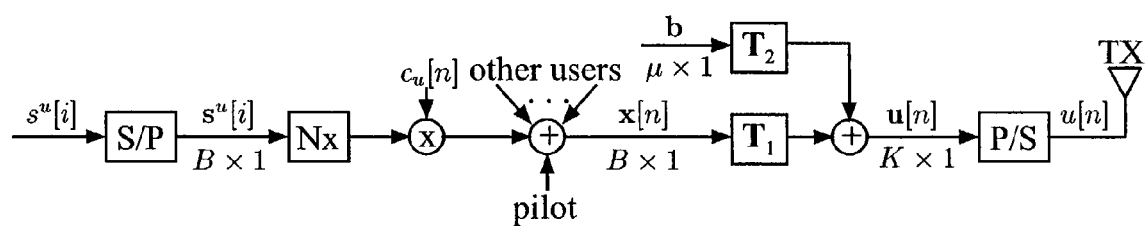
FIG. 23 represents the base station transmitter model for SCBT-DS-CDMA with KSP.

D.1.a Transmitter model for the base station. As shown in FIG. 23, the base station transforms U user data symbol sequences $$\{s^u[i]\}_{u=1}^{U}$$

and a pilot symbol sequence $s^p[i]$ into a single transmitted chip sequence u[n]. Each user's data symbol sequence $s^u[i]$ (pilot symbol sequence $s^p[i]$) is serial-to-parallel converted into blocks of B symbols, leading to the data symbol block sequence $s^u[i]:=[s^u[iB], \ldots, s^u[(i+1)B-1]]^T$ (pilot symbol block sequence $s^p[i]$). The u-th user's data symbol block sequence $s^u[i]$ (pilot symbol block sequence $s^p[i]$) is subsequently spread by a factor N with the user composite code sequence $c_u[n]$ (pilot composite code sequence $c_p[n]$) which is the multiplication of a user specific (pilot specific) orthogonal Walsh-Hadamard spreading code and a base station specific scrambling code. The different user chip block sequences and the pilot chip block sequence are added, resulting into the multi-user chip block sequence:

$$x[n] = \sum_{u=1}^{U} s^u[i]c_u[n] + s^p[i]c_p[n], \quad i = \left\lfloor \frac{n}{N} \right\rfloor \quad (80)$$

The B×1 multi-user chip block sequence x[n] is transformed into the K×1 transmitted chip block sequence:

$$u[n]=T_1 \cdot x[n]+T_2 \cdot b \quad (81)$$

with $K=B+\mu$, where $T_1$ is the K×B zero padding (ZP) transmit matrix $T_1:=[I_B 0_{B \times \mu}]^T$ and $T_2$ is the K×μ Known Symbol Padding (KSP) transmit matrix $T_2:=[0_{\mu \times B} I_\mu]^T$. Note that this operation adds a μ×1 known symbol postfix b to each block of the multi-user chip block sequence x[n]. Finally, the transmitted chip block sequence u[n] is parallel-to-serial converted into the corresponding transmitted chip sequence $[u[nK], \ldots, u[(n+1)K-1]]^T:=u[n]$.

Figure 24:
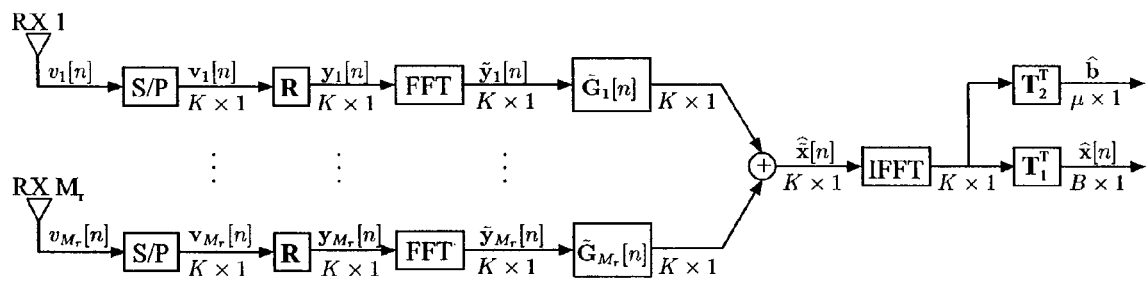
FIG. 24 represents the mobile station receiver model for SCBT-DS-CDMA with KSP.

D.1.b Receiver model for the mobile station. We assume that the mobile station of interest is equipped with $M_r$ receive antennas and has acquired perfect synchronisation. As shown in FIG. 24, the mobile station of interest transforms $M_r$ received chip sequences $$\{v_{m_r}[n]\}_{m_r=1}^{M_r}$$

into an estimate of the desired user's data symbol sequence $s^u[i]$ (we assume the u-th user to be the desired user). At each receive antenna, the received chip sequence $v_{m_r}[n]$ is serial-to-parallel converted into blocks of K chips, resulting into the received chip block sequence $v_{m_r}[n]:=[v_{m_r}[nK], \ldots, v_{m_r}[(n+1)K-1]]^T$. The K×K receive matrix $R:=I_K$ completely preserves each block of the received chip block sequence $v_{m_r}[n]$ leading to the received multi-user chip block sequence $y_{m_r}[n]:=R \cdot v_{m_r}[n]$. Assuming a sufficiently long known symbol postfix $\mu \geq L$ (L is the maximum channel order of all channels), we obtain a simple input/output relationship in the time-domain:

$$y_{m_r}[n]=\dot{H}_{m_r} \cdot (T_1 \cdot x[n]+T_2 \cdot b)+z_{m_r}[n] \quad (82)$$

where $z_{m_r}[n]$ is the received noise block sequence and $\dot{H}_{m_r}$ is a K×K circulant channel matrix describing the multi-path propagation from the base station's transmit antenna to the mobile station's $m_r$-th receive antenna. Note that there is no Inter Block Interference (IBI) because b acts as a cyclic prefix for each transmitted chip block u[n]. Transforming the time-domain (TD) received chip block sequence $y_{m_r}[n]$ into the corresponding frequency-domain (FD) received chip block sequence $\tilde{y}_{m_r}[n]:=F_K y_{m_r}[n]$, with $F_K$ the K×K FFT matrix, leads to the following FD input/output relationship:

$$\tilde{y}_{m_r}[n] = \tilde{H}_{m_r} \cdot \tilde{x}[n] + \tilde{z}_{m_r}[n] \tag{83}$$

where $\tilde{z}_{m_r}[n]:=F_K z_{m_r}[n]$ is the FD received noise block sequence, $\tilde{x}[n]:=F_K(T_1 \cdot x[n]+T_2 \cdot b)$ is the FD transmitted chip block sequence and $\tilde{H}_{m_r}:=\text{diag}\{\tilde{h}_{m_r}\}$ is the K×K diagonal FD channel matrix having the FD channel response $\tilde{h}_{m_r}$ for the $m_r$-th receive antenna as its main diagonal. Stacking the FD received chip block sequences of the Mr receive antennas, we finally obtain the following FD data model:

$$\underbrace{\begin{bmatrix} \tilde{y}_1[n] \\ \vdots \\ \tilde{y}_{M_r}[n] \end{bmatrix}}_{\tilde{y}[n]} = \underbrace{\begin{bmatrix} \tilde{H}_1 \\ \vdots \\ \tilde{H}_{M_r} \end{bmatrix}}_{\tilde{H}} \cdot \tilde{x}[n] + \underbrace{\begin{bmatrix} \tilde{z}_1[n] \\ \vdots \\ \tilde{z}_{M_r}[n] \end{bmatrix}}_{\tilde{z}[n]} \tag{84}$$

D.1.c Data model for burst processing. Assuming a burst length of I·B data symbols for each user, we can stack I·N consecutive FD received chip blocks $\tilde{y}[n]$, defined in Equation 84, into a FD output matrix $\tilde{Y}:=[\tilde{y}[0], \ldots, \tilde{y}[IN-1]]$, leading to the following FD data model for burst processing:

$$\tilde{Y} = \tilde{H} \cdot \tilde{X} + \tilde{Z} \tag{85}$$

where the FD input matrix $\tilde{X}$ and the FD noise matrix $\tilde{Z}$ are similarly defined as the FD output matrix $\tilde{Y}$. Note from Equation 83 that:

$$\tilde{X} = F_K \cdot (T_1 \cdot X + T_2 \cdot B) \tag{86}$$

where the TD input matrix X stacks I·N consecutive multi-user chip blocks x[n] and the KSP matrix B repeats I·N times the known symbol postfix b. By inspecting Equation 80, we can also write X as follows:

$$X = S_d \cdot C_d + S_p \cdot C_p \tag{87}$$

where the multi-user data symbol matrix $S_d:=[S_1, \ldots, S_U]$ stacks the data symbol matrices of the different active users and the u-th user's data symbol matrix $S_u:=[s^u[0], \ldots, s^u[I-1]]$ stacks I consecutive data symbol blocks of the u-th user. The pilot symbol matrix $S_p$ is similarly defined as $S_u$. The multi-user code matrix $C_d:=[C_1^T, \ldots, C_U^T]^T$ stacks the code matrices of the different active users. The u-th user's code matrix $C_u:=\text{diag}\{c_u[0], \ldots, c_u[I-1]\}$ stacks the u-th user's composite code vectors at I consecutive symbol instants, and the $_u$-th user's composite code vector $c_u[i]:=[c_u[iN], \ldots, c_u[(i+1)N-1]]$ is used to spread the data symbol block $s_u[i]$. The pilot code matrix $C_p$ and the pilot composite code vector $c_p[i]$ are similarly defined as $C_u$ respectively $C_u[i]$.

D.2 Burst frequency-domain chip equalization

Armed with a suitable data model for burst processing, we can now proceed with the design of different Least Squares (LS) type of burst frequency-domain (FD) chip equalizers that process a burst of I data symbol blocks at once. Note that Recursive Least Squares (RLS) type of adaptive FD chip equalizers that process the data on a symbol block by symbol block basis can be easily derived from their corresponding LS burst version. Starting from Equation 85 and assuming the total FD channel matrix $\tilde{H}$ to have full column rank and the FD input matrix $\tilde{X}$ to have full row rank, it is always possible to find a Zero-Forcing (ZF) FD chip equalizer matrix $\tilde{G}$, for which $\tilde{G} \cdot \tilde{Y} - \tilde{X} = 0$, provided there is no noise present in the FD output matrix $\tilde{Y}$. In the presence of noise, we have to solve the corresponding Least Squares (LS) minimization problem, which we denote for convenience as:

$$\tilde{G} \cdot \tilde{Y} - \tilde{X} \overset{LS}{=} 0 \tag{88}$$

Since the total FD channel matrix $\tilde{H}$ stacks $M_r$ diagonal FD channel matrices, as indicated by Equations 83 and 84, the total FD equalizer matrix $\tilde{G}$ suffices to have a similar structure:

$$\tilde{G} := [\tilde{G}_1 \ldots \tilde{G}_{M_r}] \tag{89}$$

where the FD equalizer matrix for the $m_r$-th receive antenna $\tilde{G}_{m_r}:=\text{diag}\{\tilde{g}_{m_r}\}$ acts on a per-tone basis at the chip block level (see also FIG. 10). Using Equations 86 and 87, we can rewrite the original LS problem of Equation 88 as:

$$\tilde{G} \cdot \tilde{Y} - \tilde{S}_d \cdot C_d - \tilde{S}_p \cdot C_p - F_K \cdot T_2 \cdot B \overset{LS}{=} 0 \tag{90}$$

where the FD multi-user data symbol matrix $\tilde{S}_d$ and the FD pilot symbol matrix $\tilde{S}_p$ are defined as:

$$\tilde{S}_d := F_K \cdot T_1 \cdot S_d, \quad \tilde{S}_p := F_K \cdot T_1 \cdot S_p \tag{91}$$

Starting from Equation 90, we will design in the following three different FD methods for direct chip equalizer estimation that differ in the amount of a-priori information they exploit to determine the equalizer coefficients. The first method, coined KSP-trained, only exploits the presence of a known symbol postfix. The last two methods, coined joint CDMP/KSP-trained and semi-blind joint CDMP/KSP-trained, exploit the presence of both a known symbol postfix and a Code Division Multiplexed Pilot (CDMP).

D.2.a KSP-trained chip equalizer. The KSP-trained chip equalizer estimator directly determines the equalizer coefficients from the FD output matrix $\tilde{Y}$ based on the knowledge of the KSP matrix B. By transforming Equation 90 to the TD with the IFFT matrix $F_K^H$ and by selecting the known symbol postfix with the KSP transmit matrix $T_2$, we obtain:

$$T_2^T \cdot F_K^H \cdot \tilde{G} \cdot \tilde{Y} - B \overset{LS}{=} 0 \tag{92}$$

because $T_2^T \cdot T_1 = 0_{\mu \times B}$ and $T_2^T \cdot T_2 = I_\mu$. Using the definition of $T_2$ in Equation 81, we can rewrite Equation 92 as:

$$F_K^H(B+1:K,:) \cdot \tilde{G} \cdot \tilde{Y} - B \overset{LS}{=} 0 \tag{93}$$

which can be interpreted as follows. The equalized FD output matrix $\tilde{G} \cdot \tilde{Y}$ is transformed to the TD with the last μ rows of the IFFT matrix $F_K^H$. The resulting matrix should be as close as possible to the KSP matrix B in a Least Squares sense.

D.2.b Joint CDMP/KSP-trained chip equalizer.

The joint CDMP/KSP-trained chip equalizer estimator directly determines the equalizer coefficients from the FD output matrix $\tilde{Y}$ based on the knowledge of the pilot code matrix $C_p$, the pilot symbol matrix $S_p$ and the KSP matrix B. By despreading Equation 90 with the pilot code matrix $C_p$, we obtain:

$$\tilde{G} \cdot \tilde{Y} \cdot C_p^H - F_K \cdot (T_1 \cdot S_p + T_2 \cdot B \cdot C_p^H) \stackrel{LS}{=} 0 \quad (94)$$

because $C_p \cdot C_p^H = 0$ due to the orthogonality of the user and the pilot composite code sequences at each symbol block instant. Equation 94 can be interpreted as follows. The equalized FD output matrix after despreading $\tilde{G}\tilde{Y} \cdot C_p^H$ should be as close as possible in a Least Squares sense to the FD version of the pilot symbol matrix $S_p$ padded with the KSP matrix after despreading $B \cdot C_p^H$.

D.2.c Semi-blind joint CDMP/KSP-trained chip equalizer.

The semi-blind joint CDMP/KSP-trained chip equalizer estimator directly determines the equalizer coefficients from the FD output matrix $\tilde{Y}$ based on the knowledge of the multi-user code matrix $C_d$, the pilot code matrix $C_p$, the pilot symbol matrix $S_p$ and the KSP matrix B. By despreading Equation 90 with the multi-user code matrix $C_d$ and by assuming the FD equalizer matrix $\tilde{G}$ to be known and fixed, we obtain an LS estimate of the multi-user data symbol matrix $\tilde{S}_d$:

$$\hat{S}_d = \tilde{G} \cdot \tilde{Y} \cdot C_d^H - F_K \cdot T_2 \cdot B \cdot C_d^H \quad (95)$$

because $C_p \cdot C_d^H = 0_{I \times UI}$ due to the orthogonality of the pilot and user composite code sequences at each symbol block instant. Substituting $\hat{S}_d$ into the original LS problem of Equation 90 leads to:

$$\tilde{G} \cdot \tilde{Y} \cdot P_d - F_K \cdot (T_1 \cdot S_p \cdot C_p + T_2 \cdot B \cdot P_d) \stackrel{LS}{=} 0 \quad (96)$$

where the projection matrix $P_d$ is defined as:

$$P_d := I_{IN} - C_d^H \cdot C_d \quad (97)$$

Equation 96 can be interpreted as follows. Both the FD output matrix $\tilde{Y}$ and the KSP matrix B are projected on the orthogonal complement of the subspace spanned by the multi-user code matrix $C_d$, employing the projection matrix $P_d$. The equalized FD output matrix after projecting $\tilde{G} \cdot \tilde{Y} \cdot P_d$ should then be as close as possible in a Least Squares sense to the FD version of the pilot chip matrix $S_p \cdot C_p$ padded with the KSP matrix after projection $B \cdot P_d$.

D.2.d User-specific detection.

As shown in FIG. 10, the obtained FD chip equalizer matrix $\hat{G}$, whether KSP-trained, joint CDMP/KSP-trained or semi-blind joint CDMP/KSP-trained, may subsequently be used to extract the desired user's data symbol matrix:

$$\hat{S}_u = T_1^T \cdot F_K^H \cdot \underbrace{\hat{G} \cdot \tilde{Y}}_{\hat{x}} \cdot C_u^H \quad (98)$$

where the estimated FD input matrix $\hat{X}$ is transformed to the TD by the IFFT matrix $F_K^H$ and has its known symbol postfix removed by the ZP transmit matrix $T_1$. The resulting estimate of the TD input matrix $\hat{X}$ is finally despread with the desired user's code matrix $C_u$ to obtain an estimate of the desired user's data symbol matrix.

D.3 Simulation results

We consider the downlink of an SCBT-DS-CDMA system (see also FIG. 9) with a single transmit antenna at the base-station, $M_r=1$ receive antenna(s) at the mobile station of interest, QPSK data modulation, an initial block length of B=13, real orthogonal Walsh-Hadamard spreading codes of length B=8 along with a complex random overlay code for scrambling and U=3 active mobile stations in total (half system load). We assume that each channel $h_m[l]$ is FIR with order L=3 and has Rayleigh distributed channel taps of equal average power. Taking $\mu=L=3$ and correspondingly $K=B+\mu=16$, KSP results in an acceptable decrease in information rate, more specifically, a decrease with a factor $B/K \approx 0.81$. Both FIG. 11 and FIG. 12 compare the average BER versus the average received SNR per bit of the proposed methods with that of the ideal fully-trained (FT) method that assumes perfect knowledge of the FD input matrix $\tilde{X}$ (see Equation 88). Also shown in the figures is the theoretical BER-curve for QPSK with $M_r \cdot (L+1)=4$-fold diversity in Rayleigh fading channels (single-user bound).

Figure 25:
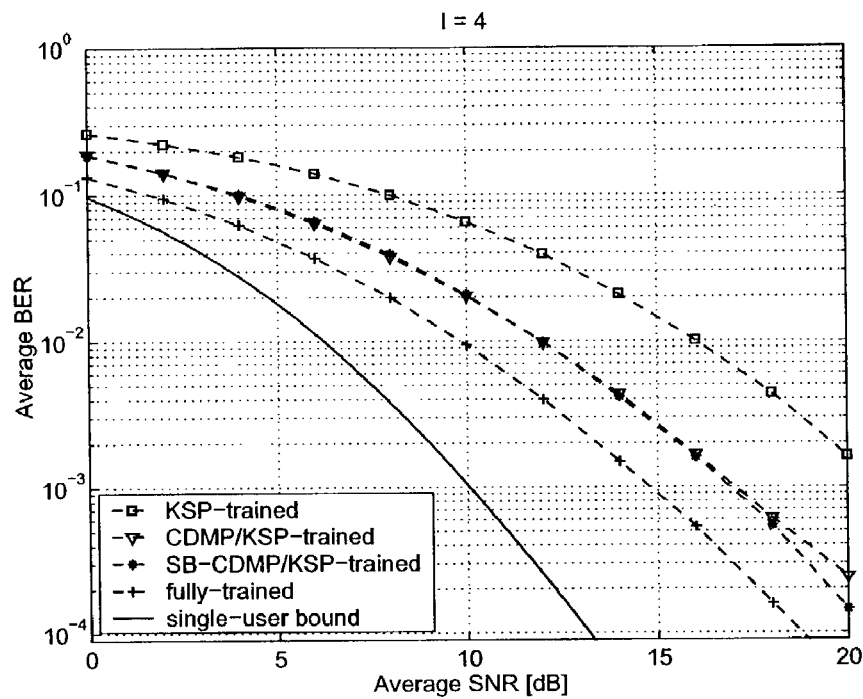
FIG. 25 represents the SCBT-DS-CDMA/KSP equalizer performance for large burst length.

FIG. 25 compares the average BER versus the average received SNR for a large burst length I·B=52 corresponding to I=4. The joint CDMP/KSP-trained method and its semi-blind (SB) version have similar performance except at high SNR per bit where the semi-blind method has a slight advantage. At a BER of $10^{-2}$, they outperform the KSP-trained method by 4 dB and are within 2 dB of the ideal FT method.

Figure 26:
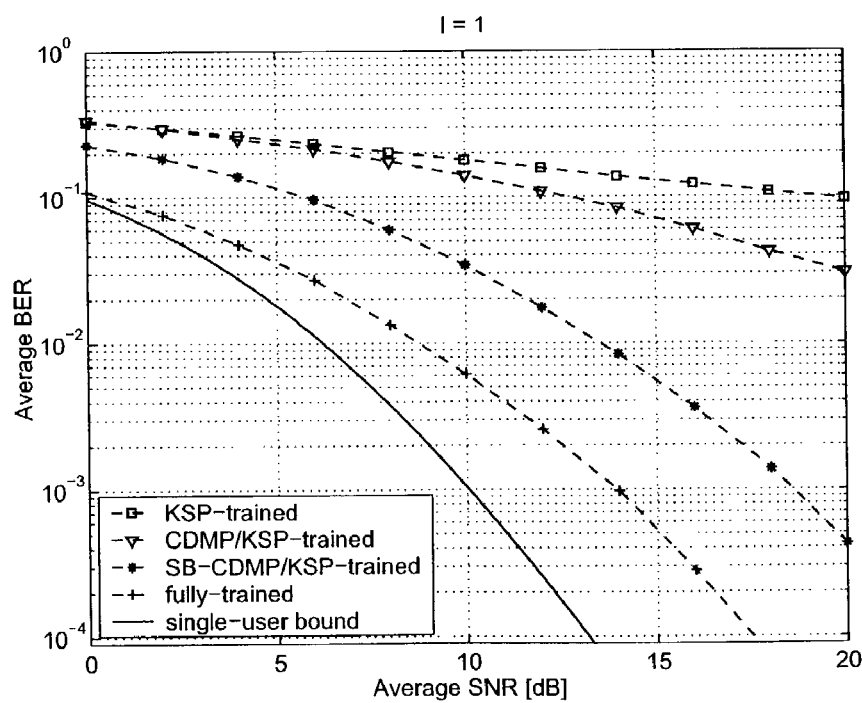
FIG. 26 represents the SCBT-DS-CDMA/KSP equalizer performance for small burst length.

FIG. 26 compares the average BER versus the average received SNR for a small burst length I·B=13 corresponding to I=1. The semi-blind (SB) joint CDMP/KSP-trained method now outperforms both the regular joint CDMP/KSP-trained method and the KSP-trained method. At a BER of $10^{-1}$, it achieves a 6 dB gain compared to the regular joint CDMP/KSP-trained method and incurs a 5 dB loss compared to the ideal FT method. The joint CDMP/KSP-trained method outperforms on its turn the KSP-trained method by 8 dB at a BER of $10^{-1}$.

D.4 Conclusion

In this paper, we have developed three new direct equalizer estimation methods for single-carrier block transmission (SCBT) DS-CDMA with Known Symbol Padding (KSP). The KSP-trained method, that only exploits the presence of the known symbol postfix, only achieves reasonable performance for rather large burst lengths. The joint CDMP/KSP-trained method, that additionally exploits the presence of a Code Division Multiplexed Pilot (CDMP), outperforms the KSP-trained method for both large and small burst lengths. The semi-blind joint CDMP/KSP-trained method, that additionally capitalizes on the unused spreading codes in a practical CDMA system (assuming knowledge of the multi-user code correlation matrix) proves its usefulness especially for small burst lengths. It outperforms the regular joint CDMP/KSP-trained method while staying within reasonable range of the ideal fully-trained method.

We can conclude that, from a performance point of view, the semi-blind joint CDMP/KSP-trained method for direct equalizer estimation is an interesting technique for future broadband cellular systems based on SCBT-DS-CDMA.

E. EMBODIMENT

E.1 System model for DS-CDMA Downlink with Spatial Multiplexing

Figure 27:
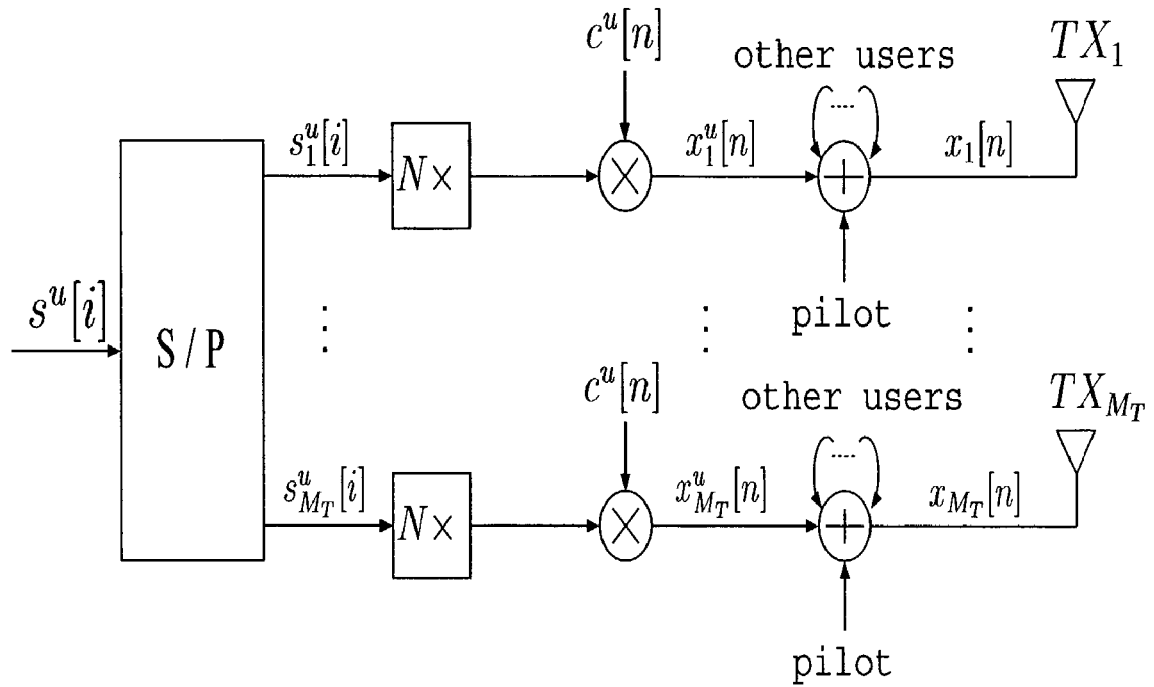
FIG. 27 represents the base station transmitter model for spatially multiplexed DS-CDMA.

Let us consider the downlink of a single-cell SM DS-CDMA system with U active mobile stations. We assume that the base station is equipped with $M_T$ transmit antennas whereas the mobile station of interest is equipped with MR receive antennas. As shown in FIG. 27, the base-station transmits from each of its $M_T$ antennas a synchronous code division multiplex, employing the same user specific orthogonal Walsh-Hadamard spreading codes and a different base station specific scrambling code. The multi-user chip sequence, transmitted by the $m_t$-th transmit antenna, consists of U active user signals and a continuous pilot signal:

$$x_{m_t}[n] = \sum_{u=1}^{U} s_{m_t}^u[i]c_{m_t}^u[n] + s_{m_t}^P[i]c_{m_t}^P[n] \quad (99)$$

with $$i = \left\lfloor \frac{n}{N} \right\rfloor.$$

Each user's data symbol sequence $$s_{m_t}^u[i]$$

(pilot symbol sequence $$s_{m_t}^P[i])$$

is spread by a factor N with the user composite code sequence $$\tilde{c}_{m_t}^u[n]$$

(pilot composite code sequence $$\tilde{c}_{m_t}^P[n]).$$

The u-th user composite code sequence for the $m_t$-th transmit antenna $$\tilde{c}_{m_t}^u[n]$$

(the pilot composite code sequence $$\tilde{c}_{m_t}^P[n])$$

is the multiplication of the user specific Walsh-Hadamard spreading code sequence $\tilde{c}^u[n]$ (the pilot specifc spreading code sequence $\tilde{c}^P[n]$) and the base station's transmit antenna specific scrambling code sequence $$c_{m_t}^s[n].$$

Assume that the mobile station is equipped with $M_R$ receive antennas and let $$h_{m_r,m_t}(t)$$

denote the continuous-time channel from the $m_t$-th transmit antenna to the $m_r$-th receive antenna, including the transmit and receive filters. The received antenna signals are sampled at the chip rate $T_c$ and the obtained samples are stacked in the $M_R \times 1$ received vector sequence $$y[n] = \begin{bmatrix} y_1[n] & y_2[n] & \ldots & y_{M_R}[n] \end{bmatrix}^T,$$

which can be written as:

$$y[n] = \sum_{m_t=1}^{M_T} \sum_{n'=0}^{L_{m_t}} h_{m_t}[n']x_{m_t}[n-n'] + e[n] \quad (100)$$

where e[n] is the $M_R \times 1$ received noise vector sequence and $h_{m_t}[n]$ is the discrete-time $M_R \times 1$ vector channel from the $m_t$-th transmit antenna to the $M_R$ receive antennas. Note that we model $h_{m_t}[n]$ as an $M_R \times 1$ FIR vector filter of order $L_{m_t}$.

With $M_T I$ the burst length, I the number of data symbols per transmit antenna and Q+1 the temporal smoothing factor, we now introduce the following (Q+1) $M_R \times IN$ output matrix:

$$\underbrace{\begin{bmatrix} y[0] & \cdots & y[IN-1] \\ \vdots & & \vdots \\ y[Q] & \cdots & y[Q+IN-1] \end{bmatrix}}_{Y} = \sum_{m_t=1}^{M_T} \mathcal{H}_{m_t} \cdot \underbrace{\begin{bmatrix} x_{m_t}^{-L_{m_t}} \\ \vdots \\ x_{m_t}^Q \end{bmatrix}}_{X_{m_t}} + E \quad (101)$$

where the noise matrix E is similarly defined as Y, $\mathcal{H}_{m_t}$ is the (Q+1)$M_R \times r_{m_t}$ channel matrix (with block Toeplitz structure) and $X_{m_t}$ is the $r_{m_t} \times IN$ input matrix for the mt-th transmit antenna $$(r_{m_t} := L_{m_t} + 1 + Q \text{ and } r := \sum_{m_t=1}^{M_T} r_{m_t} \text{ is called the system order}).$$

is called the system order). The multi-user chip sequence transmitted from the mt-th antenna at delay a is defined as $$x_{m_t}^a := \begin{bmatrix} x_{m_t}[a] & x_{m_t}[a+1] & \ldots & x_{m_t}[a+IN-1] \end{bmatrix}.$$

Figure 28:
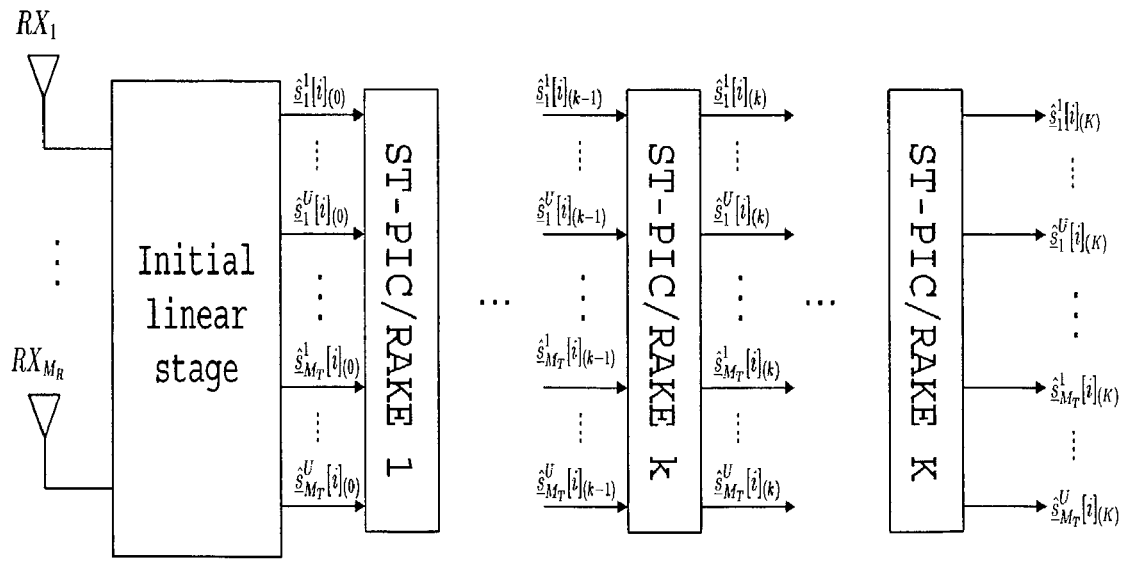
FIG. 28 represents the mobile station receiver model with initial linear stage and K non-linear ST-PIC/RAKE stages.

Armed with a suitable data model for burst processing, we can now proceed with the design of the new combined linear and non-linear downlink multi-user receiver. As shown in FIG. 28, it consists of an initial linear stage, based on ST chip-level equalization, and K non-linear ST Parallel Interference Cancellation (PIC) stages with ST-RAKE combining.

E.2 Initial linear stage

Figure 29:
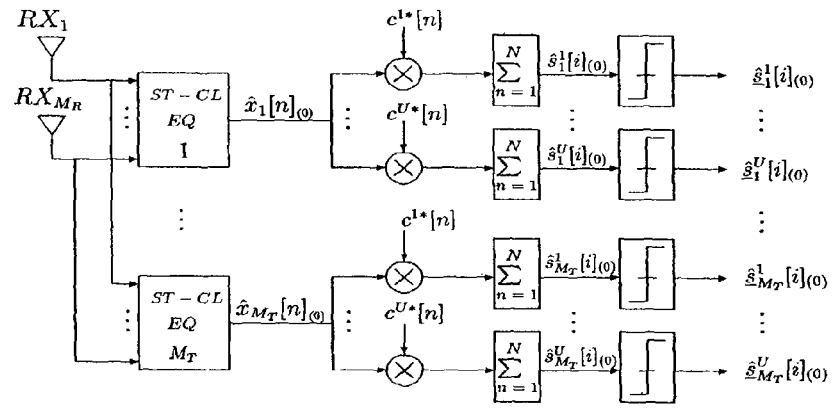
FIG. 29 represents the initial linear stage based on space-time chip-level equalization.

The initial linear stage produces initial estimates of the different transmit data symbol streams of all active users. As shown in FIG. 29, it consists of $M_T$ parallel branches, one for each independently transmitted multi-user chip sequence. Each branch is made up of a linear space-time (ST) chip-level (CL) equalizer (EQ) followed by a bank of correlators. The space-time chip-level equalizer of the $m_t$-th branch linearly combines the discrete-time signals from the different receive antennas and tries to restore the multi-user chip sequence, transmitted by the $m_t$-th transmit antenna:

$$\hat{x}_{m_t(0)} = g_{m_t} \cdot Y \qquad (102)$$

where the $1 \times (Q+1)M_T$ equalizer vector gnt makes a linear combination of the rows of the output matrix Y and where $\hat{x}_{m_t(0)}$ is the initial soft estimate of $x_t := x^0_{m_t}$ being the multi-user chip sequence transmitted from the $m_t$-th transmit antenna at delay $\alpha=0$. The equalizer vector can be directly estimated from the output matrix by exploiting the presence of the code-multiplexed pilot in either a training-based or a semi-blind Least Squares (LS) cost function.

The bank of correlators descrambles and despreads the equalized signal with all active user composite code sequences for the $m_t$-th transmit antenna to obtain the initial soft decisions:

$$\hat{s}^d_{m_t(0)} = \hat{x}_{m_t} \cdot C^{dH}_{m_t} \qquad (103)$$

where $$\hat{s}^d_{m_t(0)}$$

is the initial soft estimate of the $1 \times UI$ multi-user data symbol vector for the $m_t$-th transmit antenna $$s^d_{m_t} := \begin{bmatrix} s^1_{m_t} & \ldots & s^U_{m_t} \end{bmatrix}$$

that stacks the data symbol vectors of the different active users at the corresponding transmit antenna. The $UI \times IN$ multi-user code matrix $$C^d_{m_t} := \begin{bmatrix} C^{1T}_{m_t} & \ldots & C^{UT}_{m_t} \end{bmatrix}^T$$

for the $m_t$-th transmit antenna stacks the code matrices of the different active users. The initial soft decisions $$\hat{s}^d_{m_t(0)}$$

are then input to a decision device that generates the initial hard decisions $$\hat{s}^d_{m_t(0)}.$$

E.3 k-th Non-Linear ST-PIC/RAKE Stage

As shown in FIG. 28, the k-th ST-PIC/RAKE stage uses the estimates of the multi-user data symbol vectors $$\{\hat{s}^d_{m_t(k-1)}\}_{m_t=1}^{M_T}$$

provided by the previous stage (wether the previous ST-PIC/RAKE stage when k>1 or the initial linear stage when k=1) to obtain the refined estimates $$\{\hat{s}^d_{m_t(k)}\}_{m_t=1}^{M_T}.$$

Figure 30:
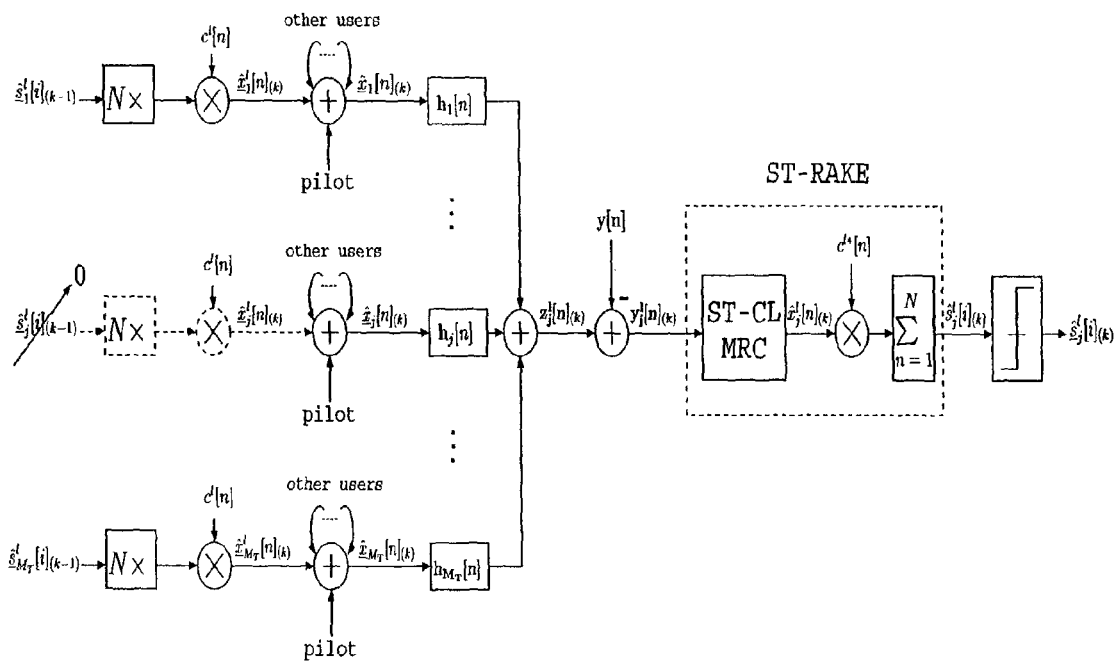
FIG. 30 represents the k-th PIC/RAKE stage focused on the j-th transmit stream of the l-th user.

Each ST-PIC/RAKE stage decomposes into a non-linear ST Parallel Interference Cancellation (PIC) step and a linear ST-RAKE combining step. FIG. 30 shows the k-th ST-PIC/RAKE stage focused on a particular transmit stream j of a particular user l. The ST-PIC step first regenerates the MUI experienced by the j-th transmit stream of the l-th user at each receive antenna:

$$Z^l_{j(k)} = \sum_{m_t=1}^{M_T} \hat{\mathcal{H}}_{m_t} \cdot \hat{X}_{m_t(k)} \qquad (104)$$

where the MUI matrix for the j-th transmit stream of the l-th user $$Z^l_{j(k)}$$

is similarly defined as the output matrix Y with Q=L. The hard estimate of the $m_t$-th input matrix $$\hat{X}_{m_t(k)}$$

is similarly defined as $X_{m_t}$ except for the j-th one $$\hat{X}_{j(k)}$$

that does not include the contribution of the l-th user (see FIG. 16). The output matrix after cancellation for the j-th transmit stream of the l-th user then becomes:

$$Y^l_{j(k)} = Y_r - Z^l_{j(k)} \qquad (105)$$

where $$Y^l_{j(k)}$$

and $Y_r$ are similarly defined as Y with Q=L.

The ST-RAKE combining step performs ST Maximum Ratio Combining (MRC) at the chip-level (CL) followed by a correlation with the composite code sequence of the j-th transmit stream of the l-th user:

$$\hat{s}^l_{j(k)} = f \cdot Y^l_{j(k)} \cdot C_j^{lH} \qquad (106)$$

where the $1 \times (L+1)M_T$ MRC vector f contains the complex conjugate ST channel coefficients. The obtained k-th soft estimate about the j-th data symbol vector of the l-th user $$\hat{s}^l_{j(k)}$$

is then fed into a decision device that generates the k-th hard estimate $$\hat{s}^l_{j(k)}.$$

E.4 Simulation Results

The simulations are performed for the downlink of a spatially multiplexed DS-CDMA system with U=3 active, equal power users, QPSK data modulation, real orthogonal Walsh-Hadamard spreading codes of length N=8 along with a complex random overlay code for scrambling. The number of transmit antennas at the base station is $M_T$=3 whereas the number of receive antennas at the mobile station is $M_T$=4. The block length is I=50. The ST vector channels with order $L_{m_t}$=L=3 have $M_T(L+1)$=16 Rayleigh distributed channel taps of equal average power. The temporal smoothing factor is chosen to be Q+1=$M_T$L=9 and the performance is averaged over 100 channels in total.

Figure 31:
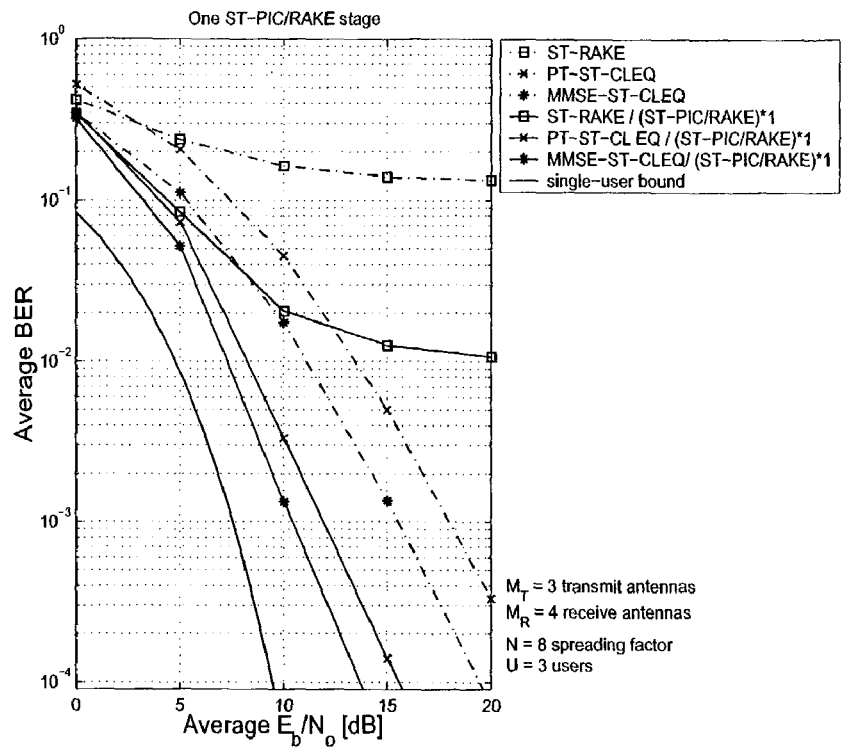
FIG. 31 shows that One ST-PIC/RAKE stage achieves a 6.5 dB gain for the SB-ST-CLEQ.

The proposed receiver with only one ST-PIC/RAKE stage achieves a significant performance improvement compared to the linear only receiver. This is shown in FIG. 31 that compares the average BER versus the SNR per bit of the linear stage only to the complete receiver with one ST-PIC/RAKE stage. The initial linear stage is either the ideal ST-RAKE receiver with perfect channel knowledge, the pilot-trained (PT-ST-CLEQ), the semi-blind (SB-ST-CLEQ) or the fully-trained space-time chip-level equalizer receiver (FT-ST-CLEQ). Also shown in the figure is the theoretical BER-curve of QPSK with $M_T(L+1)$-th order diversity in Rayleigh fading channels (single-user bound). The SB-ST-CLEQ for instance with one ST-PIC/RAKE stage outperforms the SB-ST-CLEQ only receiver with 6.5 dB at a BER of $10^{-3}$.

Figure 32:
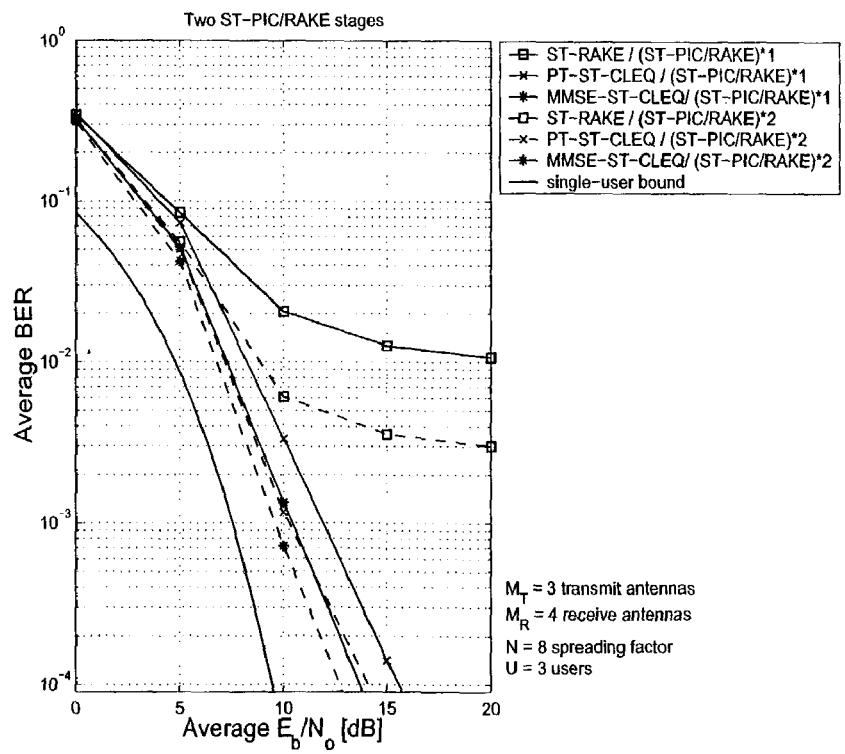
FIG. 32 shows that a second ST-PIC/RAKE stage offers an additional 1.5 dB gain for the SB-ST-CLEQ.

The proposed receiver with two successive ST-PIC/RAKE stages gives an additional gain of 1.5 dB for the SB-ST-CLEQ and 3.8 dB for the PT-ST-CLEQ. This is shown in FIG. 32.

E.5 Conclusion and future work

We have presented a new combined linear and non-linear downlink multi-user receiver that copes with the $M_T$-fold increase of the MUI in a SM DS-CDMA downlink that uses $M_T$ transmit antennas. The proposed receiver consists of an initial linear stage based on space-time chip-level equalization and possibly multiple non-linear ST-PIC/RAKE stages. Simulation results show that a single ST-PIC/RAKE stage significantly increases the performance of the linear only receiver. A second ST-PIC/RAKE stage brings an additional gain at the expense of increased complexity. We can conclude that the proposed downlink multi-user receiver is a promising issue for future MIMO DS-CDMA systems both from performance as well as complexity point of view.

What is claimed is:

1. A method for communicating data signals between at least one base station and at least one terminal, the method comprising:
    receiving a signal from at least one antenna;
    performing subband processing of a version of said received signal;
    separating contribution signals associated with a plurality of users, the contribution signals being derivable from said received signal; and
    restoring data from each one of the contribution signals, the data having been configured to resist frequency-selective fading, wherein the restoring comprises arranging the separated contribution signals into blocks of data comprising a plurality of symbols and degrouping said blocks of data,
    wherein the separating of contribution signals comprises filtering at a chip rate at least a portion of the subband processed version of said received signal, and then despreading said filtered portion, and wherein the filtering comprises processing said portion with a filter characterized by filter coefficients that are determinable without the necessity to perform channel estimation,
    wherein the filter coefficients are directly computed by using an explicit equation.

2. The method recited in claim 1, wherein the step of receiving a signal comprises receiving the signal from a plurality of antennas, and generating data streams, and wherein the step of subband processing is performed on each of said data streams, and producing a subband processed version of said received signal.

3. The method recited in claim 1, further comprising performing the step of space-time decoding on each of the streams.

4. The method recited in claim 3, wherein the step of space-time decoding comprises performing at least one of block decoding and trellis decoding.

5. The method recited in claim 1, further comprising performing the step of inverse subband processing on at least one filtered, subband processed version of the received signal.

6. The method recited in claim 1, wherein the step of filtering comprises processing said portion with a filter characterized by filter coefficients that are determinable in a semi-blind or in a training-based technique.

7. The method recited in 1, wherein the step of filtering comprises processing said portion with a filter characterized by filter coefficients that are determined while maintaining one version of the filtered signal as close as possible to a version of the pilot symbol.

8. The method recited in claim 7, wherein the version of the filtered signal comprises the filtered signal after despreading with a composite code associated with the base station-specific scrambling code and the pilot code, and wherein the version of the pilot symbol comprises the pilot symbol as formulated in a per tone ordering.

9. The method recited in claim 7, wherein the version of the filtered signal comprises the filtered signal after projecting on an orthogonal complement on a subspace spanned by a plurality of composite codes associated with the base station-specific scrambling code and user-specific codes, and wherein the version of the pilot symbol comprises the pilot symbol spread with a composite code associated with the base station-specific scrambling code and the pilot code as put in per tone ordering.

10. The method recited in claim 1, further comprising removing transmit redundancy resulting from adding redundant data.

11. The method recited in claim 1, wherein the step of restoring data comprises performing the step of linear de-precoding.

12. The method recited in claim 1, wherein a receiver is configured to perform all said steps among a plurality of users in a wireless communication system.

13. An apparatus for communicating data signals among a plurality of users, the apparatus comprising:
a plurality of circuits configured to perform subband processing on received signals;
a despreader circuit configured to determine by block dispreading an estimate of a plurality of subband processed blocks of data symbols received for at least one user terminal from the received signals, wherein the blocks of data symbols each comprise a plurality of symbols, wherein the despreader circuit is configured to process at a chip rate at least a portion of the subband processed version of said received signals with a filter characterized by filter coefficients determinable without the necessity to perform channel estimation, and then to despread said filtered portion,
wherein the filter coefficients are directly computed by using an explicit equation.

14. The apparatus recited in claim 13, further comprising a plurality of antennas receiving signals.

15. The apparatus recited in claim 13, wherein said circuitry adapted for determining an estimate of symbols comprises a plurality of circuits for inverse subband processing.

16. The apparatus recited in claim 13, wherein said despreader circuit comprises a plurality of filters configured to filter at least a portion of a subband processed version of said received signals.

17. The apparatus recited in claim 13, wherein said despreader circuit comprises a plurality of filters configured to filter at a chip rate at least a portion of a subband processed version of said received signals.

18. The apparatus recited in claim 13, further comprising a space-time decoder configured to decode at least a portion of said received signals.

19. The method recited in claim 1, wherein the explicit equation is one of the following:

$$\hat{G} = \underset{G}{\operatorname{argmin}} \| G \cdot Y' \cdot C_P^H - S_p' \|_F^2 \text{ or}$$

$$\hat{G} = \underset{G}{\operatorname{argmin}} \| G \cdot Y' \cdot (I_{IN} - C_d^H \cdot C_d) - S_p' \cdot C_P \|_F^2$$

wherein $\hat{G}$ is a matrix representing the determined filter coefficients,
wherein $G$ is a matrix representing the filter coefficients,
wherein $\acute{Y}$ is a per-tone output matrix,
wherein $\acute{S}_p$ is a pilot symbol matrix,
wherein $C_p$ is a pilot code matrix,
wherein $C_d$ is a multi-user code matrix.

20. The apparatus recited in claim 13, wherein the explicit equation is one of the following:

$$\hat{G} = \underset{G}{\operatorname{argmin}} \| G \cdot Y' \cdot C_P^H - S_p' \|_F^2 \text{ or}$$

$$\hat{G} = \underset{G}{\operatorname{argmin}} \| G \cdot Y' \cdot (I_{IN} - C_d^H \cdot C_d) - S_p' \cdot C_P \|_F^2$$

wherein $\hat{G}$ is a matrix representing the determined filter coefficients,
wherein $G$ is a matrix representing the filter coefficients,
wherein $Y$ is a per-tone output matrix,
wherein $\acute{S}_p$ is a pilot symbol matrix,
wherein $C_p$ is a pilot code matrix,
wherein $C_d$ is a multi-user code matrix.

* * * * *